US010696554B2

(12) United States Patent
Bedworth et al.

(10) Patent No.: US 10,696,554 B2
(45) Date of Patent: Jun. 30, 2020

(54) NANOPARTICLE MODIFICATION AND PERFORATION OF GRAPHENE

(71) Applicant: Lockheed Martin Corporation, Bethesda, MD (US)

(72) Inventors: Peter V. Bedworth, Los Gatos, CA (US); Jacob L. Swett, Redwood City, CA (US)

(73) Assignee: Lockheed Martin Corporation, Bethesda, MD (US)

( * ) Notice: Subject to any disclaimer, the term of this patent is extended or adjusted under 35 U.S.C. 154(b) by 0 days.

(21) Appl. No.: 15/099,099

(22) Filed: Apr. 14, 2016

(65) Prior Publication Data
US 2017/0036916 A1 Feb. 9, 2017

Related U.S. Application Data

(60) Provisional application No. 62/202,122, filed on Aug. 6, 2015.

(51) Int. Cl.
*C01B 32/194* (2017.01)

(52) U.S. Cl.
CPC ........ *C01B 32/194* (2017.08); *C01B 2204/04* (2013.01)

(58) Field of Classification Search
CPC ..... H01J 37/31; C01B 31/0484; C01B 32/194
See application file for complete search history.

(56) References Cited

U.S. PATENT DOCUMENTS

| 2,187,417 | A | 1/1940 | Doble |
| 3,024,153 | A | 3/1962 | Kennedy |
| 3,303,085 | A | 2/1967 | Price et al. |
| 3,501,831 | A | 3/1970 | Gordon |
| 3,593,854 | A | 7/1971 | Swank |
| 3,692,059 | A | 9/1972 | Ice, Jr. |
| 3,701,433 | A | 10/1972 | Krakauer et al. |
| 3,802,972 | A | 4/1974 | Fleischer et al. |
| 3,896,733 | A | 7/1975 | Rosenberg |
| 4,043,331 | A | 8/1977 | Martin et al. |
| 4,073,732 | A | 2/1978 | Lauer et al. |
| 4,159,954 | A | 7/1979 | Gangemi |
| 4,162,220 | A | 7/1979 | Servas |

(Continued)

FOREIGN PATENT DOCUMENTS

| CA | 2037988 | 9/1992 |
| CA | 2411935 | 12/2002 |

(Continued)

OTHER PUBLICATIONS

Weisen Li, Journal of Applied Physics 114, 234304 (2013); doi: 10.1063/1.4837657.*

(Continued)

*Primary Examiner* — Michael A Band
(74) *Attorney, Agent, or Firm* — Foley & Lardner LLP

(57) ABSTRACT

Multi-layer sheets of graphene-based material having a plurality of pores extending therethrough are described herein. Methods for making the sheets are also provided and include exposing a graphene-based material comprising multilayer graphene having from 2 to 10 layers of graphene to a particle beam comprising nanoparticles, the nanoparticles having an energy of at least 2 keV per nanoparticle.

7 Claims, 5 Drawing Sheets

(56) References Cited

U.S. PATENT DOCUMENTS

| | | |
|---|---|---|
| 4,277,344 A | 7/1981 | Cadotte |
| 4,303,530 A | 12/1981 | Shah et al. |
| 4,457,747 A | 7/1984 | Tu |
| 4,743,371 A | 5/1988 | Servas et al. |
| 4,804,363 A | 2/1989 | Valeri |
| 4,855,058 A | 8/1989 | Holland et al. |
| 4,880,440 A | 11/1989 | Perrin |
| 4,889,626 A | 12/1989 | Browne |
| 4,891,134 A | 1/1990 | Vcelka |
| 4,925,560 A | 5/1990 | Sorrick |
| 4,935,207 A | 6/1990 | Stanbro et al. |
| 4,976,858 A | 12/1990 | Kadoya |
| 5,052,444 A | 10/1991 | Messerly et al. |
| 5,080,770 A | 1/1992 | Culkin |
| 5,082,476 A | 1/1992 | Kahlbaugh et al. |
| 5,156,628 A | 10/1992 | Kranz |
| 5,182,111 A | 1/1993 | Aebischer et al. |
| 5,185,086 A | 2/1993 | Kaali et al. |
| 5,201,767 A | 4/1993 | Caldarise et al. |
| 5,244,981 A | 9/1993 | Seidner et al. |
| 5,277,748 A | 1/1994 | Sakaguchi et al. |
| 5,314,492 A | 5/1994 | Hamilton et al. |
| 5,314,960 A | 5/1994 | Spinelli et al. |
| 5,314,961 A | 5/1994 | Anton et al. |
| 5,331,067 A | 7/1994 | Seidner et al. |
| 5,344,454 A | 9/1994 | Clarke et al. |
| 5,371,147 A | 12/1994 | Spinelli et al. |
| 5,425,858 A | 6/1995 | Farmer |
| 5,480,449 A | 1/1996 | Hamilton et al. |
| 5,514,181 A | 5/1996 | Light et al. |
| 5,516,522 A | 5/1996 | Peyman et al. |
| 5,549,697 A | 8/1996 | Caldarise |
| 5,562,944 A | 10/1996 | Kafrawy |
| 5,565,210 A | 10/1996 | Rosenthal et al. |
| 5,580,530 A | 12/1996 | Kowatsch et al. |
| 5,595,621 A | 1/1997 | Light et al. |
| 5,636,437 A | 6/1997 | Kaschmitter et al. |
| 5,639,275 A | 6/1997 | Baetge et al. |
| 5,641,323 A | 6/1997 | Caldarise |
| 5,658,334 A | 8/1997 | Caldarise et al. |
| 5,662,158 A | 9/1997 | Caldarise |
| 5,665,118 A | 9/1997 | Lasalle et al. |
| 5,671,897 A | 9/1997 | Ogg et al. |
| 5,679,232 A | 10/1997 | Fedor et al. |
| 5,679,249 A | 10/1997 | Fendya et al. |
| 5,687,788 A | 11/1997 | Caldarise et al. |
| 5,700,477 A | 12/1997 | Rosenthal et al. |
| 5,713,410 A | 2/1998 | Lasalle et al. |
| 5,716,412 A | 2/1998 | Decarlo et al. |
| 5,716,414 A | 2/1998 | Caldarise |
| 5,725,586 A | 3/1998 | Sommerich |
| 5,725,775 A | 3/1998 | Bene et al. |
| 5,731,360 A | 3/1998 | Pekala et al. |
| 5,733,503 A | 3/1998 | Kowatsch et al. |
| 5,746,272 A | 5/1998 | Mastrorio et al. |
| 5,782,286 A | 7/1998 | Sommerich |
| 5,782,289 A | 7/1998 | Mastrorio et al. |
| 5,788,916 A | 8/1998 | Caldarise |
| 5,800,828 A | 9/1998 | Dionne et al. |
| 5,808,312 A | 9/1998 | Fukuda |
| 5,868,727 A | 2/1999 | Barr et al. |
| 5,897,592 A | 4/1999 | Caldarise et al. |
| 5,902,762 A | 5/1999 | Mercuri et al. |
| 5,906,234 A | 5/1999 | Mastrorio et al. |
| 5,910,172 A | 6/1999 | Penenberg |
| 5,910,173 A | 6/1999 | Decarlo et al. |
| 5,913,998 A | 6/1999 | Butler et al. |
| 5,922,304 A | 7/1999 | Unger |
| 5,925,247 A | 7/1999 | Huebbel |
| 5,932,185 A | 8/1999 | Pekala et al. |
| 5,935,084 A | 8/1999 | Southworth |
| 5,935,172 A | 8/1999 | Ochoa et al. |
| 5,954,937 A | 9/1999 | Farmer |
| 5,974,973 A | 11/1999 | Tittgemeyer |
| 5,976,555 A | 11/1999 | Liu et al. |
| 5,980,718 A | 11/1999 | Van Konynenburg et al. |
| 6,008,431 A | 12/1999 | Caldarise et al. |
| 6,013,080 A | 1/2000 | Khalili |
| 6,022,509 A | 2/2000 | Matthews et al. |
| 6,052,608 A | 4/2000 | Young et al. |
| 6,080,393 A | 6/2000 | Liu et al. |
| 6,093,209 A | 7/2000 | Sanders |
| 6,139,585 A | 10/2000 | Li |
| 6,152,882 A | 11/2000 | Prutchi |
| 6,156,323 A | 12/2000 | Verdicchio et al. |
| 6,193,956 B1 | 2/2001 | Liu et al. |
| 6,209,621 B1 | 4/2001 | Treacy |
| 6,213,124 B1 | 4/2001 | Butterworth |
| 6,228,123 B1 | 5/2001 | Dezzani |
| 6,264,699 B1 | 7/2001 | Noiles et al. |
| 6,292,704 B1 | 9/2001 | Malonek et al. |
| 6,309,532 B1 | 10/2001 | Tran et al. |
| 6,346,187 B1 | 2/2002 | Tran et al. |
| 6,375,014 B1 | 4/2002 | Garcera et al. |
| 6,423,022 B1 | 7/2002 | Roeher et al. |
| 6,426,214 B1 | 7/2002 | Butler et al. |
| 6,454,095 B1 | 9/2002 | Brisebois et al. |
| 6,455,115 B1 | 9/2002 | Demeyer |
| 6,461,622 B2 | 10/2002 | Liu et al. |
| 6,462,935 B1 | 10/2002 | Shiue et al. |
| 6,521,865 B1 | 2/2003 | Jones et al. |
| 6,532,386 B2 | 3/2003 | Sun et al. |
| 6,544,316 B2 | 4/2003 | Baker et al. |
| 6,580,598 B2 | 6/2003 | Shiue et al. |
| 6,654,229 B2 | 11/2003 | Yanagisawa et al. |
| 6,659,298 B2 | 12/2003 | Wong |
| 6,660,150 B2 | 12/2003 | Conlan et al. |
| 6,661,643 B2 | 12/2003 | Shiue et al. |
| 6,686,437 B2 | 2/2004 | Buchman et al. |
| 6,692,627 B1 | 2/2004 | Russell et al. |
| 6,695,880 B1 | 2/2004 | Roffman et al. |
| 6,699,684 B2 | 3/2004 | Ho et al. |
| 6,719,740 B2 | 4/2004 | Burnett et al. |
| 6,905,612 B2 | 6/2005 | Dorian et al. |
| 6,924,190 B2 | 8/2005 | Dennison |
| 7,014,829 B2 | 3/2006 | Yanagisawa et al. |
| 7,071,406 B2 | 7/2006 | Smalley et al. |
| 7,092,753 B2 | 8/2006 | Darvish et al. |
| 7,138,042 B2 | 11/2006 | Tran et al. |
| 7,171,263 B2 | 1/2007 | Darvish et al. |
| 7,175,783 B2 | 2/2007 | Curran |
| 7,179,419 B2 | 2/2007 | Lin et al. |
| 7,190,997 B1 | 3/2007 | Darvish et al. |
| 7,267,753 B2 | 9/2007 | Anex et al. |
| 7,306,768 B2 | 12/2007 | Chiga |
| 7,357,255 B2 | 4/2008 | Ginsberg et al. |
| 7,374,677 B2 | 5/2008 | McLaughlin et al. |
| 7,381,707 B2 | 6/2008 | Lin et al. |
| 7,382,601 B2 | 6/2008 | Yoshimitsu |
| 7,434,692 B2 | 10/2008 | Ginsberg et al. |
| 7,452,547 B2 | 11/2008 | Lambino et al. |
| 7,459,121 B2 | 12/2008 | Liang et al. |
| 7,460,907 B1 | 12/2008 | Darvish et al. |
| 7,476,222 B2 | 1/2009 | Sun et al. |
| 7,477,939 B2 | 1/2009 | Sun et al. |
| 7,477,940 B2 | 1/2009 | Sun et al. |
| 7,477,941 B2 | 1/2009 | Sun et al. |
| 7,479,133 B2 | 1/2009 | Sun et al. |
| 7,505,250 B2 | 3/2009 | Cho et al. |
| 7,531,094 B2 | 5/2009 | McLaughlin et al. |
| 7,600,567 B2 | 10/2009 | Christopher et al. |
| 7,631,764 B2 | 12/2009 | Ginsberg et al. |
| 7,650,805 B2 | 1/2010 | Nauseda et al. |
| 7,674,477 B1 | 3/2010 | Schmid et al. |
| 7,706,128 B2 | 4/2010 | Bourcier |
| 7,732,301 B1 | 6/2010 | Pinnington et al. |
| 7,761,809 B2 | 7/2010 | Bukovec et al. |
| 7,786,086 B2 | 8/2010 | Reches et al. |
| 7,866,475 B2 | 1/2011 | Doskoczynski et al. |
| 7,875,293 B2 | 1/2011 | Shults et al. |
| 7,935,331 B2 | 5/2011 | Lin |
| 7,935,416 B2 | 5/2011 | Yang et al. |
| 7,943,167 B2 | 5/2011 | Kulkarni et al. |
| 7,960,708 B2 | 6/2011 | Wolfe et al. |

(56) References Cited

U.S. PATENT DOCUMENTS

| | | |
|---|---|---|
| 7,998,246 B2 | 8/2011 | Liu et al. |
| 8,109,893 B2 | 2/2012 | Lande |
| 8,147,599 B2 | 4/2012 | McAlister |
| 8,262,943 B2 | 9/2012 | Meng et al. |
| 8,278,106 B2 | 10/2012 | Martinson et al. |
| 8,308,702 B2 | 11/2012 | Batchvarova et al. |
| 8,316,865 B2 | 11/2012 | Ochs et al. |
| 8,329,476 B2 | 12/2012 | Pitkanen et al. |
| 8,354,296 B2 | 1/2013 | Dimitrakopoulos et al. |
| 8,361,321 B2 | 1/2013 | Stetson et al. |
| 8,449,504 B2 | 5/2013 | Carter et al. |
| 8,471,562 B2 | 6/2013 | Knizhnik |
| 8,475,689 B2 | 7/2013 | Sun et al. |
| 8,506,807 B2 | 8/2013 | Lee et al. |
| 8,512,669 B2 | 8/2013 | Hauck |
| 8,513,324 B2 | 8/2013 | Scales et al. |
| 8,535,726 B2 | 9/2013 | Dai et al. |
| 8,592,291 B2 | 11/2013 | Shi et al. |
| 8,617,411 B2 | 12/2013 | Singh |
| 8,666,471 B2 | 3/2014 | Rogers et al. |
| 8,686,249 B1 | 4/2014 | Whitaker et al. |
| 8,697,230 B2 | 4/2014 | Ago et al. |
| 8,698,481 B2 | 4/2014 | Lieber et al. |
| 8,715,329 B2 | 5/2014 | Robinson et al. |
| 8,721,074 B2 | 5/2014 | Pugh et al. |
| 8,734,421 B2 | 5/2014 | Sun et al. |
| 8,744,567 B2 | 6/2014 | Fassih et al. |
| 8,751,015 B2 | 6/2014 | Frewin et al. |
| 8,753,468 B2 | 6/2014 | Caldwell et al. |
| 8,759,153 B2 | 6/2014 | Elian et al. |
| 8,808,257 B2 | 8/2014 | Pugh et al. |
| 8,828,211 B2 | 9/2014 | Garaj et al. |
| 8,840,552 B2 | 9/2014 | Brauker et al. |
| 8,857,983 B2 | 10/2014 | Pugh et al. |
| 8,861,821 B2 | 10/2014 | Osumi |
| 8,894,201 B2 | 11/2014 | Pugh et al. |
| 8,940,552 B2 | 1/2015 | Pugh et al. |
| 8,950,862 B2 | 2/2015 | Pugh et al. |
| 8,974,055 B2 | 3/2015 | Pugh et al. |
| 8,975,121 B2 | 3/2015 | Pugh et al. |
| 8,979,978 B2 | 3/2015 | Miller et al. |
| 8,986,932 B2 | 3/2015 | Turner et al. |
| 8,993,234 B2 | 3/2015 | Turner et al. |
| 8,993,327 B2 | 3/2015 | McKnight et al. |
| 9,014,639 B2 | 4/2015 | Pugh et al. |
| 9,017,937 B1 | 4/2015 | Turner et al. |
| 9,023,220 B2 | 5/2015 | Zurutuza Elorza et al. |
| 9,028,663 B2 | 5/2015 | Stetson et al. |
| 9,035,282 B2 | 5/2015 | Dimitrakopoulos et al. |
| 9,045,847 B2 | 6/2015 | Batchvarova et al. |
| 9,050,452 B2 | 6/2015 | Sun et al. |
| 9,052,533 B2 | 6/2015 | Pugh et al. |
| 9,056,282 B2 | 6/2015 | Miller et al. |
| 9,062,180 B2 | 6/2015 | Scales et al. |
| 9,067,811 B1 | 6/2015 | Bennett et al. |
| 9,070,615 B2 | 6/2015 | Elian et al. |
| 9,075,009 B2 | 7/2015 | Kim et al. |
| 9,080,267 B2 | 7/2015 | Batchvarova et al. |
| 9,095,821 B1 | 8/2015 | Ratto et al. |
| 9,095,823 B2 | 8/2015 | Fleming |
| 9,096,050 B2 | 8/2015 | Bedell et al. |
| 9,096,437 B2 | 8/2015 | Tour et al. |
| 9,102,111 B2 | 8/2015 | Pugh et al. |
| 9,108,158 B2 | 8/2015 | Yu et al. |
| 9,110,310 B2 | 8/2015 | Pugh et al. |
| 9,125,715 B2 | 9/2015 | Pugh et al. |
| 9,134,546 B2 | 9/2015 | Pugh et al. |
| 9,156,700 B2 | 10/2015 | Zhamu et al. |
| 9,170,646 B2 | 10/2015 | Toner et al. |
| 9,185,486 B2 | 11/2015 | Pugh |
| 9,193,587 B2 | 11/2015 | Bennett |
| 9,195,075 B2 | 11/2015 | Pugh et al. |
| 9,225,375 B2 | 12/2015 | Pugh et al. |
| 9,388,048 B1 | 7/2016 | Zhou et al. |
| 9,425,709 B2 | 8/2016 | Hayashi et al. |
| 9,437,370 B2 | 9/2016 | Chen et al. |
| 9,463,421 B2 | 10/2016 | Fleming |
| 9,475,709 B2 | 10/2016 | Stetson et al. |
| 9,505,192 B2 | 11/2016 | Stoltenberg et al. |
| 9,545,600 B2 | 1/2017 | Miller et al. |
| 9,567,224 B2 * | 2/2017 | Bedworth ............ C01B 31/0484 |
| 9,572,918 B2 | 2/2017 | Bachmann et al. |
| 9,592,475 B2 | 3/2017 | Stoltenberg et al. |
| 9,610,546 B2 | 4/2017 | Sinton et al. |
| 9,656,214 B2 | 5/2017 | Miller et al. |
| 9,708,640 B2 | 7/2017 | Wu et al. |
| 9,713,794 B2 | 7/2017 | Choi et al. |
| 9,742,001 B2 | 8/2017 | Zhamu et al. |
| 9,870,895 B2 | 1/2018 | Bedworth |
| 10,017,852 B2 | 7/2018 | Heise et al. |
| 10,096,679 B1 | 10/2018 | Antunez et al. |
| 10,124,299 B2 | 11/2018 | Kim et al. |
| 10,130,919 B1 | 11/2018 | Saleh |
| 2001/0036556 A1 | 11/2001 | Jen |
| 2001/0047157 A1 | 11/2001 | Burnett et al. |
| 2001/0055597 A1 | 12/2001 | Liu et al. |
| 2002/0079004 A1 | 6/2002 | Sato et al. |
| 2002/0079054 A1 | 6/2002 | Nakatani |
| 2002/0104435 A1 | 8/2002 | Baker et al. |
| 2002/0115957 A1 | 8/2002 | Sun et al. |
| 2002/0117659 A1 | 8/2002 | Lieber et al. |
| 2002/0183682 A1 | 12/2002 | Darvish et al. |
| 2002/0183686 A1 | 12/2002 | Darvish et al. |
| 2003/0052354 A1 | 3/2003 | Dennison |
| 2003/0134281 A1 | 7/2003 | Evans |
| 2003/0138777 A1 | 7/2003 | Evans |
| 2003/0146221 A1 | 8/2003 | Lauer et al. |
| 2003/0159985 A1 | 8/2003 | Siwy et al. |
| 2003/0171053 A1 | 9/2003 | Sanders |
| 2004/0018583 A1 | 1/2004 | Ho et al. |
| 2004/0035787 A1 | 2/2004 | Tanga et al. |
| 2004/0061253 A1 | 4/2004 | Kleinmeyer et al. |
| 2004/0063097 A1 | 4/2004 | Evans |
| 2004/0099324 A1 | 5/2004 | Fraser et al. |
| 2004/0111968 A1 | 6/2004 | Day et al. |
| 2004/0112865 A1 | 6/2004 | McCullough et al. |
| 2004/0121488 A1 | 6/2004 | Chang et al. |
| 2004/0140041 A1 | 7/2004 | Glick |
| 2004/0142463 A1 | 7/2004 | Walker et al. |
| 2004/0185730 A1 | 9/2004 | Lambino et al. |
| 2004/0193043 A1 | 9/2004 | Duchon et al. |
| 2004/0199243 A1 | 10/2004 | Yodfat |
| 2004/0208796 A1 | 10/2004 | Chiga |
| 2004/0217036 A1 | 11/2004 | Ginsberg et al. |
| 2004/0241214 A1 | 12/2004 | Kirkwood et al. |
| 2004/0251136 A1 | 12/2004 | Lean et al. |
| 2005/0004508 A1 | 1/2005 | Sun et al. |
| 2005/0004509 A1 | 1/2005 | Sun et al. |
| 2005/0004550 A1 | 1/2005 | Sun et al. |
| 2005/0010161 A1 | 1/2005 | Sun et al. |
| 2005/0010192 A1 | 1/2005 | Sun et al. |
| 2005/0015042 A1 | 1/2005 | Sun et al. |
| 2005/0053563 A1 | 3/2005 | Manissier et al. |
| 2005/0112078 A1 | 5/2005 | Boddupalli et al. |
| 2005/0126966 A1 | 6/2005 | Tanida et al. |
| 2005/0129633 A1 | 6/2005 | Lin |
| 2005/0148996 A1 | 7/2005 | Sun et al. |
| 2005/0170089 A1 | 8/2005 | Lashmore et al. |
| 2005/0189673 A1 | 9/2005 | Klug et al. |
| 2005/0226834 A1 | 10/2005 | Lambino et al. |
| 2005/0238730 A1 | 10/2005 | Le Fur et al. |
| 2006/0005381 A1 | 1/2006 | Nishi et al. |
| 2006/0036332 A1 | 2/2006 | Jennings |
| 2006/0073370 A1 | 4/2006 | Krusic et al. |
| 2006/0093885 A1 | 5/2006 | Krusic et al. |
| 2006/0121279 A1 | 6/2006 | Petrik |
| 2006/0151382 A1 | 7/2006 | Petrik |
| 2006/0166347 A1 | 7/2006 | Faulstich et al. |
| 2006/0180604 A1 | 8/2006 | Ginsberg et al. |
| 2006/0222701 A1 | 10/2006 | Kulkarni et al. |
| 2006/0253078 A1 | 11/2006 | Wu et al. |
| 2007/0004640 A1 | 1/2007 | Lin et al. |
| 2007/0032054 A1 | 2/2007 | Ramaswamy et al. |
| 2007/0056894 A1 | 3/2007 | Connors, Jr. |

(56) References Cited

U.S. PATENT DOCUMENTS

| | | |
|---|---|---|
| 2007/0060862 A1 | 3/2007 | Sun et al. |
| 2007/0062856 A1 | 3/2007 | Pahl et al. |
| 2007/0099813 A1 | 5/2007 | Luizzi et al. |
| 2007/0131646 A1 | 6/2007 | Donnelly et al. |
| 2007/0284279 A1 | 12/2007 | Doskoczynski et al. |
| 2008/0017564 A1 | 1/2008 | Hammond |
| 2008/0035484 A1 | 2/2008 | Wu et al. |
| 2008/0035541 A1 | 2/2008 | Franzreb et al. |
| 2008/0045877 A1 | 2/2008 | Levin et al. |
| 2008/0061477 A1 | 3/2008 | Capizzo |
| 2008/0063585 A1 | 3/2008 | Smalley et al. |
| 2008/0081323 A1 | 4/2008 | Keeley et al. |
| 2008/0081362 A1 | 4/2008 | Keeley et al. |
| 2008/0149561 A1 | 6/2008 | Chu et al. |
| 2008/0156648 A1 | 7/2008 | Dudziak et al. |
| 2008/0170982 A1 | 7/2008 | Zhang et al. |
| 2008/0185293 A1 | 8/2008 | Klose et al. |
| 2008/0188836 A1 | 8/2008 | Weber et al. |
| 2008/0190508 A1 | 8/2008 | Booth et al. |
| 2008/0241085 A1 | 10/2008 | Lin et al. |
| 2008/0268016 A1 | 10/2008 | Fang et al. |
| 2008/0290020 A1 | 11/2008 | Marand et al. |
| 2008/0290111 A1 | 11/2008 | Ginsberg et al. |
| 2009/0023572 A1 | 1/2009 | Backes et al. |
| 2009/0032475 A1 | 2/2009 | Ferrer et al. |
| 2009/0039019 A1 | 2/2009 | Raman |
| 2009/0048685 A1 | 2/2009 | Frigstad et al. |
| 2009/0075371 A1 | 3/2009 | Keeley et al. |
| 2009/0078640 A1 | 3/2009 | Chu et al. |
| 2009/0087395 A1 | 4/2009 | Lin et al. |
| 2009/0117335 A1 | 5/2009 | Iyoda et al. |
| 2009/0120873 A1 | 5/2009 | Becker et al. |
| 2009/0148495 A1 | 6/2009 | Hammer et al. |
| 2009/0176159 A1 | 7/2009 | Zhamu et al. |
| 2009/0222072 A1 | 9/2009 | Robinson et al. |
| 2009/0236295 A1 | 9/2009 | Braun et al. |
| 2009/0241242 A1 | 10/2009 | Beatty et al. |
| 2009/0283475 A1 | 11/2009 | Hylton et al. |
| 2009/0291270 A1 | 11/2009 | Zettl et al. |
| 2009/0294300 A1 | 12/2009 | Kanzius et al. |
| 2009/0306364 A1 | 12/2009 | Beer et al. |
| 2010/0000754 A1 | 1/2010 | Mann et al. |
| 2010/0009194 A1* | 1/2010 | Iskanderova ............ B29C 59/16 428/409 |
| 2010/0016778 A1 | 1/2010 | Chattopadhyay |
| 2010/0021708 A1 | 1/2010 | Kong et al. |
| 2010/0024722 A1 | 2/2010 | Ochs et al. |
| 2010/0024838 A1 | 2/2010 | Ochs et al. |
| 2010/0025330 A1 | 2/2010 | Ratto et al. |
| 2010/0055464 A1 | 3/2010 | Sung |
| 2010/0059378 A1 | 3/2010 | Elson et al. |
| 2010/0072643 A1 | 3/2010 | Pugh et al. |
| 2010/0076553 A1 | 3/2010 | Pugh et al. |
| 2010/0098741 A1 | 4/2010 | Ranade |
| 2010/0105834 A1 | 4/2010 | Tour et al. |
| 2010/0110372 A1 | 5/2010 | Pugh et al. |
| 2010/0124564 A1 | 5/2010 | Martinson et al. |
| 2010/0127312 A1 | 5/2010 | Grebel et al. |
| 2010/0161014 A1 | 6/2010 | Lynch et al. |
| 2010/0167551 A1 | 7/2010 | Dedontney |
| 2010/0196439 A1 | 8/2010 | Beck et al. |
| 2010/0209330 A1 | 8/2010 | Golzhauser et al. |
| 2010/0209515 A1 | 8/2010 | Chantalat et al. |
| 2010/0213079 A1 | 8/2010 | Willis |
| 2010/0224555 A1 | 9/2010 | Hoek et al. |
| 2010/0228204 A1 | 9/2010 | Beatty et al. |
| 2010/0233781 A1 | 9/2010 | Bangera et al. |
| 2010/0249273 A1 | 9/2010 | Scales et al. |
| 2010/0258111 A1 | 10/2010 | Shah et al. |
| 2010/0323177 A1 | 12/2010 | Ruoff et al. |
| 2010/0327847 A1 | 12/2010 | Leiber et al. |
| 2011/0014217 A1 | 1/2011 | Fahmy et al. |
| 2011/0027599 A1 | 2/2011 | Hoek et al. |
| 2011/0037033 A1 | 2/2011 | Green et al. |
| 2011/0041519 A1 | 2/2011 | McAlister |
| 2011/0041687 A1 | 2/2011 | Diaz et al. |
| 2011/0045523 A1 | 2/2011 | Strano et al. |
| 2011/0054418 A1 | 3/2011 | Pugh et al. |
| 2011/0054576 A1 | 3/2011 | Robinson et al. |
| 2011/0056892 A1 | 3/2011 | Lancaster |
| 2011/0073563 A1 | 3/2011 | Chang et al. |
| 2011/0092054 A1 | 4/2011 | Seo et al. |
| 2011/0092949 A1 | 4/2011 | Wang |
| 2011/0100921 A1 | 5/2011 | Heinrich |
| 2011/0112484 A1 | 5/2011 | Carter et al. |
| 2011/0118655 A1 | 5/2011 | Fassih et al. |
| 2011/0120970 A1 | 5/2011 | Joo et al. |
| 2011/0124253 A1 | 5/2011 | Shah et al. |
| 2011/0132834 A1 | 6/2011 | Tomioka et al. |
| 2011/0139707 A1 | 6/2011 | Siwy et al. |
| 2011/0152795 A1 | 6/2011 | Aledo et al. |
| 2011/0186449 A1 | 8/2011 | Clochard et al. |
| 2011/0189440 A1 | 8/2011 | Appleby et al. |
| 2011/0201201 A1 | 8/2011 | Arnold et al. |
| 2011/0202201 A1 | 8/2011 | Matsubara |
| 2011/0253630 A1 | 10/2011 | Bakajin et al. |
| 2011/0258791 A1 | 10/2011 | Batchvarova et al. |
| 2011/0258796 A1 | 10/2011 | Batchvarova et al. |
| 2011/0262645 A1 | 10/2011 | Batchvarova et al. |
| 2011/0263912 A1 | 10/2011 | Miller et al. |
| 2011/0269920 A1 | 11/2011 | Min et al. |
| 2012/0000845 A1 | 1/2012 | Park et al. |
| 2012/0031833 A1 | 2/2012 | Ho et al. |
| 2012/0048804 A1 | 3/2012 | Stetson et al. |
| 2012/0115243 A1 | 5/2012 | Pitkanen et al. |
| 2012/0116228 A1 | 5/2012 | Okubo |
| 2012/0145548 A1 | 6/2012 | Sivan et al. |
| 2012/0148633 A1 | 6/2012 | Sun et al. |
| 2012/0162600 A1 | 6/2012 | Pugh et al. |
| 2012/0183738 A1 | 7/2012 | Zettl et al. |
| 2012/0186850 A1 | 7/2012 | Sugiyama et al. |
| 2012/0211367 A1 | 8/2012 | Vecitis |
| 2012/0218508 A1 | 8/2012 | Pugh et al. |
| 2012/0219203 A1 | 8/2012 | Adachi |
| 2012/0220053 A1 | 8/2012 | Lee et al. |
| 2012/0234453 A1 | 9/2012 | Pugh et al. |
| 2012/0234679 A1 | 9/2012 | Garaj et al. |
| 2012/0235277 A1 | 9/2012 | Pugh et al. |
| 2012/0236254 A1 | 9/2012 | Pugh et al. |
| 2012/0236524 A1 | 9/2012 | Pugh et al. |
| 2012/0241371 A1 | 9/2012 | Revanur et al. |
| 2012/0242953 A1 | 9/2012 | Pugh et al. |
| 2012/0255899 A1 | 10/2012 | Choi et al. |
| 2012/0267337 A1 | 10/2012 | Striemer et al. |
| 2012/0292245 A1 | 11/2012 | Saito |
| 2012/0294793 A1 | 11/2012 | Chen et al. |
| 2012/0298396 A1 | 11/2012 | Hong et al. |
| 2012/0301707 A1 | 11/2012 | Kinloch et al. |
| 2013/0015136 A1 | 1/2013 | Bennett |
| 2013/0034760 A1 | 2/2013 | Otts et al. |
| 2013/0045523 A1 | 2/2013 | Leach et al. |
| 2013/0056367 A1 | 3/2013 | Martinez et al. |
| 2013/0071941 A1 | 3/2013 | Miller |
| 2013/0096292 A1 | 4/2013 | Brahmasandra et al. |
| 2013/0100436 A1 | 4/2013 | Jackson et al. |
| 2013/0105417 A1 | 5/2013 | Stetson et al. |
| 2013/0108839 A1 | 5/2013 | Arnold et al. |
| 2013/0116541 A1 | 5/2013 | Gracias et al. |
| 2013/0131214 A1 | 5/2013 | Scales et al. |
| 2013/0135578 A1 | 5/2013 | Pugh et al. |
| 2013/0146221 A1 | 6/2013 | Kolmakov et al. |
| 2013/0146480 A1 | 6/2013 | Garaj et al. |
| 2013/0152386 A1 | 6/2013 | Pandojirao-S et al. |
| 2013/0174968 A1 | 7/2013 | Vlassiouk et al. |
| 2013/0174978 A1 | 7/2013 | Pugh et al. |
| 2013/0176030 A1 | 7/2013 | Simon |
| 2013/0190476 A1 | 7/2013 | Lancaster et al. |
| 2013/0192460 A1 | 8/2013 | Miller et al. |
| 2013/0192461 A1 | 8/2013 | Miller et al. |
| 2013/0194540 A1 | 8/2013 | Pugh et al. |
| 2013/0213568 A1 | 8/2013 | Pugh et al. |
| 2013/0215377 A1 | 8/2013 | Pugh et al. |
| 2013/0215378 A1 | 8/2013 | Pugh et al. |
| 2013/0215380 A1 | 8/2013 | Pugh et al. |

(56) References Cited

U.S. PATENT DOCUMENTS

| | | |
|---|---|---|
| 2013/0216581 A1 | 8/2013 | Fahmy et al. |
| 2013/0240355 A1 | 9/2013 | Ho et al. |
| 2013/0240437 A1 | 9/2013 | Rodrigues et al. |
| 2013/0248097 A1 | 9/2013 | Ploss, Jr. |
| 2013/0248367 A1 | 9/2013 | Stetson et al. |
| 2013/0249147 A1* | 9/2013 | Bedworth ............ C01B 31/0484 264/483 |
| 2013/0256118 A1 | 10/2013 | Meller et al. |
| 2013/0256139 A1 | 10/2013 | Peng |
| 2013/0256154 A1 | 10/2013 | Peng |
| 2013/0256210 A1 | 10/2013 | Fleming |
| 2013/0256211 A1 | 10/2013 | Fleming |
| 2013/0261568 A1 | 10/2013 | Martinson et al. |
| 2013/0269819 A1 | 10/2013 | Ruby et al. |
| 2013/0270188 A1 | 10/2013 | Karnik et al. |
| 2013/0273288 A1 | 10/2013 | Luo et al. |
| 2013/0277305 A1 | 10/2013 | Stetson et al. |
| 2013/0277573 A1 | 10/2013 | Miller et al. |
| 2013/0284665 A1 | 10/2013 | Lee et al. |
| 2013/0295150 A1 | 11/2013 | Chantalat et al. |
| 2013/0295374 A1 | 11/2013 | Tang et al. |
| 2013/0309776 A1 | 11/2013 | Drndic et al. |
| 2013/0317131 A1 | 11/2013 | Scales et al. |
| 2013/0317132 A1 | 11/2013 | Scales et al. |
| 2013/0317133 A1 | 11/2013 | Scales et al. |
| 2013/0323295 A1 | 12/2013 | Scales et al. |
| 2013/0330833 A1 | 12/2013 | Ruiz et al. |
| 2013/0335092 A1 | 12/2013 | Wu |
| 2013/0338611 A1 | 12/2013 | Pugh et al. |
| 2013/0338744 A1 | 12/2013 | Frewn et al. |
| 2014/0002788 A1 | 1/2014 | Otts et al. |
| 2014/0005514 A1 | 1/2014 | Pugh et al. |
| 2014/0015160 A1 | 1/2014 | Kung et al. |
| 2014/0017322 A1 | 1/2014 | Dai et al. |
| 2014/0021133 A1 | 1/2014 | Siwy et al. |
| 2014/0030482 A1 | 1/2014 | Miller et al. |
| 2014/0048411 A1 | 2/2014 | Choi et al. |
| 2014/0066958 A1 | 3/2014 | Priewe |
| 2014/0079936 A1 | 3/2014 | Russo et al. |
| 2014/0093728 A1 | 4/2014 | Shah et al. |
| 2014/0128891 A1 | 5/2014 | Astani-Matthies et al. |
| 2014/0141521 A1 | 5/2014 | Peng et al. |
| 2014/0151288 A1 | 6/2014 | Miller et al. |
| 2014/0151631 A1 | 6/2014 | Duesberg et al. |
| 2014/0154464 A1 | 6/2014 | Miller et al. |
| 2014/0170195 A1 | 6/2014 | Fassih et al. |
| 2014/0171541 A1 | 6/2014 | Scales et al. |
| 2014/0174927 A1 | 6/2014 | Bashir et al. |
| 2014/0190004 A1 | 7/2014 | Riall et al. |
| 2014/0190550 A1 | 7/2014 | Loh et al. |
| 2014/0190676 A1 | 7/2014 | Zhamu et al. |
| 2014/0190833 A1* | 7/2014 | Lieber .................... B82Y 30/00 204/627 |
| 2014/0192313 A1 | 7/2014 | Riall et al. |
| 2014/0192314 A1 | 7/2014 | Riall et al. |
| 2014/0199777 A2 | 7/2014 | Ruiz et al. |
| 2014/0209539 A1 | 7/2014 | El Badawi et al. |
| 2014/0212596 A1 | 7/2014 | Jahangiri-Famenini |
| 2014/0230653 A1 | 8/2014 | Yu et al. |
| 2014/0230733 A1 | 8/2014 | Miller |
| 2014/0231351 A1 | 8/2014 | Wckramasinghe et al. |
| 2014/0248621 A1 | 9/2014 | Collins |
| 2014/0253131 A1 | 9/2014 | Liu et al. |
| 2014/0257348 A1 | 9/2014 | Priewe et al. |
| 2014/0257515 A1 | 9/2014 | So et al. |
| 2014/0257517 A1 | 9/2014 | Deichmann et al. |
| 2014/0259657 A1 | 9/2014 | Riall et al. |
| 2014/0261999 A1 | 9/2014 | Stetson et al. |
| 2014/0263035 A1 | 9/2014 | Stoltenberg et al. |
| 2014/0263178 A1 | 9/2014 | Sinton et al. |
| 2014/0264977 A1 | 9/2014 | Pugh et al. |
| 2014/0268015 A1 | 9/2014 | Riall et al. |
| 2014/0268020 A1 | 9/2014 | Pugh et al. |
| 2014/0268021 A1 | 9/2014 | Pugh et al. |
| 2014/0268026 A1 | 9/2014 | Pugh et al. |
| 2014/0272286 A1 | 9/2014 | Stoltenberg et al. |
| 2014/0272522 A1 | 9/2014 | Pugh et al. |
| 2014/0273315 A1 | 9/2014 | Pugh et al. |
| 2014/0273316 A1 | 9/2014 | Pugh et al. |
| 2014/0276481 A1 | 9/2014 | Pugh et al. |
| 2014/0276999 A1 | 9/2014 | Harms et al. |
| 2014/0306361 A1 | 10/2014 | Pugh et al. |
| 2014/0308681 A1 | 10/2014 | Strano et al. |
| 2014/0311967 A1 | 10/2014 | Grossman et al. |
| 2014/0315213 A1 | 10/2014 | Nagrath et al. |
| 2014/0318373 A1 | 10/2014 | Wood et al. |
| 2014/0322518 A1 | 10/2014 | Addleman et al. |
| 2014/0333892 A1 | 11/2014 | Pugh et al. |
| 2014/0335661 A1 | 11/2014 | Pugh et al. |
| 2014/0343580 A1 | 11/2014 | Priewe |
| 2014/0346081 A1 | 11/2014 | Sowden et al. |
| 2014/0346631 A1 | 11/2014 | Karim et al. |
| 2014/0349892 A1 | 11/2014 | Van Der Zaag et al. |
| 2014/0350372 A1 | 11/2014 | Pugh et al. |
| 2014/0377651 A1 | 12/2014 | Kwon et al. |
| 2014/0377738 A1 | 12/2014 | Bachmann et al. |
| 2015/0015843 A1 | 1/2015 | Pugh et al. |
| 2015/0017918 A1 | 1/2015 | Pugh et al. |
| 2015/0050734 A1 | 2/2015 | Liedtke et al. |
| 2015/0053627 A1 | 2/2015 | Silin et al. |
| 2015/0057762 A1 | 2/2015 | Harms et al. |
| 2015/0061990 A1 | 3/2015 | Toner et al. |
| 2015/0062533 A1 | 3/2015 | Toner et al. |
| 2015/0063605 A1 | 3/2015 | Pugh |
| 2015/0066063 A1 | 3/2015 | Priewe |
| 2015/0075667 A1 | 3/2015 | McHugh et al. |
| 2015/0076056 A1 | 3/2015 | Iyuke et al. |
| 2015/0077658 A1 | 3/2015 | Pugh et al. |
| 2015/0077659 A1 | 3/2015 | Pugh et al. |
| 2015/0077660 A1 | 3/2015 | Pugh et al. |
| 2015/0077661 A1 | 3/2015 | Pugh et al. |
| 2015/0077662 A1 | 3/2015 | Pugh et al. |
| 2015/0077663 A1 | 3/2015 | Pugh et al. |
| 2015/0077699 A1 | 3/2015 | De Sio et al. |
| 2015/0077702 A9 | 3/2015 | Pugh et al. |
| 2015/0079683 A1 | 3/2015 | Yager et al. |
| 2015/0087249 A1 | 3/2015 | Pugh et al. |
| 2015/0096935 A1 | 4/2015 | Mitra et al. |
| 2015/0098910 A1 | 4/2015 | Mordas et al. |
| 2015/0101931 A1 | 4/2015 | Garaj et al. |
| 2015/0105686 A1 | 4/2015 | Vasan |
| 2015/0118318 A1 | 4/2015 | Fahmy et al. |
| 2015/0122727 A1 | 5/2015 | Karnik et al. |
| 2015/0137817 A1 | 5/2015 | Wilson et al. |
| 2015/0138454 A1 | 5/2015 | Pugh et al. |
| 2015/0142107 A1 | 5/2015 | Pugh et al. |
| 2015/0145155 A1 | 5/2015 | Pugh et al. |
| 2015/0146162 A1 | 5/2015 | Pugh et al. |
| 2015/0147474 A1 | 5/2015 | Batchvarova et al. |
| 2015/0151254 A1 | 6/2015 | Perez |
| 2015/0170788 A1 | 6/2015 | Miller et al. |
| 2015/0174253 A1 | 6/2015 | Sun et al. |
| 2015/0174254 A1 | 6/2015 | Sun et al. |
| 2015/0182473 A1 | 7/2015 | Bosnyak et al. |
| 2015/0185180 A1 | 7/2015 | Ruhl et al. |
| 2015/0196579 A1 | 7/2015 | Ferrante et al. |
| 2015/0196879 A1 | 7/2015 | Brinke-Seiferth et al. |
| 2015/0202351 A1 | 7/2015 | Kaplan et al. |
| 2015/0212339 A1 | 7/2015 | Pugh et al. |
| 2015/0217219 A1 | 8/2015 | Sinsabaugh et al. |
| 2015/0218210 A1 | 8/2015 | Stetson et al. |
| 2015/0221474 A1 | 8/2015 | Bedworth |
| 2015/0231557 A1 | 8/2015 | Miller et al. |
| 2015/0231577 A1 | 8/2015 | Nair et al. |
| 2015/0247178 A1 | 9/2015 | Mountcastle et al. |
| 2015/0248972 A1 | 9/2015 | Tang et al. |
| 2015/0258254 A1 | 9/2015 | Simon et al. |
| 2015/0258498 A1 | 9/2015 | Simon et al. |
| 2015/0258502 A1 | 9/2015 | Turowski |
| 2015/0258503 A1 | 9/2015 | Sinton et al. |
| 2015/0258506 A1 | 9/2015 | Mi et al. |
| 2015/0258525 A1 | 9/2015 | Westman et al. |
| 2015/0268150 A1 | 9/2015 | Newkirk et al. |
| 2015/0272834 A1 | 10/2015 | Sun et al. |

(56) References Cited

U.S. PATENT DOCUMENTS

| | | |
|---|---|---|
| 2015/0272896 A1 | 10/2015 | Sun et al. |
| 2015/0273401 A1 | 10/2015 | Miller et al. |
| 2015/0309337 A1 | 10/2015 | Flitsch et al. |
| 2015/0321147 A1 | 11/2015 | Fleming et al. |
| 2015/0321149 A1 | 11/2015 | McGinnis |
| 2015/0323811 A1 | 11/2015 | Flitsch et al. |
| 2015/0336202 A1 | 11/2015 | Bedworth et al. |
| 2015/0342900 A1 | 12/2015 | Putnins |
| 2015/0346382 A1 | 12/2015 | Bliven et al. |
| 2015/0351887 A1 | 12/2015 | Peters |
| 2015/0359742 A1 | 12/2015 | Fassih et al. |
| 2015/0376448 A1 | 12/2015 | Urs |
| 2015/0378176 A1 | 12/2015 | Flitsch et al. |
| 2016/0009049 A1 | 1/2016 | Stoltenberg et al. |
| 2016/0038885 A1 | 2/2016 | Hogen-Esch et al. |
| 2016/0043384 A1 | 2/2016 | Zhamu et al. |
| 2016/0058932 A1 | 3/2016 | Stetson et al. |
| 2016/0059190 A1 | 3/2016 | Yoo et al. |
| 2016/0067390 A1 | 3/2016 | Simon et al. |
| 2016/0074814 A1 | 3/2016 | Park et al. |
| 2016/0074815 A1 | 3/2016 | Sinton et al. |
| 2016/0084008 A1 | 3/2016 | Faircloth et al. |
| 2016/0084981 A1 | 3/2016 | Kayano et al. |
| 2016/0116237 A1 | 4/2016 | Alsadah et al. |
| 2016/0256805 A1 | 9/2016 | Grein et al. |
| 2016/0272499 A1 | 9/2016 | Zurutuza Elorza et al. |
| 2016/0282326 A1 | 9/2016 | Waduge et al. |
| 2016/0284811 A1 | 9/2016 | Yu et al. |
| 2016/0339160 A1 | 11/2016 | Bedworth et al. |
| 2017/0000937 A1 | 1/2017 | Gottschalk |
| 2017/0028640 A1 | 2/2017 | Harrison et al. |
| 2017/0032962 A1 | 2/2017 | Zurutuza Elorza et al. |
| 2017/0035943 A1 | 2/2017 | Simon et al. |
| 2017/0036916 A1 | 2/2017 | Bedworth et al. |
| 2017/0037356 A1 | 2/2017 | Simon et al. |
| 2017/0057812 A1 | 3/2017 | Zurutuza Elorza et al. |
| 2017/0065939 A1 | 3/2017 | Kim et al. |
| 2017/0144107 A1 | 5/2017 | Garaj et al. |
| 2017/0202885 A1 | 7/2017 | Agulnick |
| 2017/0216923 A1 | 8/2017 | Babenko et al. |
| 2017/0217777 A1 | 8/2017 | Hong et al. |
| 2017/0239623 A1 | 8/2017 | Stoltenberg et al. |
| 2017/0296972 A1 | 10/2017 | Sinton et al. |
| 2017/0296976 A1 | 10/2017 | Liu et al. |
| 2017/0296979 A1 | 10/2017 | Swett et al. |
| 2018/0147542 A1 | 5/2018 | Jhon et al. |
| 2018/0207591 A1 | 7/2018 | Yu et al. |

FOREIGN PATENT DOCUMENTS

| | | |
|---|---|---|
| CN | 1128501 A | 8/1996 |
| CN | 101108194 A | 1/2008 |
| CN | 101243544 | 8/2008 |
| CN | 101428198 A | 5/2009 |
| CN | 101489653 A | 7/2009 |
| CN | 101996853 | 3/2011 |
| CN | 102242062 A | 11/2011 |
| CN | 102344132 | 2/2012 |
| CN | 102423272 | 4/2012 |
| CN | 102592720 A | 7/2012 |
| CN | 101996853 B | 8/2012 |
| CN | 102637584 A | 8/2012 |
| CN | 103153441 | 6/2013 |
| CN | 103182249 A | 7/2013 |
| CN | 203235358 | 10/2013 |
| CN | 103480281 | 1/2014 |
| CN | 103585891 | 2/2014 |
| CN | 103603706 A | 2/2014 |
| DE | 19536560 | 3/1997 |
| DE | 10 2005 049 388 A1 | 4/2007 |
| EP | 0 364 628 A1 | 4/1990 |
| EP | 1 034 251 | 1/2004 |
| EP | 1 777 250 A1 | 4/2007 |
| EP | 1 872 812 | 1/2008 |
| EP | 2 060 286 | 5/2009 |
| EP | 2 107 120 A1 | 10/2009 |
| EP | 2 230 511 A1 | 9/2010 |
| EP | 1 603 609 | 5/2011 |
| EP | 2 354 272 | 8/2011 |
| EP | 2 450 096 | 5/2012 |
| EP | 2 489 520 | 8/2012 |
| EP | 2 511 002 | 10/2012 |
| EP | 2 586 473 | 5/2013 |
| EP | 2 679 540 | 1/2014 |
| EP | 2 937 313 | 10/2015 |
| EP | 2 995 368 A1 | 3/2016 |
| EP | 3 070 053 | 9/2016 |
| EP | 3 084 398 | 10/2016 |
| EP | 1 538 2430.5 | 3/2017 |
| EP | 3 135 631 | 3/2017 |
| JP | 59-102111 | 7/1984 |
| JP | 10-510471 | 5/1995 |
| JP | 7504120 | 5/1995 |
| JP | 2001-232158 | 8/2001 |
| JP | 2002-126510 | 5/2002 |
| JP | 2004-179014 | 6/2004 |
| JP | 2005-126966 | 5/2005 |
| JP | 2006-188393 | 7/2006 |
| JP | 2006-262891 A | 10/2006 |
| JP | 2009-291777 | 12/2009 |
| JP | 2011-168448 A | 9/2011 |
| JP | 2011-241479 | 12/2011 |
| JP | 2012-500708 | 1/2012 |
| JP | 2004-202480 | 7/2014 |
| JP | 2015-503405 | 2/2015 |
| JP | 2016-175828 | 10/2016 |
| KR | 102011008411 | 7/2011 |
| KR | 10-2012-0022164 A | 3/2012 |
| KR | 1020120022164 A | 3/2012 |
| KR | 1020140002570 | 1/2014 |
| WO | WO-93/33901 | 3/1993 |
| WO | WO-93/12859 | 8/1993 |
| WO | WO-95/00231 | 1/1995 |
| WO | WO-97/12664 A1 | 4/1997 |
| WO | WO-98/30501 A2 | 7/1998 |
| WO | WO-00/70012 | 11/2000 |
| WO | WO-02/055539 A1 | 7/2002 |
| WO | WO-2013/115762 | 8/2003 |
| WO | WO-2004/009840 A1 | 1/2004 |
| WO | WO-2004/082733 | 9/2004 |
| WO | WO-2005/047857 A2 | 5/2005 |
| WO | WO-2007/103411 A2 | 9/2007 |
| WO | WO-2007/140252 A1 | 12/2007 |
| WO | WO-2008/008533 | 1/2008 |
| WO | WO-2009/129984 A1 | 10/2009 |
| WO | WO-2010/006080 | 1/2010 |
| WO | WO-2010/115904 A1 | 10/2010 |
| WO | WO-2011/019686 A1 | 2/2011 |
| WO | WO-2011/046706 A1 | 4/2011 |
| WO | WO-2011/001674 | 6/2011 |
| WO | WO-2011/063458 A1 | 6/2011 |
| WO | WO-2011/075158 | 6/2011 |
| WO | WO-2011/094204 A2 | 8/2011 |
| WO | WO-2011/100458 A2 | 8/2011 |
| WO | WO-2011/138689 A2 | 11/2011 |
| WO | WO-2012/006657 A1 | 1/2012 |
| WO | WO-2012/021801 A2 | 2/2012 |
| WO | WO-2012/027148 A1 | 3/2012 |
| WO | WO-2012/028695 | 3/2012 |
| WO | WO-2012/030368 A1 | 3/2012 |
| WO | WO-2012/125770 | 3/2012 |
| WO | WO-2012/073998 A1 | 6/2012 |
| WO | WO-2012/138671 A2 | 10/2012 |
| WO | WO-2012/142852 A1 | 10/2012 |
| WO | WO-2013/016445 A1 | 1/2013 |
| WO | WO-2013/048063 A1 | 4/2013 |
| WO | WO-2013/138137 A1 | 9/2013 |
| WO | WO-2013/138698 A1 | 9/2013 |
| WO | WO-2013/151799 | 10/2013 |
| WO | WO-2013/152179 A1 | 10/2013 |
| WO | WO-2014/038600 A1 | 3/2014 |
| WO | WO-2014/084856 | 6/2014 |
| WO | WO-2014/084861 A1 | 6/2014 |
| WO | WO-2014/168629 A1 | 10/2014 |

(56) References Cited

FOREIGN PATENT DOCUMENTS

| WO | PCT/US2015/018114 | 2/2015 |
|---|---|---|
| WO | WO-2015/030698 A1 | 3/2015 |
| WO | PCT/US2015/028948 | 5/2015 |
| WO | WO-2015/110277 | 7/2015 |
| WO | WO-2015/138736 A1 | 9/2015 |
| WO | WO-2015/138752 A1 | 9/2015 |
| WO | WO-2015/1138771 A1 | 9/2015 |
| WO | WO-2015/197217 | 12/2015 |
| WO | WO-2016/102003 | 6/2016 |

OTHER PUBLICATIONS

Drilling Nanopores in Graphene with Clusters: A Molecular Dynamics StudyShijun Zhao, Jianming Xue, Li Liang, Yugang Wang, and Sha YanThe Journal of Physical Chemistry C 2012 116 (21), 11776-11782DOI: 10.1021/jp3023293 (Year: 2012).*
U.S. Notice of Allowance in U.S. Appl. No. 14/610,770, dated Jan. 23, 2017.
U.S. Notice of Allowance in U.S. Appl. No. 14/856,198, dated Feb. 10, 2017.
U.S. Notice of Allowance in U.S. Appl. No. 14/856,198, dated Mar. 1, 2017.
U.S. Office Action in U.S. Appl. No. 14/609,325, dated Feb. 16, 2017.
U.S. Office Action in U.S. Appl. No. 14/193,007, dated Mar. 23, 2017.
U.S. Office Action in U.S. Appl. No. 14/656,580, dated Feb. 9, 2017.
U.S. Office Action in U.S. Appl. No. 14/843,944, dated Jan. 6, 2017.
U.S. Office Action in U.S. Appl. No. 15/099,464, dated Mar. 10, 2017.
Adiga et al., "Nanoporous Materials for Biomedical Devices," JOM 60: 26-32 (Mar. 25, 2008).
AMI Applied Membranes Inc. (undated). FilmTec Nanofiltration Membrane Elements. Retrieved Jun. 1, 2016, from http://www.appliedmembranes.com/filmtec-nanofiltration-membrane-elements.html.
Apel, "Track etching technique in membrane technology," Radiation Measurements 34(1-6): 559-566 (Jun. 2001).
Bae et al., "Roll-to-roll production of 30-inch graphene films for transparent electrodes," Nature Nanotechnology 5: 574-578 (Jun. 20, 2010).
Bai et al., "Graphene nanomesh," Nature Nanotechnology 5: 190-194 (Feb. 14, 2010).
Baker. (2004). "Track-etch Membranes." In Membrane Technology and Applications (2nd ed., pp. 92-94). West Sussex, England: John Wiley & Sons.
Butler et al. "Progress, Challenges, and Opportunities in Two-Dimensional Materials Beyond Graphene", Materials Review 7(4): 2898-2926 (Mar. 6, 2013).
Chhowalla et al., "The chemistry of two-dimensional layered transition metal dichalcogenide nanosheets," Nature Chemistry 5: 263-275 (Mar. 20, 2013).
Childres et al., "Effect of oxygen plasma etching on graphene studied using Raman spectroscopy and electronic transport measurements," New Journal of Physics 13 (Feb. 10, 2011).
Clochard. (undated). Radiografted track-etched polymer membranes for research and application [Scholarly project]. In Laboratoire Des Solides Irradiés. Retrieved Jun. 2, 2016, from http://iramis.cea.fr/radiolyse/5juin2015/Clochard.pdf.
Cohen-Tanugi et al, "Water Desalination across Nanoporous Graphene," ACS Nano Letters 12(7): 3602-3608 (Jun. 5, 2012).
Cohen-Tanugi, "Nanoporous graphene as a water desalination membrane," Thesis: Ph.D., Massachusetts Institute of Technology, Department of Materials Science and Engineering (Jun. 2015).
Colton, "Implantable biohybrid artificial organs," Cell Transplantation 4(4): 415-436 (Jul.-Aug. 1995).
Desai et al., "Nanoporous microsystems for islet cell replacement," Advanced Drug Delivery Reviews 56: 1661-1673 (Jul. 23, 2004).

Fischbein et al., "Electron beam nanosculpting of suspended graphene sheets," Applied Physics Letters 93(113107): 1-3, (Sep. 16, 2008).
Fissell et al., "High-Performance Silicon Nanopore Hemofiltration Membranes," NIH-PA Author Manuscript, PMC, (Jan. 5, 2010), also published in J. Memb. Sci. 326(1): 58-63 (Jan. 5, 2009).
Gimi et al., "A Nanoporous, Transparent Microcontainer for Encapsulated Islet Therapy," J. Diabetes Sci. Tech. 3(2): 1-7 (Mar. 2009).
International Search Report dated Dec. 4, 2015, in related international application PCT/US2015/048205.
International Search Report dated Jun. 10, 2015, from related international application PCT/US15/20201.
Jiang et al., "Porous Graphene as the Ultimate Membrane for Gas Separation," Nano Letters 9(12): 4019-4024 (Sep. 23, 2009).
Joshi et al., "Precise and ultrafast molecular sieving through graphene oxide membranes", Science 343(6172): 752-754 (Feb. 14, 2014).
Kanani et al., "Permeability—Selectivity Analysis for Ultrafiltration: Effect of Pore Geometry," NIH-PA Author Manuscript, PMC, (Mar. 1, 2011), also published in J. Memb. Sci. 349(1-2): 405 (Mar. 1, 2010).
Karan et al., "Ultrafast Viscous Permeation of Organic Solvents Through Diamond-Like Carbon Nanosheets," Science 335: 444-447 (Jan. 27, 2012).
Kim et al., "Fabrication and Characterization of Large Area, Semiconducting Nanoperforated Graphene Materials," Nano Letters 10(4): 1125-1131 (Mar. 1, 2010).
Kim et al., "The structural and electrical evolution of graphene by oxygen plasma-induced disorder," Nanotechnology IOP 20(375703): 1-8 (Aug. 26, 2009).
Koski and Cui, "The New Skinny in Two-Dimensional Nanomaterials", ACS Nano 7(5): 3739-3743 (May 16, 2013).
Liu et al., "Atomically Thin Molybdenum Disulfide Nanopores with High Sensitivity for DNA Translocation," ACS Nano 8(3): 2504-2511 (Feb. 18, 2014).
Liu et al., "Graphene Oxidation: Thickness-Dependent Etching and Strong Chemical Doping," Nano Letters 8(7): 1965-1970 (Jun. 19, 2008).
Mishra et al., "Functionalized Graphene Sheets for Arsenic Removal and Desalination of Sea Water," Desalination 282: 39-45 (Nov. 1, 2011).
Morse, "Scalable Synthesis of Semiconducting Nanopatterned Graphene Materials," InterNano Resources for Nanomanufacturing (undated). Retrieved Jun. 2, 2016 from: http://www.internano.org/node/345.
Nair et al., "Unimpeded Permeation of Water Through Helium-Leak-tight Graphene-Based Membranes," Science 335: 442-444 (Jan. 27, 2012).
O'Hern et al. "Selective Molecular Transport through Intrinsic Defects in a Single Layer of CVD Graphene," ACS Nano, 6(11): 10130-10138 (Oct. 2, 2012).
O'Hern et al., "Selective Ionic Transport through Tunable Subnanometer Pores in Single-Layer Graphene Membranes," Nano Letters 14(3): 1234-1241 (Feb. 3, 2014).
Paul, "Creating New Types of Carbon-Based Membranes," Science 335: 413-414 (Jan. 27, 2012).
Schweicher et al., "Membranes to achieve immunoprotection of transplanted islets," NIH-PA Author Manuscript, PMC, (Nov. 13, 2014), also published in Frontiers in Bioscience (Landmark Ed) 19: 49-76 (Jan. 1, 2014).
Sint et al., "Selective Ion Passage through Functionalized Graphene Nanopores," JACS 130: 16448-16449 (Nov. 14, 2008).
Suk et al., "Water Transport Through Ultrathin Graphene," Journal of Physical Chemistry Letters 1(10): 1590-1594 (Apr. 30, 2010).
Tan et al., "Beta-cell regeneration and differentiation: how close are we to the 'holy grail'?" J. Mol. Encodrinol. 53(3): R119-R129 (Dec. 1, 2014).
Vlassiouk et al., "Versatile ultrathin nanoporous silicon nitride membranes," Proc. Natl. Acad. Sci. USA 106(50): 21039-21044 (Dec. 15, 2009).
Wadvalla, "Boosting agriculture through seawater," Nature Middle East (Jul. 2, 2012). Retrieved Jun. 1, 2016 from: natureasia.com/en/nmiddleeast/article/10.1038/nmiddleeast.2012.92?WT.mc_id=FBK NatureMEast].
Wikipedia, "Ion track." Jun. 1, 2016. Retrieved Jun. 1, 2016 from: en.wikipedia.org/wiki/ion_track.

(56) References Cited

OTHER PUBLICATIONS

Xu et al., "Graphene-like Two-Dimensional Materials", Chemical Reviews 113: 3766-3798 (Jan. 3, 2013).
Zan et al., "Graphene Reknits Its Holes," Nano Lett. 12(8): 3936-3940 (Jul. 5, 2012).
Zhao et al. "Two-Dimensional Material Membranes: An Emerging Platform for Controllable Mass Transport Applications," Small 10(22): 4521-4542 (Sep. 10, 2014).
AE Search and Examination Report for United Arab Emirates Application No. P186/13 dated Oct. 4, 2016.
Agenor et al., "Renal tubular dysfunction in human visceral leishmaniasis (Kala-azar)," Clinical Nephrology 71(5): 492-500 (May 2009) (available online Mar. 21, 2011).
Albert et al., "Ringer's lactate is compatible with the rapid infusion of AS-3 preserved packed red blood cells," Can. J. Anaesth. 56(5): 352-356 (May 2009) (available online Apr. 2, 2009).
Aluru et al. "Modeling electronics on the nanoscale." Handbook of nanoscience, engineering and technology Goddard W, Brenner D, Lyshevski S, Iafrate GJ (2002): 11-1.
Alvarenga, "Carbon nanotube materials for aerospace wiring" Rochester Institute of Technology, 2010.
AMI Applied Membranes Inc., "Filmtec Nanofiltration Membrane Elements", Retrieved from appliedmembranes.com/nanofiltration_elements.htm, accessed Apr. 28, 2015 (2 Pages).
Aso et al., "Comparison of serum high-molecular weight (HMW) adiponectin with total adiponectin concentrations in type 2 diabetic patients with coronary artery using a novel enzyme-linked immunosorbent assay to detect HMW adiponectin," Diabetes 55(7): 1954-1960 (Jul. 2006).
AU Examination Report for Australian Patent Application No. 2013235234, dated Jan. 13, 2017, 4 pages.
AU Examination Report for Australian Patent Application No. 2013363283, dated Jun. 20, 2017, 4 pages.
AU Notice of Acceptance for Australian Application No. 2011293742 dated Jan. 13, 2016.
Axelsson et al., "Acute hyperglycemia induces rapid, reversible increases in glomerular permeability in nondiabetic rats," Am. J. Physiol. Renal Physiol. 298(6): F1306-F1312 (Jun. 2010) (available online.
Bains et al., "Novel lectins from rhizomes of two Acorus species with mitogenic activity and inhibitory potential towards murine cancer cell lines," Int'l Immunopharmacol. 5(9): 1470-1478 (Aug. 2005) (available online May 12, 2005).
Baker, "Membrane Technology and Applications", Membrane Technology and Applications; Apr. 14, 2004; pp. 92-94.
Barreiro et al. "Transport properties of graphene in the high-current limit." Physical review letters 103.7 (2009): 076601.
Bazargani et al. "Low molecular weight heparin improves peritoneal ultrafiltration and blocks complement and coagulation," Peritoneal Dialysis Int'l 25(4): 394-404 (Jul. 2005-Aug. 2005).
Bazargani, "Acute inflammation in peritoneal dialysis: experimental studies in rats. Characterization of regulatory mechanisms," Swedish Dental J. Supp. 171: 1-57, i (2005).
Beppu et al., "Antidiabetic effects of dietary administration of Aloe arborescens Miller components on multiple low-dose streptozotocin-induced diabetes in mice: investigation on hypoglycemic action and systemic absorption dynamics of aloe components," J. Ethnopharmacol. 103(3): 468-77 (Feb. 20, 2006) (available online Jan. 6, 2006).
Bieri et al. "Two-dimensional Polymer Formation on Surfaces: Insight into the Roles of Precursor Mobility and Reactivity" JACS, 2010, vol. 132, pp. 16669-16676.
Bruin et al., "Maturation and function of human embryonic stem cell-derived pancreatic progenitors in macroencapsulation devices following transplant into mice", Diabetologia (2013), vol. 56: 1987-1998 (Jun. 16, 2013).
Chu Ju, et al. "Modern Biotechnology" East China University of Technology Press, (Sep. 2007), vol. 1; pp. 306-307, ISBN 978-7-5628-2116-8.
Clochard, "Track-Etched Polymer Membranes," Laboratory of Irradiated Solids, Ecole Polytechnique, retrieved from http://www.lsi.polytechnique.fr/home/research/physics-and-chemistry-of-nano-objects/trac . . . , Accessed Jul. 30, 2015 (2 pages).
CN Notification of Grant for Chinese Application No. 201180049184.5 dated Jun. 6, 2016.
CN Office Action for Chinese Application No. 201380014845.X dated Jul. 8, 2016.
CN Office Action for Chinese Application No. 201380014845.X dated Sep. 2, 2015.
CN Office Action for Chinese Application No. 201380019165.5 dated Aug. 25, 2015.
CN Office Action for Chinese Application No. 201380073141.X dated Jun. 8, 2016.
CN Office Action for Chinese Application No. 201380073141.X dated Mar. 21, 2017.
CN Office Action for Chinese Application No. 201480015372.X dated Aug. 2, 2016.
CN Office Action for Chinese Application No. 20118004918.5 dated Jun. 15, 2015.
CN Office Action for Chinese Application No. 201180049184.5 dated Jul. 30, 2014.
CN Office Action for Chinese Application No. 201180049184.5 dated Mar. 4, 2016.
CN Office Action for Chinese Application No. 201380014845.X dated Dec. 23, 2016.
CN Office Action for Chinese Application No. 201380017644.5 dated Feb. 7, 2017.
CN Office Action for Chinese Application No. 201380017644.5 dated May 26, 2016.
CN Office Action for Chinese Application No. 201380017644.5 dated Sep. 29, 2015.
CN Office Action in Chinese Application No. 201380013988.9 dated Oct. 27, 2015.
Daniel et al. "Implantable Diagnostic Device for Cancer Monitoring." Biosens Bioelectricon. 24(11): 3252-3257 (Jul. 15, 2009).
Database WPI, Week 201238, Thomson Scientific, London, GB; AN 2012-D49442.
De Lannoy et al., "Aquatic Biofouling Prevention by Electrically Charged Nanocomposite Polymer Thin Film Membranes", 2013 American Water Work Association membrane Technology Conference; Environmental science & technology 47.6 (2013): 2760-2768.
Deng et al., "Renal protection in chronic kidney disease: hypoxia-inducible factor activation vs. angiotensin II blockade," Am. J. Physiol. Renal Physiol. 299(6): F1365-F1373 (Dec. 2010) (available online Sep. 29, 2010).
Edwards, "Large Sheets of Graphene Film Produced for Transparent Electrodes (w/ Video)"; (Jun. 21, 2010), PhysOrg.com, retrieved on May 15, 2017 from https://phys.org/news/2010-06-large-sheets-graphene-transparentelectrodes.html (2 pages).
EP Office Action for European Application No. 13715529.7 dated Jun. 24, 2016.
Fayerman, "Canadian scientists use stem cells to reverse diabetes in mice", The Telegraph-Journal (New Brunswick), 1-2 (Jun. 29, 2012).
Fayerman, "Diabetes reversed in mice; University of B.C. scientists use embryonic stem cells to deal with Type 1 disease", The Vancouver Sun (British Columbia), 1-2 (Jun. 28, 2012).
Fejes et al. "A review of the properties and CVD synthesis of coiled carbon nanotubes." Materials 3.4 (2010): 2618-2642.
Franzen, C. "MIT Setting Up Industrial-Scale Graphene Printing Press" Sep. 23, 2011, retrieved from http://talkingpointsmemo.com/idealab/mit-setting-up-industrial-scale-graphene-printing-press (2 pages).
Freedman et al., "Genetic basis of nondiabetic end-stage renal disease," Semin. Nephrol. 30(2): 101-110 (Mar. 2010).
Garcia-Lopez et al., "Determination of high and low molecular weight molecules of icodextrin in plasma and dialysate, using gel filtration chromatography, in peritoneal dialysis patients," Peritoneal Dialysis Int'l 25(2): 181-191 (Mar. 2005-Apr. 2005).
Georgakilas et al., "Functionalization of Graphene: Covalent and Non-Covalent Approaches, Derivatives and Applications," Chem. Rev., (2012) 112(11), pp. 6156-6214.
Gnudi "Molecular mechanisms of proteinuria in diabetes," Biochem. Soc. Trans. 36(5): 946-949 (Oct. 2008).

(56) References Cited

OTHER PUBLICATIONS

Gotloib et al., "Peritoneal dialysis in refractory end-stage congestive heart failure: a challenge facing a no-win situation," Nephrol. Dialysis. Transplant. 20(Supp. 7): vii32-vii36 (Jul. 2005).
Harvey "Carbon as conductor: a pragmatic view." Proceedings of the 61st IWCS Conference, http://www.iwcs.org/archives/56333-iwcs-2012b-1.1584632. vol. 1. 2012.
Hashimoto et al. "Direct evidence for atomic defects in graphene layers." Nature 430.7002 (2004): 870-873.
He, et al. "The attachment of Fe3 O4 nanoparticles to graphene oxide by covalent bonding." Carbon 48.11 (2010): 3139-3144.
Hone et al. "Graphene has record-breaking strength" Physicsworld.com, Jul. 17, 2008.
Huang et al., "Gene expression profile in circulating mononuclear cells afterexposure to ultrafine carbon particles," Inhalation Toxicol. 22(10): 835-846 (Aug. 2010).
Humplik, et al. "Nanostructured materials for water desalination." Nanotechnology 22.29 (2011): 292001.
International Search Report and Written Opinion dated Jan. 5, 2012 for related International Application No. PCT/US11/47800.
International Search Report and Written Opinion dated Jul. 5, 2017 from related PCT application PCT/US2017/024147.
International Search Report and Written Opinion dated Mar. 12, 2014 for International Application No. PCT/US2013/074942.
International Search Report and Written Opinion for International Application No. PCT/US2011/047800 dated Jan. 5, 2012.
International Search Report and Written Opinion for PCT Application No. PCT/US2014/023027 dated Jun. 26, 2014.
International Search Report and Written Opinion in International Application No. PCT/US2013/030344 dated Jun. 19, 2013.
International Search Report and Written Opinion in International Application No. PCT/US2013/033035 dated Jun. 28, 2013.
International Search Report and Written Opinion in International Application No. PCT/US2013/033400, dated Jun. 28, 2013.
International Search Report and Written Opinion in International Application No. PCT/US2013/033403 dated Jun. 28, 2013.
International Search Report and Written Opinion in PCT/US2014/041766, dated Sep. 30, 2014.
International Search Report and Written Opinion dated Jun. 5, 2014 in International Application No. PCT/US2014/021677.
International Search Report and Written Opinion dated Jun. 6, 2014 in International Application No. PCT/US2014/023043.
International Search Report and Written Opinion dated Dec. 16, 2014, for International Application No. PCT/US2014/051011.
International Search Report and Written Opinion dated Jun. 19, 2015, in International Application No. PCT/US2015/020287.
Inui et al. "Molecular dynamics simulations of nanopore processing in a graphene sheet by using gas cluster ion beam." Applied Physics A: Materials Science & Processing 98.4 (2010): 787-794.
Israelachvili, "Intermolecular and Surface Forces," 3rd ed., Chap. 7.1, Sizes of Atoms, Molecules, and Ions, 2011, 1 page.
Jiao et al., "Castration differentially alters basal and leucine-stimulated tissue protein synthesis in skeletal muscle and adipose tissue," Am. J. Physiol. Endocrinol. Metab. 297(5): E1222-1232 (Nov. 2009) (available online Sep. 15, 2009).
JP Office Action in Japanese Application No. 2015-501729 dated Dec. 9, 2016 (English translation).
JP Office Action in Japanese Application No. 2015-501729 dated Jun. 20, 2017 (English translation).
JP Office Action in Japanese Application No. 2015-501867 dated Oct. 11, 2016 (English translation).
JP Office Action in Japanese Application No. 2015-503405 dated Nov. 14, 2016 (English translation).
JP Office Action in Japanese Application No. 2015-503406 dated Dec. 6, 2016(English translation).
Kang et al., "Effect of eplerenone, enalapril and their combination treatment on diabetic nephropathy in type II diabetic rats," Nephrol. Dialysis Transplant. 24(1): 73-84 (Jan. 2009).
Kang et al., "Efficient Transfer of Large-Area Graphene Films onto Rigid Substrates by Hot Pressing," American Chemical Society Nano, 6(6): 5360-5365(May 28, 2012).
Kar et al., "Effect of glycation of hemoglobin on its interaction with trifluoperazine," Protein J. 25(3): 202-211 (Apr. 2006) (available online Jun. 6, 2006).
Kawamoto et al., "Serum high molecular weight adiponectin is associated with mild renal dysfunction in Japanese adults," J. Atherosclerosis Thrombosis 17(11): 1141-1148 (Nov. 27, 2011).
Khun et al. "From Microporous Regular Frameworks to Mesoporous Materials with Ultrahigh Surface Area: Dynamic reorganization of Porous Polymer Networks" JACS, 2008; vol. 130; pp. 13333-13337.
Krupka et al., "Measurements of the Sheet Resistance and Conductivity of Thin Epitaxial Graphene and SiC Films" Applied Physics Letters 96, 082101-I; Feb. 23, 2010.
Kumar et al., "Modulation of alpha-crystallin chaperone activity in diabetic rat lens by curcumin," Molecular Vision 11: 561-568 (Jul. 26, 2005).
Lathuiliere et al., "Encapsulated Cellular Implants for Recombinant Protein Delivery and Therapeutic Modulation of the Immune System," Journal of Applied Physics, Int. J. Mol. Sci., 16: 10578-10600 (May 8, 2015).
Lee, et al. "Measurement of the elastic properties and intrinsic strength of monolayer graphene." science 321.5887 (2008): 385-388.
Lucchese et al. "Quantifying ion-induced defects and Raman relaxation length in graphene." Carbon 48.5 (2010): 1592-1597.
Macleod et al. "Supramolecular Orderinng in Oligothiophene-Fullerene Monolayers" JACS, 2009, vol. 131, pp. 16844-16850.
Mattevi et al. "A review of chemical vapour deposition of graphene on copper." Journal of Materials Chemistry 21.10 (2011): 3324-3334.
Miao et al. "Chemical vapor deposition of grapheme" INTECH Open Access Publisher, 2011.
Mishra et al., "Functionalized Graphene Sheets for Arsenic Removal and Desalination of Sea Water," Desalination 282: 39-45 (Jan. 13, 2011)(available online Feb. 11, 2011).
MIT/MTL Center for Graphene Devices and 2D Systems, retrieved from: http://www-mtl.mit.edu/wpmu/graphene/ [retrieved from Aug. 21, 2014 archive] (3 pages).
MIT/MTL Center for Graphene Devices and 2D Systems, retrieved from: http://www-mtl.mit.edu/wpmu/graphene/ [retrieved from Mar. 4, 2015 archive] (3 pages).
Nafea, et al. "Immunoisolating semi-permeable membranes for cell encapsulation: focus on hydrogels." J Control Release. 154(2): 110-122 (Sep. 5, 2011).
Nezlin, "Circulating non-immune IgG complexes in health and disease," Immunol. Lett. 122(2); 141-144 (Feb. 21, 2009) (available online Feb. 2, 2009).
Norata et al., "Plasma adiponectin levels in chronic kidney disease patients: relation with molecular inflammatory profile and metabolic status," Nutr. Metab. Cardiovasc. Dis. 20(1): 56-63 (Jan. 2010) (available online Apr. 9, 2009).
Ogawa et al., "Exosome-like vesicles in Gloydius blomhoffii blomhoffii venom," Toxicon 51(6): 984-993 (May 2008) (available online Feb. 19, 2008).
Ohgawara et al. "Assessment of pore size of semipermeable membrane for immunoisolation on xenoimplatntation of pancreatic B cells using a diffusion chamber." Transplant Proc. (6): 3319-3320. 1995.
Oki et al., "Combined acromegaly and subclinical Cushing disease related to high-molecular-weight adrenocorticotropic hormone," J. Neurosurg. 110(2): 369-73 (Feb. 2009).
Osorio et al., "Effect of treatment with losartan on salt sensitivity and SGLT2 expression in hypertensive diabetic rats," Diabetes Res. Clin. Pract. 86(3): e46-e49 (Dec. 2009) (available online Oct. 2, 2009).
Osorio et al., "Effect of phlorizin on SGLT2 expression in the kidney of diabetic rats," J. Nephrol. 23(5): 541-546 (Sep.-Oct. 2010).

(56) References Cited

OTHER PUBLICATIONS

Padidela et al., "Elevated basal and post-feed glucagon-like peptide 1 (GLP-1) concentrations in the neonatal period," Eur. J. Endocrinol. 160(1): 53-58 (Jan. 2009) (available online Oct. 24, 2008).
Pall Corporation, "Pall Water Processing Disc-Tube Filter Technology", Retrieved on Feb. 10, 2015, Retrieved from http://www.pall.com /pdfs/Fuels-and-Chemicals/Disc-Tube_Filter_Technology-DT100b.pdF (15 Pages).
Plant et al. "Size-dependent propagation of Au nanoclusters through few-layer grapheme," The Royal Society of Chemistry 2013, Nanoscale.
Pollard, "Growing Graphene via Chemical Vapor" Department of Physics, Pomona College; May 2, 2011.
Rafael et al. "Cell Transplantation and Immunoisolation: Studies on a macroencapsultaion device." From the Departments of Transplantation Pathology: Stockholm, Sweden (1999).
Rezania et al., "Enrichment of Human Embryonic Stem Cell-Derived NKX6.1-Expressing Pancreatic Progenitor Cells Accelerates the Maturation of Insulin-Secreting Cells In Vivo", Stem Cells Regenerative Medicine, vol. 31: 2432-2442 (Jul. 29, 2013).
Rezania et al., "Maturation of Human Embryonic Stem Cell-Derived Pancreatic Progenitors Into Functional Islets Capable of Treating Pre-existing Diabetes in Mice", Diabetes Journal, vol. 61: 2016-2029 (Aug. 1, 2012).
Ribeiro et al., "Binary Mutual Diffusion Coefficients of Aqueous Solutions of Sucrose, Lactose, Glucose, and Fructose in the Temperature Range from (298.15 to 328.15) K," J. Chem. Eng. Data 51(5): 1836-1840 (Sep. 2006) (available online Jul. 20, 2006).
Rippe et al., "Size and charge selectivity of the glomerular filter in early experimental diabetes in rats," Am. J. Physiol. Renal Physiol. 293(5): F1533-F1538 (Nov. 2007)(available online Aug. 15, 2007).
SA Final Rejection for Saudi Arabia Application No. 113340400 dated Jan. 28, 2016.
SA First Examination Report for Saudi Arabia Application No. 113340401 dated Apr. 28, 2015.
SA First Examination Report for Saudi Arabia Application No. 113340424 dated May 10, 2015.
SA First Examination Report for Saudi Arabia Application No. 113340426 dated May 12, 2015.
SA First Examination Report in Saudi Arabia Application No. 113340400 dated Apr. 13, 2015.
SA Second Examination Report for Saudi Arabia Application No. 113340400 dated Aug. 11, 2015.
Sanchez, et al. "Biological Interactions of Graphene-Family Nanomaterials—An Interdisciplinary Review." Chem Res Toxicol. 25(1): 15-34 (Jan. 13 2012).
Sethna et al., "Serum adiponectin levels and ambulatory blood pressure monitoring in pediatric renal transplant recipients," Transplantation 88(8): 1030-1037 (Oct. 27, 2009).
Sullivan et al., "Microarray analysis reveals novel gene expression changes associated with erectile dysfunction in diabetic rats," Physiol. Genom. 23(2): 192-205 (Oct. 17, 2005) (available online Aug. 23, 2005).
Swett et al, "Imagining and Sculpting Graphene on the atomic scale" Oak Ridge National Laboratory's (ORNL) Center for Nanophase Materials Sciences (CNMS) Biannual Review. 1 page.
Swett et al, "Supersonic Nanoparticle Interaction with Suspended CVD Graphene", Microsc. Microanal. 22 (Suppl 3): 1670-1671 (Jul. 25, 2016).
Takata et al., "Hyperresistinemia is associated with coexistence of hypertension and type 2 diabetes," Hypertension 51. 2 (Feb. 2008): 534-9.
Tamborlane et al., "Continuous Glucose Monitoring and Intensive Treatment of Type 1 Diabetes" N Engl J Med 359;14: 1464-1476 (Oct. 2, 2008).
Tanugi et al., "Nanoporous Graphene Could Outperform Best Commercial Water Desalination Techniques,"; ACS 2012; Jun. 25, 2012; Weftec 2012; Sep. 29-Oct. 3.
Totani et al. "Gluten binds cytotoxic compounds generated in heated frying oil." Journal of oleo science 57.12 (2008): 683-690.
Tsukamoto et al. "Purification, characterization and biological activities of a garlic oliqosaccharide," Journal of UOEH 30.2 (Jun. 1, 2008): 147-57.
TW Office Action in Taiwanese Application No. 102146079 dated Apr. 14, 2017. 9 Pages.(English translation).
TW Search Report in Taiwanese Application No. 102146079 dated Apr. 14, 2017. 1 page.
Umea Universitet "Graphene nanoscrolls are formed by decoration of magnetic nanoparticles." ScienceDaily. Aug. 15, 2013. https://www.sciencedaily.com/releases/2013/08/130815084402.htm (3 pages).
U.S. Notice of Allowance for U.S. Appl. No. 12/868,150 dated Sep. 25, 2012.
U.S. Notice of Allowance for U.S. Appl. No. 13/548,539 dated Aug. 18, 2015.
U.S. Notice of Allowance for U.S. Appl. No. 13/548,539 dated Jul. 23, 2015.
U.S. Notice of Allowance for U.S. Appl. No. 13/719,579 dated May 20, 2016.
U.S. Notice of Allowance for U.S. Appl. No. 13/795,276 dated Oct. 7, 2016.
U.S. Notice of Allowance for U.S. Appl. No. 13/802,896 dated Apr. 1, 2015.
U.S. Notice of Allowance for U.S. Appl. No. 13/803,958 dated Aug. 29, 2016.
U.S. Notice of Allowance for U.S. Appl. No. 13/803,958 dated Jun. 2, 2016.
U.S. Notice of Allowance for U.S. Appl. No. 13/803,958 dated Sep. 12, 2016.
U.S. Notice of Allowance for U.S. Appl. No. 13/804,085 dated Jan. 15, 2015.
U.S. Notice of Allowance for U.S. Appl. No. 13/804,085 dated Mar. 12, 2015.
U.S. Notice of Allowance for U.S. Appl. No. 13/923,503 dated Oct. 14, 2016.
U.S. Notice of Allowance for U.S. Appl. No. 13/923,503 dated Oct. 5, 2016.
U.S. Notice of Allowance for U.S. Appl. No. 14/200,195 dated Jul. 5, 2016.
U.S. Notice of Allowance for U.S. Appl. No. 14/200,530 dated Aug. 1, 2016.
U.S. Notice of Allowance for U.S. Appl. No. 14/203,655 dated Dec. 9, 2016.
U.S. Notice of Allowance in U.S. Appl. No. 12/868,150 dated Sep. 25, 2012.
U.S. Notice of Allowance in U.S. Appl. No. 13/795,276 dated Jan. 19, 2017.
U.S. Notice of Allowance in U.S. Appl. No. 13/803,958 dated Aug. 29, 2016.
U.S. Notice of Allowance in U.S. Appl. No. 13/803,958 dated Sep. 12, 2016.
U.S. Notice of Allowance in U.S. Appl. No. 14/610,770 dated May 5, 2017.
U.S. Notice of Allowance in U.S. Appl. No. 14/656,580 dated May 8, 2017.
U.S. Notice of Allowance in U.S. Appl. No. 14/819,273 dated Jun. 9, 2017.
U.S. Notice of Allowance in U.S. Appl. No. 15/099,464 dated Jun. 16, 2017.
U.S. Office Action for U.S. Appl. No. 13/548,539 dated Feb. 6, 2015.
U.S. Office Action for U.S. Appl. No. 13/719,579 dated Jul. 8, 2015.
U.S. Office Action for U.S. Appl. No. 13/719,579 dated May 4, 2016.
U.S. Office Action for U.S. Appl. No. 13/795,276 dated Apr. 22, 2016.
U.S. Office Action for U.S. Appl. No. 13/795,276 dated Oct. 6, 2015.
U.S. Office Action for U.S. Appl. No. 13/802,896 dated Sep. 24, 2014.
U.S. Office Action for U.S. Appl. No. 13/803,958 dated Aug. 11, 2014.
U.S. Office Action for U.S. Appl. No. 13/803,958 dated May 28, 2015.

(56) References Cited

OTHER PUBLICATIONS

U.S. Office Action for U.S. Appl. No. 13/803,958 dated Nov. 18, 2015.
U.S. Office Action for U.S. Appl. No. 13/923,503 dated Mar. 22, 2016.
U.S. Office Action for U.S. Appl. No. 14/031,300 dated Jan. 20, 2016.
U.S. Office Action for U.S. Appl. No. 14/031,300 dated Jul. 7, 2015.
U.S. Office Action for U.S. Appl. No. 14/200,195 dated Mar. 21, 2016.
U.S. Office Action for U.S. Appl. No. 14/200,195 dated Nov. 4, 2015.
U.S. Office Action for U.S. Appl. No. 14/200,530 dated Feb. 29, 2016.
U.S. Office Action for U.S. Appl. No. 14/203,655 dated Aug. 10, 2016.
U.S. Office Action for U.S. Appl. No. 14/656,190 dated May 18, 2017.
U.S. Office Action for U.S. Appl. No. 14/656,657 dated Jul. 7, 2017.
U.S. Office Action for U.S. Appl. No. 14/686,452 dated Jun. 9, 2017.
U.S. Office Action for U.S. Appl. No. 14/843,944 dated Jun. 23, 2017.
U.S. Office Action for U.S. Appl. No. 14/856,471 dated May 31, 2017.
U.S. Office Action for U.S. Appl. No. 14/858,741 dated Dec. 1, 2016.
U.S. Office Action for U.S. Appl. No. 15/289,944 dated Feb. 9, 2017.
U.S. Office Action for U.S. Appl. No. 15/336,545 dated Dec. 19, 2016.
U.S. Office Action for U.S. Appl. No. 15/453,441 dated Jun. 5, 2017.
U.S. Office Action in U.S. Appl. No. 14/193,007 dated Apr. 24, 2017.
U.S. Office Action in U.S. Appl. No. 14/656,617 dated Apr. 4, 2017.
U.S. Office Action on U.S. Appl. No. 14/656,335 dated Apr. 25, 2017.
U.S. Office Action on U.S. Appl. No. 15/332,982 dated Jan. 30, 2017.
Vallon,"Micropuncturing the nephron," Pflugers Archiv : European journal of physiology 458. 1 (May 2009): 189-201.
Van Der Zande et al. "Large-scale arrays of single-layer graphene resonators." Nano letters 10.12 (2010): 4869-4873.
Verdonck, P., "Plasma Etching", in Oficina de Microfabricao: Projeto e Construcao de CI's MOS, Swart, J.W., Ed., Campinas (Sao Paulo, Brazil): UNICAMP, 2006, ch. 10, p. 9.
Vlassiouk et al. "Large scale atmospheric pressure chemical vapor deposition of graphene." Carbon 54 (2013): 58-67.
Vriens et al. "Methodological considerations in quantification of oncological FDG PET studies." European journal of nuclear medicine and molecular imaging 37.7 (2010): 1408-1425.
Wang et al., "Direct Observation of a Long-Lived Single-Atom Catalyst Chiseling Atomic Structures in Graphene," Nano Lett., 2014, pp. A-F.
Wang et al., "Porous Nanocarbons: Molecular Filtration and Electronics," Advances in Graphene Science, Edited by Mahmood Aliofkhazraei, (2013) ISBN 978-953-51-1182-5, Publisher: InTech; Chapter 6, pp. 119-160.
Wang et al.,"What is the role of the second "structural" NADP+-binding site in human glucose 6-phosphate dehydrogenase?," Protein science a publication of the Protein Society 17.8 (Aug. 2008): 1403-11.
Wei et al., "Synthesis of N-doped graphene by chemical vapor deposition and its electrical properties", Nano Lett. 2009 9 1752-58.
Xiaogan Liang et al., Formation of Bandgap and Subbands in Graphene Nanomeshes with Sub-10nm Ribbon Width Fabricated via Nanoimprint Lithography., Nano Letters, Jun. 11, 2010, pp. 2454-2460.

Xie et al., "Fractionation and characterization of biologically-active polysaccharides from Artemisia tripartite," Phytochemistry 69. 6 (Apr. 2008): 1359-71.
Xie, et al. "Controlled fabrication of high-quality carbon nanoscrolls from monolayer graphene." Nano letters 9.7 (2009): 2565-2570.
Yagil et al. "Nonproteinuric diabetes-associated nephropathy in the Cohen rat model of type 2 diabetes" Diabetes 54. 5 (May 2005): 1487-96.
Zan et al. "Interaction of Metals with Suspended Graphene Observed by Transmission Electron Microscopy", J. Phys. Chem. Lett., Mar. 8, 2012, 3, 953-958.
Zhang et al. "Effect of Chemical Oxidation on the Structure of Single-Walled Carbon Nanotubes", J. Phys. Chem., Feb. 12, 2003, B 107 3712-8.
Zhang et al. "Method for anisotropic etching of graphite or graphene" Institute of Physics, Chinese Academy of Sciences; PEOP. Rep. China; Mar. 30, 2011.
Zhang et al. "Production of Graphene Sheets by Direct Dispersion with Aromatic Healing Agents", Small, May 6, 2010, vol. 6, No. 10, 1100-1107.
Zhang et al. "Isolation and activity of an alpha-amylase inhibitor from white kidney beans," Yao xue xue bao =Acta pharmaceutics Sinica 42. 12 (Dec. 2007): 1282-7.
Zhao, et al. "Efficient preparation of large-area graphene oxide sheets for transparent conductive films." ACS nano 4.9 (2010): 5245-5252.
Zhou, K., et al., "One-pot preparation of graphene/ Fe3O4 composites by a solvothermal reaction," New J. Chem., 2010, 34, 2950.
Zhu et al. "Carbon Nanotubes in Biomedicine and Biosensing", Carbon Nanotubes—Growth and Applications, InTech, (Aug. 9, 2011) Chapter 6: pp. 135-162. Available from: https://www.intechopen.com/books/carbon-nanotubes-growth-and-applications/carbon-nanotubes-in-biomedicine-and-biosensing.
Ziegelmeier et al. "Adipokines influencing metabolic and cardiovascular disease are differentially regulated in maintenance hemodialysis," Metabolism: clinical and experimental 57. 10 (Oct. 2008): 1414-21.
Zirk et al. "A refractometry-based glucose analysis of body fluids," Medical engineering & physics 29. 4 (May 2007): 449-58.
Zyga "Nanoporous Graphene Could Outperform Best Commercial Water Desalination Techniques," Phys.org., Jun. 22, 2012, Retrieved from http://www.phys.org/pdf259579929.pdf [Last Accessed Dec. 3, 2014] (3 pages).
Dong et al., "Growth of large-sized graphene thin-films by liquid precursor-based chemical vapor deposition under atmospheric pressure," Carbon 49(11): 3672-3678 (May 2011).
Hong et al., "Graphene multilayers as gates for multi-week sequential release of proteins from surfaces," NIH-PA Author Manuscript PMC (Jun. 1, 2014), also published in ACS Nano, Jan. 24, 2012; 6(1): 81-88 (first published online Dec. 29, 2011).
Hu et al., "Enabling graphene oxide nanosheets as water separation membranes," Environmental Science & Technology, 47(8): 3715-3723 (Mar. 14, 2013).
International Search Report and Written Opinion of the International Searching Authority dated Jul. 22, 2016, from related international patent application PCT/US2016/027607.
International Search Report and Written Opinion of the International Searching Authority dated Jul. 22, 2016, from related international patent application PCT/US2016/027616.
International Search Report and Written Opinion of the International Searching Authority dated Jul. 22, 2016, from related PCT application PCT/US2016/027596.
International Search Report and Written Opinion of the International Searching Authority dated Jul. 22, 2016, from related PCT application PCT/US2016/027603.
International Search Report and Written Opinion of the International Searching Authority dated Jul. 22, 2016, from related PCT application PCT/US2016/027610.
International Search Report and Written Opinion of the International Searching Authority dated Jul. 22, 2016, from related PCT application PCT/US2016/027612.

(56) References Cited

OTHER PUBLICATIONS

International Search Report and Written Opinion of the International Searching Authority dated Jun. 22, 2016, from related PCT application PCT/US2016/027637.
Kurapati et al., "Graphene oxide based multilayer capsules with unique permeability properties: facile encapsulation of multiple drugs," Chemical Communication 48: 6013-6015 (Apr. 25, 2012).
Li et al., "3D graphene oxide-polymer hydrogel: near-infrared light-triggered active scaffold for reversible cell capture and on-demand release," Advanced Materials 25: 6737-6743 (Oct. 7, 2013).
Marquardt et al., "Hybrid materials of platinum nanoparticles and thiol-functionalized graphene derivatives," Carbon 66: 285-294 (Jan. 2014; first published online Sep. 12, 2013).
Nam et al., "Monodispersed PtCo nanoparticles on hexadecyltrimethylammonium bromide treated graphene as an effective oxygen reduction reaction catalyst for proton exchange membrane fuel cells," Carbon 50: 3739-3747 (Aug. 2012; first published online Apr. 5, 2012).
Nandamuri et al., "Chemical vapor deposition of graphene films," Nanotechnology 21(14): 1-4 (Mar. 10, 2010).
Nayini et al., "Synthesis and characterization of functionalized carbon nanotubes with different wetting behaviors and their influence on the wetting properties of carbon nanotubes/polymethylmethacrylate coatings," Progress in Organic Coatings 77(6): 1007-1014 (Mar. 2014).
Sun et al., "Growth of graphene from solid carbon sources," Nature 468(7323): 549-552 (Nov. 25, 2010; including corrigendum in Nature 471(7336): 124 (Mar. 2011).
Tang et al., "Highly wrinkled cross-linked graphene oxide membranes for biological and charge-storage applications," Small 8(3): 423-431 (Feb. 6, 2012; first published online Dec. 13, 2011).
"Pall Water Processing Disc-Tube Filter Technology", Pall Corporation, [retrieved on Feb. 10, 2015], retrieved from http://www.pall.com /pdfs/Fuels-and-Chemicals/Disc-Tube_Filter_Technoloqy-DT100b.pdF.
AMI Applied Membranes Inc., Filmtec Nanofiltration Membrane Elements, «appliedmembranes.com/nanofiltration_elements.htm>>, accessed Apr. 28, 2015.
Axelsson et al., "Acute hyperglycemia induces rapid, reversible increases in glomerular permeability in nondiabetic rats," Am. J. Physiol. Renal Physiol. 298(6): F1306-F1312 (Jun. 2010) (available online Mar. 17, 2010).
Bae et al. "Roll-to-roll production of 30-inch graphene films for transparent electrodes." Nature nanotechnology 5.8 (2010): 574-578.
Clochard, "Track-etched polymer membranes," Ecole Polytechnique, <<lsi. polytechnique.fr/home/research/physics-and-chemistry-of-nano-objects/track-etched-polymer-membranes-97035.kjsp>> Accessed Jul. 30, 2015.
Edwards, "Large Sheets of Graphene Film Produced for Transparent Electrodes (w/ Video)"; (2010) PhysOrg.com.
Franzen, C. "MIT Setting Up Industrial-Scale Graphene Printing Press" Sep. 23, 2011 [retrieved from http://talkingpointsmemo.com/idealab/mit-setting-up-industrial-scale-graphene-printing-press].
International Preliminary Report on Patentability dated Sep. 15, 2015, corresponding to International Application No. PCT/US2014/021677.
International Search Report and Written Opinion dated Jun. 5, 2014 in International Application No. PCT/US2014/021677.
MIT/MTL Center for Graphene Devices and 2D Systems, retrieved from: http://www-mtl.mit.edu/wpmu/graphene/ [retrieved from Aug. 21, 2014 archive].
MIT/MTL Center for Graphene Devices and 2D Systems, retrieved from: http://www-mtl.mit.edu/wpmu/graphene/ [retrieved from Mar. 4, 2015 archive].
TW Office Action in Taiwanese Application No. 102146079 dated Apr. 14, 2017 (English translation).
TW Search Report in Taiwanese Application No. 102146079 dated Apr. 14, 2017.
UMEA Universitet "Graphene nanoscrolls are formed by decoration of magnetic nanoparticles." ScienceDaily. Aug. 15, 2013. https://www.sciencedaily.com/releases/2013/08/130815084402.htm.
Zan et al. "Interaction of Metals with Suspended Graphene Observed by Transmission Electron Microscopy", J. Phys. Chem. Lett. 2012, 3, 953-958.
Zhang et al. "Effect of chemical oxidation on the structure of single-walled carbon nanotubes", J. Phys. Chem., 2003, B 107 3712-8.
Zhang et al. "Production of Graphene Sheets by Direct Dispersion with Aromatic Healing Agents", Small 2010, x, No. x, 1-8.
Zhu et al. "Carbon nanotubes in biomedicine and biosensing." Carbon nanotubes-Growth and Applications. InTech, (2011) Chapter 6: pp. 135-162. Available from: https://www.intechopen.com/books/carbon-nanotubes-growth-and-applications/carbon-nanotubes-in-biomedicine-and-biosensing.
Zyga "Nanoporous Graphene Could Outperform Best Commercial Water Desalination Techniques," Phys.org. http://www.phys.org/pdf259579929.pdf. [Last Accessed Dec. 3, 2014].
Notice of Allowance for U.S. Appl. No. 14/819,273 dated Oct. 28, 2016.
U.S. Office Action for U.S. Appl. No. 14/193,007 dated Oct. 21, 2016.
U.S. Office Action for U.S. Appl. No. 14/193,007 dated Dec. 21, 2015.
U.S. Office Action for U.S. Appl. No. 14/193,007 dated Jul. 1, 2016.
CN Office Action in Chinese Application No. 201580006829.5 dated Aug. 1, 2017 (English translation) (5 pages).
EP Office Action for European Application No. 15743307.9 dated Aug. 8, 2017.
European Search Report dated Aug. 28, 2017 from related EP application 15743750.0 (7 pages).
International Search Report and Written Opinion dated Aug. 14, 2017 from related PCT application PCT/US2017/031537 (12 pages).
Jiang, L. et al., Design of advanced porous grapheme materials: from grapheme nanomesh to 3D architectures. Nanoscale, Oct. 16, 2013, vol. 6, pp. 1922-1945.
JP Office Action in Japanese Application No. 2015-503405 dated Jun. 28, 2017 (English translation) (6 pages).
JP Office Action in Japanese Application No. 2015-549508 dated Jun. 27, 2017 (English translation).
Li, R.H. "Materials for immunoisolated cell transplantation". Adv. Drug Deliv. Rev. 33, 87-109 (1998).
Schweitzer, Handbook of Separation Techniques for Chemical Engineers, 1979, McGraw-Hill Book Company, pp. 2-5 to 2-8.
Search Report and Written Opinion dated Aug. 14, 2017 for Singapore Application No. 11201606287V.
Sears et al., "Recent Developments in Carbon Nanotube Membranes for Water Purification and Gas Separation" Materials, vol. 3 (Jan. 4, 2010), pp. 127-149.
U.S. Notice of Allowance in U.S. Appl. No. 14/193,007 dated Sep. 6, 2017.
U.S. Notice of Allowance in U.S. Appl. No. 14/656,580 dated Sep. 5, 2017.
U.S. Office Action for U.S. Appl. No. 14/609,325 dated Aug. 25, 2017.
U.S. Office Action for U.S. Appl. No. 15/099,193 dated Jul. 19, 2017.
U.S. Office Action for U.S. Appl. No. 15/289,944 dated Jul. 13, 2017.
U.S. Office Action for U.S. Appl. No. 15/332,982 dated Aug. 18, 2017.
Australian Office Action in Application No. 2013235234 dated Dec. 19, 2017 (5 pages).
Japanese Office Action in Application No. 2017-002652 dated Nov. 24, 2017 (with English translation) (7 pages).
Chu, L., et al., "Porous graphene sandwich/poly(vinylidene fluoride) composites with high dielectric properties," Composites Science and Technology, 86, (2013), pp. 70-75.
European Extended Search Report in Application No. 15743307.9 dated Nov. 15, 2017 (14 pages).
European Extended Search Report in Application No. 15755350.4 dated Oct. 30, 2017 (9 pages).

(56) References Cited

OTHER PUBLICATIONS

European Extended Search Report in Application No. 15762019.6 dated Nov. 20, 2017 (12 pages).
European Extended Search Report in Application No. 15762213.5 dated Oct. 10, 2017 (8 pages).
Gu et al., "One-step synthesis of porous graphene-based hydrogels containing oil droplets for drug delivery", Royal Society of Chemistry (RSC), vol. 4, No. 7, Jan. 1, 2014, pp. 3211-3218.
Japanese Office Action in Application No. 2015-549508 dated Nov. 7, 2017 (with English translation) (2 pages).
Kim et al., "Selective Gas Transport Through Few-Layered Graphene and Graphene Oxide Membranes", Science, vol. 342, Oct. 4, 2013, pp. 91-95 (6 total pages).
Singapore Search Report and Written Opinion in Application No. 11201609272T dated Oct. 5, 2017 (11 pages).
U.S. Notice of Allowance in U.S. Appl. No. 15/099,464 dated Nov. 16, 2017 (5 pages).
U.S. Notice of Allowance in U.S. Appl. No. 15/332,982 dated Nov. 1, 2017 (9 pages).
U.S. Office Action in U.S. Appl. No. 14/707,808 dated Nov. 6, 2017 (27 pages).
U.S. Office Action in U.S. Appl. No. 15/099,193 dated Dec. 28, 2017 (25 pages).
U.S. Office Action in U.S. Appl. No. 15/099,304 dated Nov. 24, 2017 (23 pages).
Wang, M., et al., "Interleaved Porous Laminate Composed of Reduced Graphene Oxide Sheets and Carbon Black Spacers by In-Situ Electrophoretic Deposition," The Royal Society of Chemistry (2014), pp. 1-3.
Wimalasiri, Y., et al., "Carbon nanotube/graphene composite for enhanced capacitive deionization performance," Carbon 59 (2013), pp. 464-471.
Search Report and Written Opinion dated Aug. 22, 2017 for Singapore Application No. 11201607584P. (7 pages).
U.S. Notice of Allowance in U.S. Appl. No. 14/610,770 dated Sep. 26, 2017. (12 pages).
U.S. Notice of Allowance in U.S. Appl. No. 15/332,982 dated Sep. 21, 2017. (5 pages).
EPO Extended Search Report for European Application No. 171684883.5 dated Jul. 25, 2017 (8 pages).
EPO Supplementary Search Report for European Application No. 15762019.6 dated Aug. 9, 2017 (16 pages).
U.S. Office Action in U.S. Appl. No. 15/099,447 dated Oct. 3, 2017 (21 pages).
Chen et al., "Hierarchically porous graphene-based hybrid electrodes with excellent electrochemical performance", Journal of Materials Chemistry A: Materials for Energy and Sustainability, vol. 1, No. 33, Jan. 1, 2013, pp. 9409-9413.
Chinese Office Action in Application No. 201580006829.5 dated Jan. 23, 2018 (with English translation) (13 pages).
European Extended Search Report in Application No. 15786691.4 dated Dec. 1, 2017 (10 pages).
European Extended Search Report in Application No. 15789852.9 dated Dec. 6, 2017 (8 pages).
Japanese Office Action in Application No. 2017-042023 dated Jan. 9, 2018 (with English translation) (9 pages).
Singapore Search Report and Written Opinion in Application No. 11201701654U dated Dec. 6, 2017 (6 pages).
Taiwanese Office Action in Application No. 102146079 dated Dec. 12, 2017 (with English translation) (4 pages).
U.S. Notice of Allowance in U.S. Appl. No. 14/843,944 dated Feb. 9, 2018 (9 pages).
U.S. Office Action for U.S. Appl. No. 15/099,482 dated Feb. 23, 2018 (9 pages).
U.S. Office Action in U.S. Appl. No. 14/609,325 dated Jan. 16, 2018 (11 pages).
U.S. Office Action in U.S. Appl. No. 14/656,190 dated Jan. 10, 2018 (14 pages).
U.S. Office Action in U.S. Appl. No. 14/856,471 dated Jan. 11, 2018 (36 pages).
U.S. Office Action in U.S. Appl. No. 15/099,588 dated Feb. 1, 2018 (6 pages).
Wang et al., "Preparation of high-surface-area carbon nanoparticle/graphene composites", Carbon, Elsevier, Oxford, GB, vol. 50, No. 10, Apr. 8, 2012, pp. 3845-3853.
Indian Office Action for Appl. Ser. No. 7731/DELNP/2014 dated Jul. 26, 2018 (6 pages).
Japanese Office Action for Appl. Ser. No. 2017-002652 dated Jul. 3, 2018 (8 pages).
Linnert, "Welding Metallurgy—Carbon and Alloy Steels", vol. I—Fundamentals (4th Edition), Chapter 2—The Structure of Metals, GML Publications, American Welding Society (AWS), Year: 1994, pp. 17-74. Retrieved from app.knovel.com/hotlink/pdf/id:kt0095RCL3/welding-metallurgy-carbon/structure-metals.
U.S. Final Office Action for U.S. Appl. No. 15/099,482 dated Aug. 27, 2018 (10 pages).
U.S. Non-Final Office Action for U.S. Appl. No. 15/099,239 dated Jul. 12, 2018 (31 pages).
U.S. Non-Final Office Action for U.S. Appl. No. 15/099,304 dated Aug. 27, 2018 (22 pages).
U.S. Notice of Allowance for U.S. Appl. No. 15/099,420 dated Aug. 8, 2018 (8 pages).
Office Action for Indian Appl. Ser. No. 1566/DELNP/2013 dated Feb. 2, 2018 (7 pages).
Office Action for Japanese Appl. Ser. No. 2016-521448 dated Mar. 16, 2018 (5 pages).
U.S. Notice of Allowance for U.S. Appl. No. 15/099,464 dated Feb. 28, 2018 (5 pages).
U.S. Office Action for U.S. Appl. No. 15/099,276 dated Mar. 22, 2018 (13 pages).
U.S. Office Action for U.S. Appl. No. 15/453,441 dated Mar. 22, 2018 (7 pages).
Bose et al.,"Microfabricated immune-isolating devices for transplanting therapeutic cells in vivo", Koch Institute of Integrative Cancer Research, Massachusetts Institute of Technology, Undated (1 page).
European Extended Search Report in Application No. 15837617.8 dated Mar. 22, 2018 (9 pages).
Singapore Written Opinion for Appl. Ser. No. 11201607584P dated Jun. 8, 2018 (7 pages).
Skrzypek et al., "Pancreatic islet macroencapsulation using microwell porous membranes", Scientific Reports, 7: 9186 | D01:10.1038/s41598-017-09647-7, Aug. 23, 2017 (12 pages).
U.S. Final Office Action for U.S. Appl. No. 14/707,808 dated Jun. 27, 2018 (28 pages).
U.S. Non-Final Office Action for U.S. Appl. No. 15/099,410 dated Jun. 13, 2018 (15 pages).
U.S. Notice of Allowance for U.S. Appl. No. 15/453,441 dated Jun. 12, 2018 (8 pages).
U.S. Office Action for U.S. Appl. No. 15/099,056 dated May 29, 2018 (33 pages).
U.S. Office Action for U.S. Appl. No. 15/099,289 dated Jun. 7, 2018 (16 pages).
Vatanpour et al., "Fabrication and characterization of novel antifouling nanofiltration membrane prepared from oxidized multiwalled carbon nanotube/polyethersulfone nanocomposite", Journal of Membrane Science, vol. 375, Elsevier, Apr. 6, 2011, pp. 284-294.
Zhang et al., "Synergetic effects of oxidized carbon nanotubes and graphene oxide on fouling control and anti-fouling mechanism of polyvinylidene fluoride ultrafiltration membranes", Journal of Membrane Science, vol. 448, Elsevier, Aug. 7, 2013, pp. 81-92.
U.S. Final Office Action for U.S. Appl. No. 14/609,325 dated Sep. 12, 2018 (8 pages).
U.S. Final Office Action for U.S. Appl. No. 15/099,289 dated Oct. 15, 2018 (14 pages).
U.S. Non-Final Office Action for U.S. Appl. No. 14/656,657 dated Oct. 10, 2018 (6 pages).
U.S. Non-Final Office Action for U.S. Appl. No. 14/707,808 dated Nov. 15, 2018 (34 pages).
U.S. Non-Final Office Action for U.S. Appl. No. 15/099,269 dated Oct. 5, 2018 (11 pages).
U.S. Non-Final Office Action for U.S. Appl. No. 15/099,276 dated Nov. 1, 2018 (13 pages).

(56) References Cited

OTHER PUBLICATIONS

U.S. Notice of Allowance for U.S. Appl. No. 15/099,056 dated Nov. 16, 2018 (8 pages).
U.S. Appl. No. 61/452,704, filed Mar. 15, 2011, Russo et al.
Apel et al. "Effect of nanosized surfactant molecules on the etching of ion tracks: New degrees or freedom in design of pore shape", Nuclear Instruments and Methods in Physics Research Section B: Beam Interactions with Materials and Atoms, vol. 209, Aug. 2003, pp. 329-334.
Australian Office Action for Appl. Ser. No. 2015252784 dated Mar. 25, 2019 (11 pages).
Australian Office Action for Appl. Ser. No. 2015255756 dated Feb. 22, 2019 (5 pages).
Extended European Search Report for Appl. Ser. No. 16833430.8 dated Apr. 25, 2019 (11 pages).
Extended European Search Report for Appl. Ser. No. 16833432.4 dated Apr. 16, 2019 (14 pages).
Extended European Search Report for Appl. Ser. No. 16833433.2 dated Mar. 4, 2019 (15 pages).
International Search Report and Written Opinion for PCT Appl. Ser. No. PCT/US2018/065514 (16 pages).
Japanese Office Action for Appl. Ser. No. 2016-565216 dated Feb. 26, 2019 (7 pages).
Kim et al., "High quality reduced graphene oxide through repairing with multi-layered graphene ball nanostructures", Scientific Reports, vol. 3, No. 1, Nov. 19, 2013, pp. 1-6.
Singapore Written Opinion for Appl. Ser. No. 11201800845X dated Feb. 26, 2019 (8 pages).
Singapore Written Opinion for Appl. Ser. No. 11201800883R dated Feb. 22, 2019 (7 pages).
Singapore Written Opinion for Appl. Ser. No. 11201800968Q dated Feb. 19, 2019 (6 pages.
U.S. Final Office Action for U.S. Appl. No. 15/099,269 dated Apr. 18, 2019 (7 pages).
U.S. Final Office Action for U.S. Appl. No. 15/099,304 dated Apr. 19, 2019 (27 pages).
U.S. Non-Final Office Action for U.S. Appl. No. 14/656,657 dated Mar. 28, 2019 (9 pages).
U.S. Non-Final Office Action for U.S. Appl. No. 14/686,452 dated May 3, 2019 (7 pages).
U.S. Non-Final Office Action for U.S. Appl. No. 15/099,193 dated May 2, 2019 (19 pages).
Canadian Office Action for Appl. Ser. No. 2,865,648 dated Jan. 16, 2019 (4 pages).
EPO Office Action for Appl. Ser. No. 13714806.0 dated Dec. 5, 2018 (6 pages).
EPO Office Action for Appl. Ser. No. 15/786,691.4 dated Dec. 5, 2018 (6 pages).
Extended European Search Report for Appl. Ser. No. 16833431.6 dated Feb. 25, 2019 (16 pages).
Koenig et al., "Selective Molecular Sieving Through Porous Graphene", Nature Nanotechnology, vol. 7, No. 11, pp. 728-732 (Including Supplementary Informaton) (23 pages).
Non-Final Office Action on U.S. Appl. No. 15/410,457 dated Feb. 28, 2019.
U.S. Advisory Action for U.S. Appl. No. 15/099,289 dated Jan. 8, 2019 (6 pages).
U.S. Final Office Action for U.S. Appl. No. 14/686,452 dated Dec. 13, 2018 (6 pages).
U.S. Final Office Action for U.S. Appl. No. 15/099,239 dated Feb. 21, 2019 (26 pages).
U.S. Non-Final Office Action for U.S. Appl. No. 14/609,325 dated Jan. 14, 2019 (7 pages).
U.S. Non-Final Office Action for U.S. Appl. No. 15/099,482 dated Jan. 31, 2019 (13 pages).
U.S. Notice of Allowance for U.S. Appl. No. 15/099,289 dated Jan. 18, 2019 (7 pages).
U.S. Notice of Allowance for U.S. Appl. No. 15/099,410 dated Jan. 3, 2019 (9 pages).
Extended European Search Report for Appl. Ser. No. 16833429.0 dated Aug. 9, 2019 (14 pages).
Farah et al., "Long-Term Implant Fibrosis Prevention in Rodents and Non-Human Primates Using Crystallized Drug Formulations", Nature Materials, vol. 18, Aug. 2019, pp. 892-904.
Japanese Office Action for Appl. Ser. No. 2017-511982 dated Jul. 9, 2019 (6 pages).
Raimondo et al., "Functional muscle recovery with nanoparticle-directed M2 macrophage polarization in mice", Proceedings of the National Academy of Sciences of the United States of America (PNAS), Oct. 1, 2018, pp. 1-6.
University of Massachusetts Medical School, "Fibrosis Mitigation Pathway", PowerPoint Presentation, date of presentation unknown (6 pages).
U.S. Non-Final Office Action for U.S. Appl. No. 15/589,135 dated Aug. 1, 2019 (11 pages).
U.S. Notice of Allowance for U.S. Appl. No. 14/609,325 dated Jul. 30, 2019 (7 pages).
U.S. Notice of Allowance for U.S. Appl. No. 15/410,457 dated Aug. 14, 2019 (8 pages).
Yang et al., "Large-area graphene-nanomesh/carbon-nanotube hybrid membranes for ionic and molecular nanofiltration", Science, vol. 364, Jun. 14, 2019, pp. 1057-1062 (7 pages).
Zhang et al., "Rapid and Long-Term Glycemic Regulation with a Balanced Charged Immune-Evasive Hydrogel in T1DM Mice", Advanced Functional Materials, Advanced Science News, Feb. 28, 2019, pp. 1-9.
Zhang et al., "Rapid and Long-Term Glycemic Regulation with a Balanced Charged Immune-Evasive Hydrogel in T1DM Mice", Advanced Functional Materials, Advanced Science News, Feb. 28, 2019, Supporting Information (13 pages).
Anasori et al., "2D metal carbides and nitrides (MXenes) for energy storage", Nature Reviews, vol. 2, Article No. 16098, Jan. 17, 2017, pp. 1-17.
Australian Office Action for Appl. Ser. No. 2018200090 dated Apr. 30, 2019 (4 pages).
Huang et al., "Ultrathin Carbon Molecular Sieve Films and Room-Temperature Oxygen Functionalization for Gas-Sieving", ACS Applied Maters & Interfaces 2019, vol. 11, Apr. 16, 2019, pp. 16729-16736.
Japanese Office Action for Appl. Ser. No. 2016-566751 dated Jun. 7, 2019 (8 pages).
Mojtabavi et al., "Single-Molecule Sensing Using Nanopores in Two-Dimensional Transition Metal Carbide (MXene) Membranes", American Chemical Society, ACS Nano 2019, vol. 13, Mar. 7, 2019, pp. 3042-3053.
Neumann et al., "Bottom-Up Synthesis of Graphene Monolayers with Tunable Crystallinity and Porosity", American Chemical Society, ACS Nano, May 21, 2019, pp. A-M (13 pages).
Pang et al., "Applications of 2D MXenes in energy conversion and storage systems", Chemical Society Review, 2019, vol. 48, No. 1, Jun. 25, 2018, pp. 72-133.
U.S. Advisory Action for U.S. Appl. No. 15/099,239 dated Jun. 21, 2019 (7 pages).
U.S. Final Office Action for U.S. Appl. No. 14/707,808 dated Jun. 26, 2019 (37 pages).
U.S. Non-Final Office Action for U.S. Appl. No. 15/308,351 dated Jun. 3, 2019 (9 pages).
U.S. Notice of Allowance for U.S. Appl. No. 15/099,269 dated Jun. 6, 2019 (8 pages).
Allen et al., "Craters on silicon surfaces created by gas cluster ion impacts," Journal of Applied Physics, 92(7): 3671-3678 (Oct. 2002).
Atmeh et al., "Albumin Aggregates: Hydrodynamic Shape and Physico-Chemical Properties," Jordan Journal of Chemistry, 2(2): 169-182 (2007).
Chen et al., "Mechanically Strong, Electrically Conductive, and Biocompatible Graphene Paper," Adv. Mater., 20(18): 3557-3561 (Sep. 2008) (available online Jul. 2008).
CN Office Action in Chinese Application No. 201380013988.9 dated Aug. 18, 2016 (English translation not readily available).
Fuertes, "Carbon composite membranes from Matrimid® and Kapton® polyimides for gas separation," Microporous and Mesoporous Materials, 33: 115-125 (1991).

(56) References Cited

OTHER PUBLICATIONS

Galashev, "Computer study of the removal of Cu from the graphene surface using Ar clusters," Computational Materials Science, 98: 123-128 (Feb. 2015) (available online Nov. 2014).
International Search Report and Written Opinion in PCT/US2015/013599 dated Jul. 20, 2015.
International Search Report and Written Opinion in PCT/US2015/013805 dated Apr. 30, 2015.
International Search Report and Written Opinion in PCT/US2015/018114 dated Jun. 3, 2015.
International Search Report and Written Opinion in PCT/US2015/020246 dated Jun. 10, 2015.
International Search Report and Written Opinion in PCT/US2015/020296 dated Jun. 17, 2015.
International Search Report and Written Opinion in PCT/US2015/028948 dated Jul. 16, 2015.
International Search Report and Written Opinion in PCT/US2015/029932 dated Oct. 6, 2015.
Inui et al., "Molecular dynamics simulations of nanopore processing in a graphene sheet by using gas cluster ion beam," Appl. Phys. A, 98: 787-794 (Mar. 2010) (available online Dec. 2009).
Koh et al., "Sensitive NMR Sensors Detect Antibodies to Influenza," NIH PA Author Manuscript PMC (Apr. 2009), also published in Angew. Chem. Int'l. Engl, 47(22): 4119-4121 (May 2008) (available online Apr. 2008).
Lehtinen et al., "Cutting and controlled modification of graphene with ion beams," Nanotechnology, 22: 175306 (8 pages) (Mar. 2011).
Matteucci et al., "Transport of gases and Vapors in Glass and Rubbery Polymers," in Materials Science of Membranes for Gas and Vapor Separation. (Yampolskii et al., eds. 2006) (available online Jun. 2006).
O'Hern et al., "Development of process to transfer large areas of LPCVD graphene from copper foil to a porous support substrate," 1-62 (M.S. Thesis, Massachusetts Institute of Technology, Thesis) (Sep. 2011).
Plant et al. "Size-dependent propagation of Au nanoclusters through few-layer graphene," Nanoscale, 6: 1258-1263 (2014) (available online Oct. 2013).
Popok. "Cluster Ion Implantation in Graphite and Diamond: Radiation Damage and Stopping of Cluster Constituents," Reviews on Advanced Materials Science, 38(1): 7-16 (2014).
Russo et al., "Atom-by-atom nucleation and growth of graphene nanopores," PNAS 109(16): 5953-5957 (Apr. 2012).
U.S. Notice of Allowance in U.S. Appl. No. 14/610,770 dated Aug. 12, 2016.
U.S. Office Action in U.S. Appl. No. 14/656,190 dated Aug. 29, 2016.
U.S. Office Action for U.S. Appl. No. 14/656,580 dated Jun. 2, 2016.
U.S. Office Action in U.S. Appl. No. 14/819,273 dated Jul. 6, 2016.
U.S. Office Action for U.S. Appl. No. 14/856,198 dated Jun. 3, 2016.
Yoon, "Simulations show how to turn graphene's defects into assets," ScienceDaily (Oct. 4, 2016), www.sciencedaily.com/releases/2016/10/161004120428.htm.
Zabihi et al., "Formation of nanopore in a suspended graphene sheet with argon cluster bombardment: A molecular dynamics simulation study," Nuclear Instruments and Methods in Physics Research B, 343: 48-51: (Jan. 2015) (available online Nov. 2014).
Zhang et al. Modern Thin-Film Technology 284-285 (Metallurgical Industry Press, 1st ed. 2009) (English translation not readily available).
Zhao et al. (2012), "Effect of SiO2 substrate on the irradiation-assisted manipulation of supported graphene: a molecular dynamics study," Nanotechnology 23(28): 285703 (Jul. 2012) (available online Jun. 2012).
Zhao et al. (May 2012), "Drilling Nanopores in Graphene with Clusters: A Molecular Dynamics Study," J. Phys. Chem. C, 116(21): 11776-11178 (2012) (available online May 2012).

U.S. Appl. No. 14/193,007, filed Feb. 28, 2014.
U.S. Appl. No. 14/856,471, filed Sep. 16, 2015.
U.S. Appl. No. 15/099,295, filed Apr. 14, 2016.
U.S. Appl. No. 15/099,410, filed Apr. 14, 2016.
U.S. Appl. No. 15/099,420, filed Apr. 14, 2016.
U.S. Appl. No. 15/099,289, filed Apr. 14, 2016.
U.S. Appl. No. 15/099,447, filed Apr. 14, 2016.
U.S. Appl. No. 15/099,269, filed Apr. 14, 2016.
U.S. Appl. No. 15/099,239, filed Apr. 14, 2016.
U.S. Appl. No. 15/099,464, filed Apr. 14, 2016.
U.S. Appl. No. 15/099,276, filed Apr. 14, 2016.
U.S. Appl. No. 15/099,482, filed Apr. 14, 2016.
U.S. Appl. No. 15/099,056, filed Apr. 14, 2016.
U.S. Appl. No. 15/099,099, filed Apr. 14, 2016.
U.S. Appl. No. 14/656,190, filed Mar. 12, 2015.
U.S. Appl. No. 15/099,304, filed Apr. 14, 2016.
U.S. Appl. No. 15/099,588, filed Apr. 14, 2016.
U.S. Appl. No. 14/707,808, filed May 8, 2015.
U.S. Appl. No. 14/819,273, filed Aug. 5, 2015.
U.S. Appl. No. 14/856,198, filed Sep. 16, 2015.
U.S. Appl. No. 14/754,531, filed Jun. 29, 2015.
U.S. Appl. No. 14/610,770, filed Jan. 30, 2015.
U.S. Appl. No. 14/656,657, filed Mar. 12, 2015.
U.S. Appl. No. 14/609,325, filed Jan. 29, 2015.
U.S. Appl. No. 14/656,580, filed Mar. 12, 2015.
U.S. Appl. No. 13/480,569, filed May 25, 2012.
U.S. Appl. No. 14/843,944, filed Sep. 2, 2015.
U.S. Appl. No. 15/099,193, filed Apr. 14, 2016.
U.S. Pat. No. 9,610,546, filed Apr. 4, 2017, U.S. Appl. No. 14/856,198, filed Sep. 16, 2015.
U.S. Pat. No. 9,067,811, filed Jun. 10, 2015, U.S. Appl. No. 13/480,569, filed May 25, 2012.
U.S. Appl. No. 15/308,351, filed Nov. 1, 2016.
U.S. Appl. No. 13/422,753, filed Mar. 16, 2012.
U.S. Pat. No. 9,567,224, filed Feb. 14, 2017, U.S. Appl. No. 13/795,276, filed Mar. 12, 2013.
U.S. Pat. No. 9,028,663, filed May 12, 2015, U.S. Appl. No. 13/804,085, filed Mar. 14, 2013.
U.S. Pat. No. 9,463,421, filed Oct. 11, 2016, U.S. Appl. No. 13/803,958, filed Mar. 14, 2013.
U.S. Pat. No. 9,095,823, filed Aug. 4, 2015, U.S. Appl. No. 13/802,896, filed Mar. 14, 2013.
U.S. Appl. No. 13/779,963, filed Feb. 28, 2013.
U.S. Appl. No. 15/289,944, filed Oct. 10, 2016.
U.S. Pat. No. 9,242,865, filed Jan. 26, 2016, U.S. Appl. No. 14/192,796, filed Feb. 27, 2014.
U.S. Pat. No. 9,480,952, filed Nov. 1, 2016, U.S. Appl. No. 14/200,195, filed Mar. 7, 2014.
U.S. Pat. No. 9,505,192, filed Nov. 29, 2016, U.S. Appl. No. 14/200,530, filed Mar. 7, 2014.
U.S. Pat. No. 9,169,575, filed Oct. 27, 2015, U.S. Appl. No. 14/195,802, filed Mar. 3, 2014.
U.S. Appl. No. 14/858,741, filed Sep. 18, 2015.
U.S. Appl. No. 15/336,545, filed Oct. 27, 2016.
U.S. Appl. No. 14/971,922, filed Dec. 16, 2015.
U.S. Appl. No. 14/686,452, filed Apr. 14, 2015.
U.S. Appl. No. 15/332,982, filed Oct. 24, 2016.
U.S. Pat. No. 9,475,709, filed Oct. 25, 2016, U.S. Appl. No. 13/719,579, filed Dec. 19, 2012.
U.S. Pat. No. 8,361,321, filed Jan. 29, 2013, U.S. Appl. No. 12/868,150, filed Aug. 25, 2010.
U.S. Pat. No. 9,193,587 U.S. Appl. No. 13/548,539, Nov. 24, 2015 filed Jul. 13, 2012.
U.S. Pat. No. 9,572,918, filed Feb. 21, 2017, U.S. Appl. No. 13/923,503, filed Jun. 21, 2013.
U.S. Appl. No. 14/031,300, filed Sep. 19, 2013.
U.S. Appl. No. 15/410,457, filed Jan. 19, 2017.
U.S. Pat. No. 9,592,475, filed Mar. 14, 2017, U.S. Appl. No. 14/203,655, filed Mar. 11, 2014.
U.S. Appl. No. 14/656,335, filed Mar. 12, 2015.
U.S. Appl. No. 14/656,617, filed Mar. 12, 2015.
U.S. Appl. No. 15/589,135, filed May 8, 2017.

(56) References Cited

OTHER PUBLICATIONS

U.S. Pat. No. 9,193,587, filed Nov. 24, 2015, U.S. Appl. No. 13/548,539, filed Jul. 13, 2012.
U.S. Appl. No. 15/453,441, filed Mar. 8, 2017.
Barreiro et al. "Understanding the catalyst-free transformation of amorphous carbon into graphene by current-induced annealing," Scientific Reports, 3 (Article 1115): 1-6 (Jan. 2013).
Botari et al., "Graphene healing mechanisms: A theoretical investigation," Carbon, 99: 302-309 (Apr. 2016) (published online Dec. 2015).
Chen et al., "Defect Scattering in Graphene," Physical Review Letters, 102: 236805-1-236805-4 (Jun. 2009).
Chen et al., "Self-healing of defected graphene," Applied Physics Letters, 102(10): 103107-1-103107-5 (Mar. 2013).
Cheng et al., "Ion Transport in Complex Layered Graphene-Based Membranes with Tuneable Interlayer Spacing," Science Advances, 2(2): e1501272 (9 pages) (Feb. 2016).
Crock et al., "Polymer Nanocomposites with Graphene-Based Hierarchical Fillers as Materials for Multifunctional Water Treatment Membranes," Water Research, 47(12): 3984-3996 (Aug. 2013) (published online Mar. 2013).
Han et al., "Ultrathin Graphene Nanofiltration Membrane for Water Purification," Advanced Functional Materials, 23(29): 3693-3700 (Aug. 2013).
International Search Report and Written Opinion in PCT/US2016/027583 dated Jan. 13, 2017.
Written Opinion in PCT/US2016/027590 dated Jan. 6, 2017.
International Search Report and Written Opinion in PCT/US2016/027594 dated Jan. 13, 2017.
International Search Report and Written Opinion in PCT/US2016/027628 dated Jan. 9, 2017.
International Search Report and Written Opinion in PCT/US2016/027631 dated Jan. 13, 2017.
International Search Report and Written Opinion in PCT/US2016/027632 dated Jan. 9, 2017.
Written Opinion in PCT/US2016/052010 dated Dec. 20, 2016.
International Search Report in PCT/US2016/027629 dated Dec. 8, 2016.
International Search Report in PCT/US2016/052007 dated Dec. 27, 2016.
Kjeldsen, T., "Yeast secretory expression of insulin precursors," Appl Microbiol Biotechnol, 54: 277-286 (May 2000).
Lin et al., "A Direct and Polymer-Free Method for Transferring Graphene Grown by Chemical Vapor Deposition to Any Substrate," ACSNANO, 8(2): 1784-1791 (Jan. 2014).
Liu et al. "Synthesis of high-quality monolayer and bilayer graphene on copper using chemical vapor deposition," Carbon, 49(13): 4122-4130 (Nov. 2011) (published online May 2011).
O'Hern et al., "Nanofiltration across defect-sealed nanoporous monolayer graphene," Nano Letters, 15(5): 3254-3260 (Apr. 2015).
U.S. Corrected Notice of Allowance in U.S. Appl. No. 13/480,569 dated May 26, 2015.
U.S. Notice of Allowance for U.S. Appl. No. 14/610,770 dated Apr. 25, 2016.
U.S. Notice of Allowance in U.S. Appl. No. 14/819,273 dated Dec. 14, 2016.
U.S. Notice of Allowance in U.S. Appl. No. 13/480,569 dated Feb. 27, 2015.
U.S. Office Action in U.S. Appl. No. 13/480,569 dated Jul. 30, 2014.
U.S. Office Action in U.S. Appl. No. 14/856,471 dated Dec. 1, 2016.
U.S. Restriction Requirement in U.S. Appl. No. 14/193,007 dated Jul. 17, 2015.
Wang et al., "Graphene Oxide Membranes with Tunable Permeability due to Embedded Carbon Dots," Chemical Communications, 50(86): 13089-13092 (Nov. 2014) (published online Sep. 2014).
Xu et al., "Graphene Oxide-$TiO_2$ Composite Filtration Membranes and their Potential Application for Water Purification," Carbon, 62: 465-471 (Oct. 2013) (published online Jun. 2013).
Zhao et al., "A glucose-responsive controlled release of insulin system based on enzyme multilayers-coated mesoporous silica particles," Chem. Commun., 47: 9459-9461 (Jun. 2011).

\* cited by examiner 500 nm 500 nm

NANOPARTICLE MODIFICATION AND PERFORATION OF GRAPHENE

CROSS-REFERENCE TO RELATED APPLICATIONS

This application claims the benefit of priority under 35 U.S.C. § 119 from U.S. Provisional Patent Application No. 62/202,122, filed Aug. 6, 2015, which is hereby incorporated by reference in its entirety.

FIELD

The present disclosure generally relates to graphene based materials and other two-dimensional materials, and, more specifically, to methods for producing pores in layers of graphene, other two-dimensional materials and combinations thereof.

BACKGROUND

Graphene has garnered widespread interest for use in a number of applications due to its favorable mechanical and electronic properties. The electrical conductivity of graphene can be influenced by the amount and type of chemical functionalization on the graphene and the quantity of defects in the graphene basal plane. Although pristine graphene typically displays the highest electrical conductivity values, it can sometimes be desirable to tune the electrical conductivity and modify the band structure. Tailoring of the band structure can be accomplished, for example, by introducing a plurality of defects (i.e., holes or perforations) within the graphene basal plane or increasing the number of such defects. The band structure can be influenced by both the size, type, and number of holes present. Applications that have been proposed for graphene include optical devices, mechanical structures, and electronic devices. In addition to the foregoing applications, there has been some interest in perforated graphene for filtration applications, particularly single-layer perforated graphene. Current techniques used to perforate CVD graphene include oxidation processes (e.g., UV ozone, plasma oxidation, and high temperatures), ion beams, template cutting, and direct synthesis using specialized growth substrates.

Other two-dimensional materials, also known as 2D materials, having a thickness of a few nanometers or less and an extended planar lattice, or an extended planar surface if not a lattice, are also of interest for various applications. In an embodiment, a two dimensional material has a thickness of 0.3 to 1.2 nm. In another embodiment, a two dimensional material has a thickness of 0.3 to 3 nm. For example, molybdenum sulfide is a representative chalcogenide having a two-dimensional molecular structure, and other various chalcogenides can constitute the two-dimensional material in the present disclosure. Two-dimensional materials include metal chalogenides (e.g., transition metal dichalogenides), transition metal oxides, hexagonal boron nitride, graphene, silicene and germanene (see: Xu et al. (2013) "Graphene-like Two-Dimensional Materials) Chemical Reviews 113: 3766-3798).

In view of the foregoing, techniques that allow pores to be produced in graphene and other two dimensional materials with a desired pore density and pore size would be of considerable benefit in the art. The present disclosure satisfies this need and provides related advantages as well.

SUMMARY

The present disclosure describes methods for introducing or modifying pores in the basal plane of a plurality of graphene sheets stacked upon one another. In embodiments, the methods involve exposing about 2-10 layers of stacked graphene sheets (i.e., multi-layer graphene) to a particle beam comprising nanoparticles (NPs) or clusters having an energy of about 2 keV or greater (per nanoparticle or clusters) to perforate the stacked graphene sheets. In embodiments, at least two of the layers are independently stacked. As used herein, independently as-synthesized sheets which have been layered or stacked on a substrate are termed "independently stacked." For example, the nanoparticles are metal nanoparticles, carbon nanoparticles, gas clusters and/or core shell structure nanoparticles. The methods described herein are also applicable to other multi-layered 2D materials and to combinations of layered 2D materials.

The present disclosure further describes methods including the step of exposing a sheet of graphene-based material to a particle or cluster beam, the graphene-based material comprising multi-layer graphene having from 2 to 10 layers of graphene and the particle beam comprising nanoparticles or clusters as described herein. In further embodiments, the multi-layer graphene has from 2 to 5 layers of graphene.

In embodiments, the nanoparticle or cluster energy may be greater than or equal to about 2 keV but less than about 500 keV, greater than 2 keV and less than 100 keV, greater than 2 keV and less than 50 keV or greater than or equal to 2 keV and less than or equal to 30 keV. In further embodiments, the nanoparticle may comprise a plurality of atoms and the energy is from 0.05 eV to 50 eV per atom, 0.1 eV to 50 eV per atom, or 1 eV to 1 keV per atom. In further embodiments, the fluence is $1 \times 10^8$-$1 \times 10^{12}$ NPs/cm$^2$. In embodiments the nanoparticle perforation efficiency is from 1% to 100%. In some aspects, the methods disclosed herein further include steps for nanoparticle generation and subsequent acceleration. In an example, the potential is from 1 to 100 kV. In some instances additional ionization is done such as electron impact and electrospray to provide additional energy to the NPs for perforations. For NPs columbic limitation may limit the amount of charge (too much charge may cause the particle to fragment). In an embodiment, the charge is up to 4e.

In embodiments, the nanoparticles are from 1 nm to 100 nm, 1 nm to 50 nm, 2 nm to 50 nm, 1 nm to 25 nm, 2 nm to 25 nm, 2 nm to 10 nm, 3 nm to 30 nm, or 10 nm to 50 nm in size. In some instances the NPs are characterized by a uniform size distribution, in other instances by a Gaussian size distribution, in some cases by a normal distribution and still further in other instances in a bimodal distribution. When the NPs are provided in a biomodal distribution, in some embodiments both modes are used for perforation and in other embodiments one mode is utilized for perforation and the other for adding additional energy to the graphene. In additional embodiments, the distribution of NP sizes is not a standard distribution.

In an aspect, the graphene-based material is pretreated before exposure to the beam of nanoparticles. In one example, a multi-layer graphene-based material is pretreated as a unit. In another example, layers of graphene-based material are pretreated individually before being stacked. In some embodiments the whole layer is treated while in other embodiments the selected regions of the sheet are treated. As an example, selected regions of the sheet are treated so that the sheet as whole perforates uniformly. In an embodiment, the pretreatment process introduces point defects into one or more sheets of graphene. In a further embodiment, the pretreatment process introduces pores having an average size less than 1 nm. In an example, the multi-layered stack of graphene sheets is pretreated as a unit. As another example, one or more individual graphene sheets are pretreated before assembly into a stack. In embodiments, the pretreatment step is selected from thermal treatment, UV-oxygen treatment, ion beam treatment, and combinations thereof. In some embodiments, the graphene-based materials are irradiated with a broad ion beam having an ion energy from 50 eV to 10 keV and a fluence from $3 \times 10^{10}$ ions/cm$^2$ to $8 \times 10^{11}$ ions/cm$^2$ or $3 \times 10^{10}$ ions/cm$^2$ to $8 \times 10^{13}$ ions/cm$^2$. In some embodiments, the irradiation time is from 0.1 milliseconds to less than 10 seconds, from 1 millisecond to less than 10 seconds, from 1 second to 100 seconds, or from 10 second to 1000 seconds. In general, if relatively small areas are irraditated then the times are lower than when relatively larger areas are irradiated. In a further embodiment, the pretreatment process irradiates the graphene to introduce moieties into the graphene lattice to weaken it and make it more easily perforated with nanoparticles. Such a pretreatment process can enable "chemically assisted" perforation. An example of such a moiety is an oxygen containing compound. In embodiments, suitable moieties are introduced with nanoparticle pretreatment.

In a further aspect, the graphene-based material is non-perforated prior to exposure to the nanoparticle beam. In further embodiments, the graphene-based material is perforated prior to exposure to the nanoparticle beam ("pre-perforated"). In some embodiments a first layer of graphene is perforated, and then subsequently additional layers of graphene are perforated after the additional layers are applied to the first layer. A variety of perforation methods are known to the art, including ion-based methods and oxidation based methods. In an embodiment, the pre-perforated graphene-based material comprises a first set of pores having a first pore size and exposure to the nanoparticle beam then modifies the pre-perforated sheet of graphene-based material. In an embodiment, the modification includes creating a second set of pores having a second pore size extending through the multiple graphene sheets, modifying the first pore size or combinations thereof. In embodiments, the pore size of the perforated graphene-based materials has a bimodal distribution. Exemplary combinations of pore sizes include, but are not limited to a combination of pores with a size less than 3 nm and pores with a size greater than 15 nm and less than or equal to 100 nm. The combinations could be formed through a combination of pre-perforation and NP perforation, but also could be formed from combinations of NP perforation. In an embodiment, the ratio of the area of pores with a size less than 3 nm to the area of the sheet is from 1 to 10% while the ratio of the area of pores with a size greater than 15 nm and less than or equal to 100 nm to the area of the sheet is from 1 to 10%.

In a further aspect, exposure of the graphene-based material to the nanoparticle beam perforates the graphene layers to different degrees. In an embodiment, at least one layer of the graphene is not perforated. In a further embodiment, at least one layer of the graphene is perforated. For example, after exposure of the graphene-based material to the nanoparticle beam at least one layer is highly perforated and at least one layer is not perforated. In an additional example, a first layer of graphene is perforated with nanoparticles to obtain pores of a first size then a second layer of graphene is transferred to the first layer. With the second layer "in front of" the first layer with respect to the source of nanoparticles, the second layer is perforated with nanoparticles to obtain pores of a second size, with the perforation conditions being selected so that the nanoparticles used in the second perforation step do not penetrate the first layer. The first pore size and the second pore size are different. In embodiments, the first pore size is larger than the second pore size. In additional embodiments, the first layer of graphene is perforated using a plurality of a first type of nanoparticle and the second layer of graphene is perforated using a plurality of a second type of nanoparticle. The first type of nanoparticle may differ in size and/or composition than the second type of nanoparticle.

In embodiments, the nanoparticle bombardment takes place while the graphene-based material is disposed on a porous substrate. In an embodiment, the supporting structure is configured so that at least some portions of the sheet of graphene-based material are suspended from the supporting structure. Suitable substrates include, but are not limited to polymeric, silicon nitride (SiN), ceramics, carbon or metal substrates. In an embodiment, each suspended area is greater than 10 nm and less than 10 micrometers. In further embodiments, at least one dimension of the opening in the supporting structure is less than 1 µm or less than or equal to 100 nm. In additional embodiments, the substrate may be patterned to provide at least one through-hole of a specified ratio of perimeter to area in order to control the stiffness of the composite graphene-based material and substrate. In different embodiments, the through hole takes the form of one or more circular holes or one or more slots, which may alternatively be termed slits. The slits may be parallel or crossed. In some embodiments, the slits may have an aspect ratio from 2:1 to 100:1. In an embodiment, the graphene-based material may be removed from the substrate after perforation and transferred to a different substrate.

In an embodiment, the graphene-based material is "in front" of the substrate with respect to the source of nanoparticles. In another embodiment, the graphene-based material is "behind" the substrate with respect to the source of nanoparticles, such that the nanoparticles pass through holes in the substrate before contacting the graphene-based material. In an embodiment where perforation occurs through the substrate, the ratio of thickness of the substrate to the pore diameter is less than 2 (e.g. 500 nm diameter pores in 1 µm thick substrate). One benefit to this configuration is to only impact and possibly damage or perforate the graphene where it is suspended (through the substrate pores). In a further embodiment where perforation occurs through the substrate, the face of the substrate facing the nanoparticle beam is coated with a sacrificial layer so that all NPs either hit it or perforate the graphene. The sacrificial layer can then be removed along with the nanoparticles, leaving perforated graphene on a substrate. This is beneficial when having NPs embedded in the substrate is detrimental.

In other embodiments, an assembly is formed of a first layer of graphene-based material on a first side of a porous substrate and a second layer of graphene-based material on the second side of the porous substrate. The substrate is selected to be sufficiently thin that when the assembly is exposed to a particle beam comprising nanoparticles or clusters, the nanoparticles or clusters can penetrate through the assembly and perforate both layers of graphene-based material. As examples, the first layer of graphene-based material is the same as the second layer of graphene based material, or the first layer is of a first type of graphene-based material and the second layer is of a second type of graphene-based material.

In additional embodiments, a first layer of graphene-based material is placed on a first side of an insulating substrate and a second layer of graphene-based material is placed on a second side of the insulating substrate. The first and second layer can then be biased separately. As examples, the first layer of graphene-based material is the same as the second layer of graphene based material, or the first layer is of a first type of graphene-based material and the second layer is of a second type of graphene-based material. Similarly, a first layer of a graphene-based material or other two dimensional material is placed on a first side of an insulating substrate and a second layer of graphene-based material or other two-dimensional material is placed on a second side of the insulating substrate.

In further embodiments, the perforated sheet of graphene-based material may be modified with a post-perforation treatment process. Exemplary post-perforation treatment processes include, but are not limited to, further dilation of the pores, reshaping of the pores, stabilization of the pores and increasing the fracture toughness of the sheet. In embodiments, further dilation of the pores may be achieved by irradiating the perforated graphene sheet with a broad ion beam. In an embodiment, the ions are selected from the group consisting of Xe, Ne, He, Ga and Ar and the ion energy ranges from 5 eV or 40 keV and the ion flux or beam density ranges from $1\times10^{12}$ ions/cm$^2$/s to $1\times10^{13}$ ions/cm$^2$/s, and fluences from $6.24\times10^{13}$ ions/cm$^2$ to $6.24\times10^{14}$ ions/cm$^2$. In an embodiment, the ions are selected from the group consisting of Xe, Ne, and Ar, the ion energy ranges from 5 eV to 40 keV, with an exemplary embodiment of 100 eV to 1000 eV and the ion dose ranges from $1\times10^1$ ions/cm$^2$ to $5\times10^{15}$ ions/cm$^2$. In an embodiment, the ion energy ranges from 1 keV to 40 keV and the ion dose ranges from $1\times10^{19}$ ions/cm$^2$ to $1\times10^{21}$ ions/cm$^2$. In an embodiment, the ion energy is 300 V and the ion dose is $1\times10^{14}$ ions/cm$^2$. In further embodiments, a rastered focused ion beam can be used instead of a broad ion beam. In further embodiments, dilation of the pores is accompanied by an increase in the overall percentage of porosity.

In additional embodiments, reshaping of the pores may be achieved by irradiating the perforated graphene sheet with a broad ion beam. In an embodiment, the ions are selected from the group consisting of Xe ions, Ne ions, and Ar ions and the ion energy ranges from 10 eV to 10 keV and the ion flux or beam density ranges from $1\times10^{12}$ ions/cm$^2$/s to $1\times10^{13}$ ions/cm$^2$/s, and fluences from $6.24\times10^{13}$ ions/cm$^2$ to $6.24\times10^{14}$ ions/cm$^2$. In further embodiments, stabilization of the pores may be achieved by irradiating the perforated graphene sheet with a broad ion beam, wherein the ions of the broad ion beam have an ion energy from 5 eV to 40 k eV and a fluence from $1\times10^{10}$ ions/cm$^2$ to $1\times10^{21}$ ions/cm$^2$. In some embodiments, the irradiation time is from 1 ms to 100 s. In further embodiments, the fracture toughness of the perforated sheet may be achieved by irradiating the perforated graphene sheet with a broad ion beam, wherein the ions of the broad ion beam have an ion energy from 50 eV to 1000 eV and a fluence from $3\times10^{10}$ ions/cm$^2$ to $8\times10^{11}$ ions/cm$^2$. Other methods for dilating, reshaping and/or stabilizing the pores include, but are not limited to exposure to ultraviolet light and oxygen, use of a carbon-selective etching solution, and application of heat. Electron irradiation could also be applied with energies in the 10-300 keV range.

The methods described herein may further comprise one or more of the following features. In embodiments the sheet of graphene-based material or the sheet comprising a graphene-based material is heated. For example, heating may add energy to the system. If an appropriate coefficient of thermal expansion (CTE) mismatch with the substrate occurs, heating may strain the graphene for perforation. Suitable heating methods include, but are not limited to, Joule heating of the graphene-based material, IR radiation, heating via a conductive plate, or any combination of the above. In embodiments, the graphene layers are tilted relative to the incidence angle of the impinging NPs. In further embodiments, this tilt is greater than zero and less than or equal to 89 degrees, is greater than 30 degrees and less than or equal to 89 degrees, or is from 45 degrees to 70 degrees. In an embodiment, an incidence angle of collimated nanoparticles may be referenced normal to the basal plane of the top-most sheet of graphene or other material. In additional embodiments, a trace amount of gas or other material containing an element or moiety of interest for functionalization of pore edges is present before NP perforation, during NP perforation, after NP perforation or any combination thereof to functionalize pores produced by the NPs. The gas may be introduced on the front side, back side, or both sides of the sheet of graphene-based material. In additional embodiments, a trace amount of a gas is present during NP perforation and/or after NP perforation to etch pores produced by the NPs. In embodiments, the pressure of gas is less than $10^{-3}$ Torr. In embodiments, the graphene-based material is pressurized with a gas from behind during exposure to the nanoparticle beam. In an embodiment, the gas pressure strains the graphene-based material during perforation. In another embodiment, the gas is used to functionalize the pores once the pores are produced.

The preferred gases for before and during functionalization would depend on the reaction of graphene and the gas within the high energy environment of the particle impact. This would be within about 100 nm of the edge of the particle impact. This fits into two general classes, and the gases would be added at a partial pressure of from $1\times10^{-6}$ Torr to $1\times10^{-3}$ Torr. The first class would be species that reacts with radicals, carbanions (negative charge centered on a carbon) and carbocations (positive charge centered on a carbon). Representative molecules include carbon dioxide, ethylene oxide and isoprene. The second class would be species that fragment to create species that react with graphene and defective graphene. Representative molecules would be polyethylene glycol, diacytylperoxide, azobisisobutyronitrile, and phenyl diazonium iodide.

In an additional aspect, the disclosure provides methods for perforating a graphene-containing sheet where a mask is used to limit perforation by the nanoparticles. The mask is placed "in front of" the graphene layer(s) with respect to the source of nanoparticles. In embodiments, the mask includes openings and nanoparticle perforation preferentially occurs through openings in the mask. Exemplary masks include, but are not limited to, masks formed from self-assembled bead layers, masks formed by selective etching of block co-polymer layers, masks formed by soft landing of nanoparticles, masks of patterned metal or polymer layers and masks formed from perforated graphene. Exemplary block co-polymer masks are described in Kim et al. "*Fabrication and Characterization of Large Area, Semiconducting Nanoperforated Graphene Materials,*" Nano Letters 2010 Vol. 10, No. 4, Mar. 1, 2010, pp 1125-1131). As another example, a polymeric photoresist can be used to make a patterned polymer layer via lithography. In an embodiment, a patterned metal layer can serve as both a mask and as an electrode.

In further embodiments, a sacrificial deformation layer is placed "in front of" the graphene layer(s) with respect to the source of nanoparticles. Such a deformation layer can be used to deform the nanoparticles, but still allow the nanoparticles to pass and continue on with sufficient energy to perforate the graphene layer(s). Exemplary materials for the sacrificial deformation layer include graphene or another two-dimensional material. In an embodiment, the nanoparticles are deformed to assume an oblate configuration.

In an additional aspect, the disclosure provides methods for perforating a composite sheet including at least one layer of graphene and at least one layer of another material. Additionally, the disclosure provides methods for perforating a sheet including a plurality of layers of graphene and at least one layer of another material. In examples, the layer of additional material is a contiguous layer or is not a contiguous layer. The sheet may be viewed as a composition of graphene and the other material(s).

In embodiments, the methods involve exposing the composite sheet to a particle beam comprising nanoparticles (NPs) or clusters to perforate the stacked graphene sheets. In embodiments, the nanoparticle or cluster energy is greater than or equal to about 2 keV but less than about 500 keV, greater than 2 keV and less than 100 keV, greater than 2 keV and less than 50 keV or greater than or equal to 2 keV and less than or equal to 30 keV. In further embodiments, the nanoparticle comprises a plurality of atoms and the energy is from 0.05 eV to 50 eV per atom or 0.1 eV to 50 eV per atom. In further embodiments, the fluence is $1\times10^8$-$1\times10^{12}$ NPs/cm$^2$. In embodiments, the nanoparticles are from 1 nm to 50 nm, 2 nm to 50 nm, 1 nm to 25 nm, 2 nm to 25 nm, 2 nm to 10 nm, 3 nm to 30 nm or 10 nm to 50 nm in size. In an exemplary embodiment, the nanoparticles are from 3 nm to 15 nm. Furthermore, in some embodiments, the perforation methods for perforation of composite materials can incorporate additional features as previously described for nanoparticle perforation of graphene. For example, the layers of the composite membranes can be tilted relative to the incidence angle of the impinging NPs.

In some embodiments, the graphene layer(s) are supported on a substrate and the at least one layer of the material other than graphene is "on top of" of the graphene layer(s) and supported by the graphene layer(s). As an example, a layer or partial layer of graphene nanoplatelets is deposited on top of a graphene layer. As another example, a two-dimensional material having different biorelevant properties than graphene can be placed "in front" of the graphene layers. In addition, a two-dimensional material can be selected for its ease of modification with a desired functionalization or coating. Suitable two-dimensional materials for this example include, but are not limited to MoS$_2$ and h-BN.

In some embodiments, the layer of the other material is inserted between two graphene layers. In embodiments, the other material(s) can be added between the layers to aid in perforation, to give additional functionality to the composite or a combination thereof. Exemplary layers of material other than graphene include, but are not limited to, porous materials and spacer materials. Both types of material can limit or prevent contact between adjacent graphene layers and influence the elasticity of the composite, thereby influencing the nanoparticle perforation process. Exemplary porous materials include, but are not limited to, highly perforated 2D materials, such as graphene and carbon nanomembranes (CNMs), block co-polymer (BCP) layers (with one element removed to make it porous), patterned metal and inorganic layers, thin porous Si, SiO$_2$, and SiN layers, irregularly shaped particles that may or may not have been fused to each other, and zeoloite particles. Exemplary spacer materials include, but are not limited to, carbon nanotubes and nanoparticles and lacy carbon. In further embodiments, the other material is a 2D material other than graphene or a material that is typically unstable under perforation conditions (e.g.

water). In additional embodiments, the added layers are located at the pore edges and provide functionalization to the pores.

Other Carbon Materials

In an additional aspect, the disclosure provides methods for perforating a thin carbon-based material. Exemplary thin carbon based materials have a thickness from 0.5 nm to 10 nm and include, but are not limited to thin carbon nanomembranes and graphene nanoplatelet membranes. Carbon nanomembranes are typically generated from crosslinked aromatic self-assembled monolayers and can be approximately 1 nm thick (M. Ai and A. Golzhauser, Beilstein Bozen Symposium on Molecular Engineering and Control May 14th-18th, 2012, Prien (Chiemsee), Germany). These Carbon nanomembranes (CNM) are appropriate for being perforated. Further embodiments include combinations of these Carbon nanomembranes with graphene, such as layers arranged as graphene/CNM (graphen on CNM), CNM/graphene (CNM on graphene), and graphene/CNM/graphene.

In embodiments, the methods involve exposing the composite sheet to a particle beam comprising nanoparticles (NPs) or clusters to perforate such carbon-based materials. In embodiments, the nanoparticle or cluster energy greater than or equal to about 2 keV but less than about 500 keV, greater than 2 keV and less than 100 keV, greater than 2 keV and less than 50 keV or greater than or equal to 2 keV and less than or equal to 30 keV. In further embodiments, the nanoparticle comprises a plurality of atoms and the energy is from 0.05 eV to 50 eV per atom or 0.1 eV to 50 eV per atom. In further embodiments, the fluence is $1\times10^8$-$1\times10^{12}$ NPs/cm$^2$. In embodiments, the nanoparticles are from 1 nm to 50 nm, 2 nm to 50 nm, 1 nm to 25 nm, 2 nm to 25 nm, 2 nm to 10 nm, 3 nm to 30 nm or 10 nm to 50 nm in size. Furthermore, in some embodiments, the perforation methods for perforation of composite materials can incorporate additional features as previously described for nanoparticle perforation of graphene layers. For example, the layers of the composite membranes which may be perforated can be tilted relative to the incidence angle of the impinging NPs.

In an aspect of the invention, one or more cleaning methods is used to remove residual nanoparticles from the surface of the sheet of graphene-based material or the sheet comprising a graphene-based material. The cleaning methods may alternately or additionally remove material from substrate. For example, an acid treatment can be suitable for removing residual metal nanoparticles. In further embodiments, residual nanoparticles are not removed from the surface, but following perforation the residual particles are reacted with graphene, used to catalytically remove the graphene, used to rip graphene with magnetic pull on ferromagnetic nanoparticles or evaporate the graphene via an electromagnetic to thermal conversion of energy. In additional embodiments, the NPs introduce localized oxidation upon a local increase in temperature.

Multi-layer graphene sheets and graphene-based materials comprising multi-layer graphene having a plurality of pores penetrating through the stacked sheets are also described in the present disclosure. Such perforated multi-layer graphene sheets will also be referred to herein as "perforated graphene" "perforated graphene-based materials" or "perforated two dimensional materials," The present disclosure further describes composite membranes comprising the perforated graphene-based materials described herein, the composite membranes comprising the perforated graphene-based materials described herein and a porous substrate. The disclosure provided herein also relates to 2D materials, combinations of layered 2D materials and composite membranes thereof.

In some embodiments after perforation or modification with the nanoparticles, the perforations can be about 100 nm in size or less, 50 nm in size or less, 20 nm in size or less, 10 nm in size or less, or less than about 5 nm in size, particularly in a size range from 1 nm to 100 nm, 2 nm to about 50 nm, 2 nm to about 20 nm, 2 nm to about 10 nm or from about 2 nm to about 5 nm. As examples, after perforation or modification with the nanoparticles the coefficient of variation of the pore size is 0.1 to 2 and the porosity is from 0.1% to 15%. In various embodiments, the pores extend all the way through the stacked graphene sheets.

In some embodiments, perforated graphene and perforated graphene-based materials comprising multilayered graphene produced by the techniques described herein can be used in filtration applications. The size or size range of perforations is adapted to the intended application. The perforated graphene-based materials disclosed herein and composite membranes including the these perforated graphene based materials are useful for a number of filtration, separation and/or barrier applications including, but not limited to salt filtration, protein separation, viral clearance, immunoisolation, food and beverage filtration and clarification.

The foregoing has outlined rather broadly the features of the present disclosure in order that the detailed description that follows can be better understood. Additional features and advantages of the disclosure will be described hereinafter. These and other advantages and features will become more apparent from the following description.

BRIEF DESCRIPTION OF THE DRAWINGS

For a more complete understanding of the present disclosure, and the advantages thereof, reference is now made to the following descriptions to be taken in conjunction with the accompanying drawings describing specific embodiments of the disclosure, wherein.

DETAILED DESCRIPTION

Figure 1:
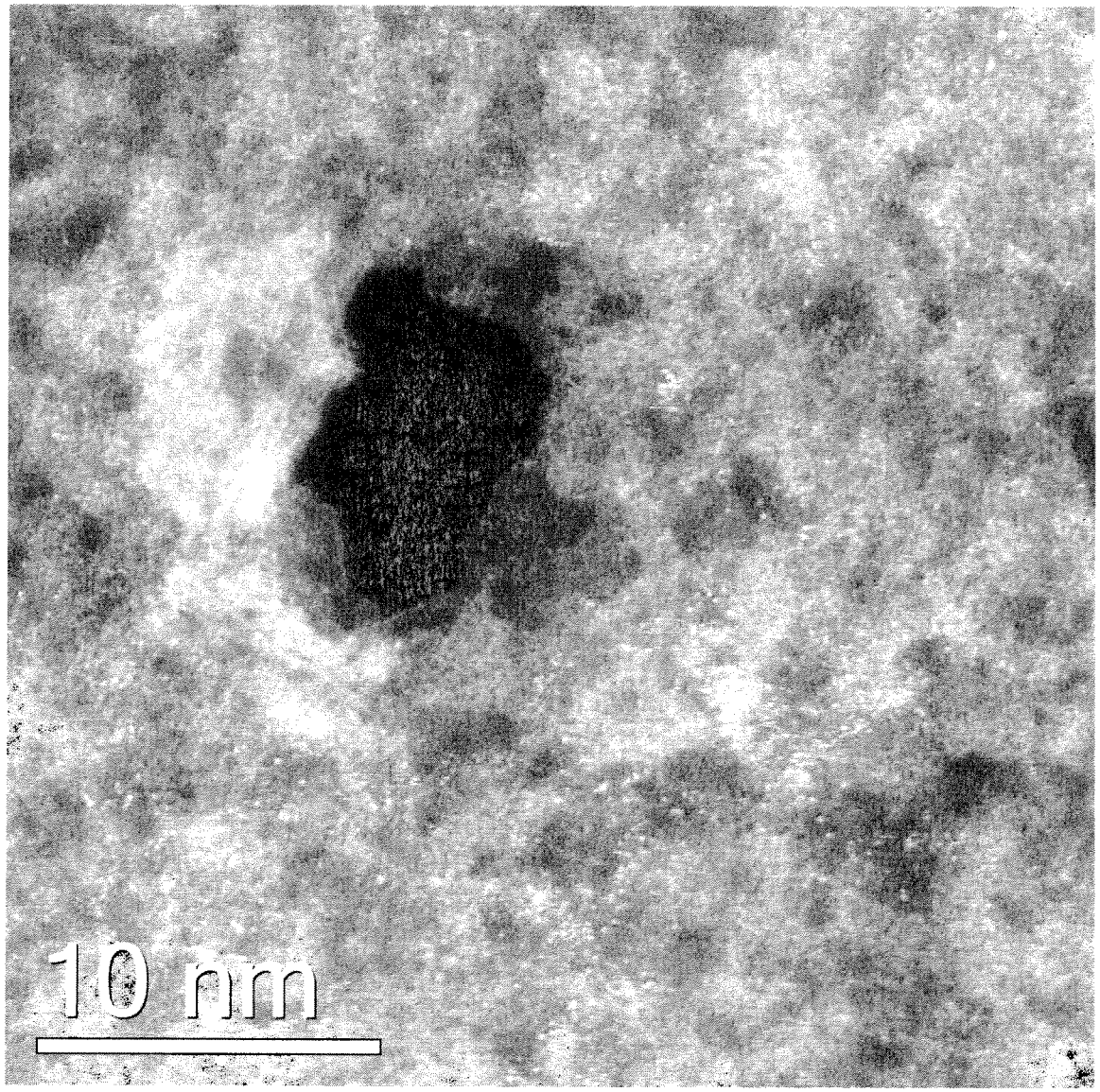
FIG. 1 is a scanning transmission electron microscopy image demonstrating perforation through two independently stacked layers of graphene by nanoparticles.

Graphene represents a form of carbon in which the carbon atoms reside within a single atomically thin sheet or a few layered sheets (e.g., about 20 or less) of fused six-membered rings forming an extended $sp^2$-hybridized carbon planar lattice. Graphene-based materials include, but are not limited to, single layer graphene, multilayer graphene or interconnected single or multilayer graphene domains and combinations thereof. In embodiments, multilayer graphene includes 2 to 25 layers, 2 to 20 layers, 2 to 10 layers or 2 to 5 layers. In an embodiment, layers of multilayered graphene are stacked, but are less ordered in the z direction (perpendicular to the basal plane) than a thin graphite crystal.

In an embodiment, graphene-based materials also include materials which have been formed by stacking single or multilayer graphene sheets. Multi-layered graphene as referred to herein includes multiple sheets of graphene formed by layering or stacking independently as-synthesized sheets on a substrate. As used herein, independently as-synthesized sheets which have been layered or stacked on a substrate are termed "independently stacked." Adjacent graphene layers formed by independent stacking can be less ordered in the z direction than as-synthesized multilayer graphene. In examples, independently stacked adjacent layers do not display A-B, A-B-A or A-B-C-A stacking. In additional examples, there is no defined registry of adjacent layers of independently stacked graphene. Without wishing to be bound by any particular belief, structural differences between independently stacked multi-layer graphene and as-synthesized multi-layer graphene are believed to contribute to differences in nanoparticle perforation behavior demonstrated in Example 1. In an embodiment, layers of as-synthesized sheets of graphene which have been stacked in this fashion are less ordered in the z direction, i.e., the lattices of the sheets do not line up as well, than layers in an as-synthesized multilayer graphene sheet. Suitable as-synthesized sheets include sheets of single layer graphene (SLG), sheets of bi-layer graphene (BLG) or sheets of few layer graphene (FLG graphene, for example up to 5 layers of graphene). For example, when a "float down" transfer technique is used a sheet of single layer graphene (SLG) is layered via float-down on top of a substrate. Another sheet of the SLG is then floated down on the already prepared SLG-substrate stack. This would now be 2 layers of "as-synthesized" SLG on top of the substrate. This can be extended to few layer graphene (FLG) or a mixture of SLG and FLG; and can be achieved through transfer methods known to the art. Other transfer methods are known to the art, including stamp methods. For example, a polymer transfer method can be used to assemble the stack of polymer layers. In some instances a number of layers is intended to refer to that number of separate layers of transferred graphene. In cases where a layer of transferred graphene can have a range of graphene layers (e.g. some regions of the layer are SLG and others are BLG or FLG), the stack has a range of graphene layers. For example, if 5 layers of transferred graphene each have 1 to 5 layers, then regions where the 5 sheets line up with 5 layers, effectively have 25 layers of graphene there. Depending on the perforation conditions, the thicker regions of the stack may not perforate. In an embodiment, layering of different sheets of graphene results in a desirable membrane for filtration and separation applications.

In an embodiment, a sheet of graphene-based material is a sheet of single or multilayer graphene or a sheet comprising a plurality of interconnected single or multilayer graphene domains. In embodiments, the multilayer graphene domains have 2 to 5 layers or 2 to 10 layers. As used herein, a "domain" refers to a region of a material where atoms are uniformly ordered into a crystal lattice. A domain is uniform within its boundaries, but different from a neighboring region. For example, a single crystalline material has a single domain of ordered atoms. In an embodiment, at least some of the graphene domains are nanocrystals, having domain size from 1 to 100 nm or 10-100 nm. In an embodiment, at least some of the graphene domains have a domain size from 100 nm to 500 microns, 100 nm to 1 micron, or from 200 nm to 800 nm, or from 300 nm to 500 nm. In an embodiment, a domain of multilayer graphene may overlap a neighboring domain. "Grain boundaries" formed by crystallographic defects at edges of each domain differentiate between neighboring crystal lattices. In some embodiments, a first crystal lattice may be rotated relative to a second crystal lattice, by rotation about an axis perpendicular to the plane of a sheet, such that the two lattices differ in "crystal lattice orientation".

In an embodiment, the sheet of graphene-based material is a sheet of multilayer graphene or a combination of single and multilayer graphene. In another embodiment, the sheet of graphene-based material is a sheet comprising a plurality of interconnected multilayer or single and multilayer graphene domains. In an embodiment, the interconnected domains are covalently bonded together to form the sheet. When the domains in a sheet differ in crystal lattice orientation, the sheet is polycrystalline.

In embodiments, the thickness of the sheet of graphene-based material is from, 0.3 to 10 nm, from 0.3 to 5 nm, or from 0.3 to 3 nm. In an embodiment, the thickness includes both single layer graphene and the non-graphenic carbon.

In an embodiment, a sheet of graphene-based material comprises intrinsic or native defects. Intrinsic or native defects are those resulting from preparation of the graphene-based material in contrast to perforations which are selectively introduced into a sheet of graphene-based material or a sheet of graphene. Such intrinsic or native defects include, but are not limited to, lattice anomalies, pores, tears, cracks or wrinkles. Lattice anomalies can include, but are not limited to, carbon rings with other than 6 members (e.g. 5, 7 or 9 membered rings), vacancies, interstitial defects (including incorporation of non-carbon atoms in the lattice), and grain boundaries. As used herein, perforations do not include openings in the graphene lattice due to intrinsic or native defects or grain boundaries.

In embodiments, graphene is the dominant material in a graphene-based material. For example, a graphene-based material comprises at least 20% graphene, 30% graphene, or at least 40% graphene, or at least 50% graphene, or at least 60% graphene, or at least 70% graphene, or at least 80% graphene, or at least 90% graphene, or at least 95% graphene. In embodiments, a graphene-based material comprises a range of graphene selected from 30% to 95%, or from 40% to 80% from 50% to 70%, from 60% to 95% or from 75% to 100%. In an embodiment, the amount of graphene in the graphene-based material is measured as an atomic percentage.

In an embodiment, a sheet of graphene-based material further comprises non-graphenic carbon-based material located on a surface of the sheet of graphene-based material. In an embodiment, the sheet is defined by two base surfaces (e.g. top and bottom faces of the sheet) and side faces. In a further embodiment, the "bottom" face of the sheet is that face which contacted the substrate during growth of the sheet and the "free" face of the sheet opposite the "bottom" face. In an embodiment, non-graphenic carbon-based material is located on a base surface of the sheet (e.g. the substrate side of the sheet and/or the free surface of the sheet). In a further embodiment, the sheet of graphene-based material includes a small amount of one or more other materials on the surface, such as, but not limited to, one or more dust particles or similar contaminants.

In an embodiment, the amount of non-graphenic carbon-based material is less than the amount of graphene. In embodiments, the surface coverage of the sheet of non-graphenic carbon-based material is greater than zero and less than 80%, from 5% to 80%, from 10% to 80%, from 5% to 50% or from 10% to 50%. This surface coverage may be measured with transmission electron microscopy, which gives a projection. In embodiments, the amount of graphene in the graphene-based material is from 60% to 95% or from 75% to 100%.

In an embodiment, the non-graphenic carbon-based material does not possess long range order and may be classified as amorphous. In embodiments, the non-graphenic carbon-based material further comprises elements other than carbon and/or hydrocarbons. In an embodiment, non-carbon elements which may be incorporated in the non-graphenic carbon include hydrogen, oxygen, silicon, copper and iron. In further embodiment, the non-graphenic carbon-based material comprises hydrocarbons. In embodiments, carbon is the dominant material in non-graphenic carbon-based material. For example, a non-graphenic carbon-based material comprises at least 30% carbon, or at least 40% carbon, or at least 50% carbon, or at least 60% carbon, or at least 70% carbon, or at least 80% carbon, or at least 90% carbon, or at least 95% carbon. In embodiments, a non-graphenic carbon-based material comprises a range of carbon selected from 30% to 95%, or from 40% to 80%, or from 50% to 70%. In an embodiment, the amount of carbon in the non-graphenic carbon-based material is measured as an atomic percentage.

In further embodiments, the sheet of graphene based material is larger than a flake which would be obtained by exfoliation. For example, the sheet has a lateral dimension greater than about 1 micrometer. As used herein, a lateral dimension is perpendicular to the thickness of the sheet.

As used herein, the term 'two-dimensional material' will refer to any extended planar structure of atomic thickness, including both single- and multi-layer variants thereof. Multi-layer two-dimensional materials can include up to about 20 stacked layers. In an embodiment, a two-dimensional material suitable for the present structures and methods can be any substance having an extended planar molecular structure and an atomic level thickness. Particular examples of two-dimensional materials include graphene films, graphene-based material, transition metal dichalcogenides, metal oxides, metal hydroxides, graphene oxide, a-boron nitride, silicone, germanene, or other materials having a like planar structure. Specific examples of transition metal dichalcogenides include molybdenum disulfide and niobium diselenide. Specific examples of metal oxides include vanadium pentoxide. Graphene or graphene-based films according to the embodiments of the present disclosure can include single-layer or multi-layer films, or any combination thereof. Choice of a suitable two-dimensional material can be determined by a number of factors, including the chemical and physical environment into which the graphene, graphene-based material or other two-dimensional material is to be terminally deployed, ease of perforating the two-dimensional material, and the like.

Nanomaterials in which pores are intentionally created will be referred to herein as "perforated graphene", "perforated graphene-based materials" or "perforated two-dimensional materials." The size distribution of holes may be narrow, e.g., limited to 0.1 to 0.5 coefficient of variation. In an embodiment, the characteristic dimension of the holes is selected for the application. For circular holes, the characteristic dimension is the diameter of the hole. In embodiments relevant to non-circular pores, the characteristic dimension can be taken as the largest distance spanning the hole, the smallest distance spanning the hole, the average of the largest and smallest distance spanning the hole, or an equivalent diameter based on the in-plane area of the pore. As used herein, perforated graphene-based materials include materials in which non-carbon atoms have been incorporated at the edges of the pores. In embodiments, the pore is asymmetric with the pore size varying along the length of the hole (e.g. pore size wider at the free surface of the graphene-based material than at the substrate surface or vice versa). In an embodiment, the pore size may be measured at one surface of the sheet of graphene based material.

Quantitative image analysis of pore features may include measurement of the number, area, size and/or perimeter of pore features. In an embodiment, the equivalent diameter of each pore is calculated from the equation $A=\pi d^2/4$. When the pore area is plotted as a function of equivalent pore diameter, a pore size distribution is obtained. The coefficient of variation of the pore size is calculated herein as the ratio of the standard deviation of the pore size to the mean of the pore size.

In an embodiment, the ratio of the area of the perforations to the ratio of the area of the sheet is used to characterize the sheet. The area of the perforations may be measured using quantitative image analysis. The area of the sheet may be taken as the planar area spanned by the sheet if it is desired to exclude the additional sheet surface area due to wrinkles or other non-planar features of the sheet. In a further embodiment, characterization may be based on the ratio of the area of the perforations to the sheet area excluding features such as surface debris.

The present disclosure is directed, in part, to multi-layer graphene sheets and sheets of graphene-based material having about 2 to about 10 graphene sheets stacked upon one another and a plurality of pores penetrating through the stacked graphene sheets. The present disclosure is also directed, in part, to methods for perforating multi-layer graphene sheets and sheets of graphene-based material comprising multilayer graphene and defining pores therein that extend through the multiple graphene sheets.

Perforated graphene (i.e., graphene having a plurality of pores defined therein) has a number of possible applications including, for example, use as a molecular filter, use as a barrier material, use as a defined band gap material, and use as an electrically conductive filler material with tunable electrical properties within polymer composites. Although a number of potential uses for perforated graphene exist, there are few reliable techniques to reproducibly introduce a plurality of pores in graphene, where the pores are presented in a desired pore density and pore size. Generation of sub-nanometer pores can be particularly problematic.

In embodiments, the pretreatment step for the graphene-based material is selected from thermal treatment, UV-oxygen treatment, ion beam treatment, and combinations thereof. In an embodiment, thermal treatment includes heating to a temperature from 200° C. to 800° C. at a pressure of $10^{-7}$ torr to atmospheric pressure for a time of 2 hours to 8 hours. In an embodiment, UV-oxygen treatment involves exposure to light from 150 nm to 300 nm and an intensity from 10 to 100 mW/cm$^2$ at 6 mm distance for a time from 60 to 1200 seconds. In embodiments, UV-oxygen treatment is performed at room temperature or at a temperature greater than room temperature. In further embodiments, UV-oxygen treatment is performed at atmospheric pressure (e.g. 1 atm) or under vacuum. In an embodiment, ion beam pretreatment involves exposure one or more of the graphene layers to ions having an ion energy from 50 eV to 1000 eV (for pretreatment) and the fluence is from $3\times10^{10}$ ions/cm$^2$ to $8\times10^{11}$ ions/cm$^2$ or $3\times10^{10}$ ions/cm$^2$ to $1\times10^{14}$ ions/cm$^2$ (for pretreatment). In a further embodiment, the source of ions is collimated, such as a broad beam or flood source. In an embodiment, the ions are noble gas ions such as Xe$^+$. In modifying the sheet of perforated graphene-based material comprises creating a second set pores having a second pore size extending through the multiple graphene sheets, modifying the first pores size or combinations thereof. In an embodiment, one or more pretreatment steps are performed while the graphene-based material is attached to a substrate, such as a growth substrate. In an embodiment, the metal growth substrate is a substantially continuous layer of metal rather than a grid or mesh. Metal growth substrates compatible with growth of graphene and graphene-based materials include transition metals and their alloys. In embodiments, the metal growth substrate is copper based or nickel based. In embodiments of the present disclosure the ion source provides a broad ion field. The source of ions may be an ion flood source. In an embodiment, the ion flood source does not include focusing lenses. In embodiments, the ion source is operated at less than atmospheric pressure, such as at $10^{-3}$ to $10^{-5}$ torr or $10^{-4}$ to $10^{-6}$ torr. If perforation efficiency is lower than desired after one pretreatment step, an additional pretreatment step can be used before re-exposing the graphene layer(s) to nanoparticle or clusters.

In embodiments of the disclosure herein, the particle beam is a nanoparticle beam or cluster beam. In further embodiments, the beam is collimated or is not collimated. Furthermore, the beam need not be highly focused. In some embodiments, a plurality of the nanoparticles or clusters is singly charged. In additional embodiments, the nanoparticles comprise from 500 to 2,000,000 atoms, from 500 to 250,000 atoms or from 500 to 5,000 atoms.

A variety of metal particles are suitable for use in the methods of the present disclosure. For example, nanoparticles of Al, Ag, Au, Ti, Cu and nanoparticles comprising Al, Ag, Au, Ti, Cu are suitable. Metal NPs can be generated in a number of ways including magnetron sputtering and liquid metal ion sources (LMIS). Methods for generation of nanoparticles are further described in Cassidy, Cathal, et al. "Inoculation of silicon nanoparticles with silver atoms." Scientific reports 3 (2013), Haberland, Hellmut, et al. "Filling of micron-sized contact holes with copper by energetic cluster impact." Journal of Vacuum Science & Technology A 12.5 (1994): 2925-2930, Bromann, Karsten, et al. "Controlled deposition of size-selected silver nanoclusters." Science 274.5289 (1996): 956-958, Palmer, R. E., S. Pratontep, and H-G. Boyen. "Nanostructured surfaces from size-selected clusters." Nature Materials 2.7 (2003): 443-448, Shyjumon, I., et al. "Structural deformation, melting point and lattice parameter studies of size selected silver clusters." The European Physical Journal D-Atomic, Molecular, Optical and Plasma Physics 37.3 (2006): 409-415, Allen, L. P., et al. "Craters on silicon surfaces created by gas cluster ion impacts." Journal of applied physics 92.7 (2002): 3671-3678, Wucher, Andreas, Hua Tian, and Nicholas Winograd. "A Mixed Cluster Ion Beam to Enhance the Ionization Efficiency in Molecular Secondary Ion Mass Spectrometry." *Rapid communications in mass spectrometry: RCM* 28.4 (2014): 396-400. *PMC*. Web. 6 Aug. 2015 and Pratontep, S., et al. "Size-selected cluster beam source based on radio frequency magnetron plasma sputtering and gas condensation." Review of scientific instruments 76.4 (2005): 045103, each of which is hereby incorporated by reference for its description of nanoparticle generation techniques.

Gas cluster beams can be made when high pressure gas adiabatically expands in a vacuum and cools such that it condenses into clusters. Clusters can also be made ex situ such as $C_{60}$ and then accelerated towards the graphene.

In some embodiments, the nanoparticles are specially selected to introduce moieties into the graphene. In some embodiments, the nanoparticles function as catalysts. The moieties may be introduced at elevated temperatures, optionally in the presence of a gas. In other embodiments, the nanoparticles introduce "chiseling" moieties, which are moieties that help reduce the amount of energy needed to remove an atom during irradiation.

In embodiments, the size of the perforation apertures is controlled by controlling both the nanoparticle size and the nanoparticle energy. Without wishing to be bound by any particular belief, if all the nanoparticles have sufficient energy to perforate, then the resulting perforation is believed to correlated with the nanoparticle sizes selected. However, the size of the perforation is believed to be influenced by deformation of the nanoparticle during the perforation process. This deformation is believed to be influenced by both the energy and size of the nanoparticle and the stiffness of the graphene layer(s). A grazing angle of incidence of the nanoparticles can also produce deformation of the nanoparticles. In addition, if the nanoparticle energy is controlled, it is believed that nanoparticles can be deposited with a large mass and size distribution, but that a sharp cutoff can still be achieved.

Without wishing to be bound by any particular belief, the mechanism of perforation is believed to be a continuum bound by sputtering on one end (where enough energy is delivered to the graphene sheet to atomize the carbon in and around the NP impact site) and ripping or fracturing (where strain induced failure opens a torn hole but leaves the graphene carbons as part of the original sheet). Part of the graphene layer may fold over at the site of the rip or fracture. In an embodiment the cluster can be reactive so as to aid in the removal of carbon (e.g. an oxygen cluster or having trace amounts of a molecule known to etch carbon in a gas cluster beam i.e. a mixed gas cluster beam). Without wishing to be bound by any particular belief, the stiffness of a graphene layer is believed to be influenced by both the elastic modulus of graphene and the tautness of the graphene. Factors influencing the elastic modulus of a graphene layer are believed to include temperature, defects (either small defects or larger defects from NP irradiation), physisorption, chemisorption and doping. Tautness is believed to be influenced by coefficient of thermal expansion mismatches (e.g. between substrate and graphene layer) during deposition, strain in the graphene layer, wrinkling of the graphene layer. It is believed that strain in a graphene layer can be influenced by a number of factors including application of gas pressure to the backside (substrate side) of a graphene layer, straining of an elastic substrate prior to deposition of graphene, flexing of the substrate during deposition, and defecting the graphene layer in controlled regions to cause the layer to locally contract and increase the local strain.

In embodiments, nanoparticle perforation can be further controlled by straining the graphene layers during perforation to induce fracture, thereby "ripping" or "tearing" one or more graphene layers. In some embodiments, the stress is directional and used to preferentially fracture in a specific orientation. For example, ripping of one or more graphene sheets can be used to create "slit" shaped apertures; such apertures can be substantially larger than the nanoparticle used to initiate the aperture. In additional embodiments, the stress is not oriented in a particular direction.

In embodiments, the pores are functionalized. In some embodiments, the pores are functionalized by exposure to gas during and/or following the perforation process. The exposure to gas may occur at temperatures above room temperature. In some embodiments, the pores can have more than one effective functionalization. For example, when the top and the bottom layers of a graphene stack are exposed to different functionalizing gases, more than one effective functionalization can be produced. In further embodiments, a thin layer of a functionalizing moiety is applied to the surface before NP perforation, during NP perforation and after NP perforation. As compatible with the NP process, the thin layer may be formed by applying a fluid to the surface. In embodiments, the gas pressure is $10^{-4}$ Torr to atmospheric pressure. In embodiments, functionalizing moieties include, but are not limited to water, water vapor, polyethylene glycol, oxygen, nitrogen, amines, caboxycylic acid.

The preferred gasses for before and during functionalization would depend on the reaction of graphene and the gas within the high energy environment of the particle impact. This would be within about 100 nm of the edge of the particle impact. This fits into two general classes, and the gases would be added at a partial pressure of from $1 \times 10^{-6}$ Torr to $1 \times 10^{-3}$ Torr. The first class would be species that reacts with radicals, carbanions (negative charge centered on a carbon) and carbocations (positive charge centered on a carbon). Representative molecules include carbon dioxide, ethylene oxide and isoprene. The second class would be species that fragment to create species that react with graphene and defective graphene. Representative molecules would be polyethylene glycol, diacytylperoxide, azobisisobutyronitrile, and phenyl diazonium iodide.

In some embodiments, a sheet of graphene-based material is perforated to create a first set of perforations, the first set of perforations are functionalized with a first moeity, the sheet is reperforated to create a second set of perforations, and the second set of perforations is functionalized with a second moiety.

In embodiments, it is desirable and advantageous to perforate multiple graphene sheets at one time rather than perforating single graphene sheets individually, since multi-layer graphene is more robust and less prone to the presence of intrinsic or native defects that align through all the layers than is single-layer graphene. In addition, the process is stepwise efficient, since perforated single-layer graphene can optionally be produced by exfoliating the multi-layer graphene after the pore definition process is completed. The pore size is also tailorable in the processes described herein. Thus, the processes described herein are desirable in terms of the number, size and size distribution of pores produced.

The multi-layer graphene contains between about 2 stacked graphene sheets and about 20 stacked graphene sheets according to the various embodiments of the present disclosure. Too few graphene sheets can lead to difficulties in handling the graphene as well as an increased incidence of intrinsic graphene defects. Having more than about 20 stacked graphene sheets, in contrast, can make it difficult to perforate all of the graphene sheets. In an embodiment, the multilayer sheets may be made by individually growing sheets and making multiple transfers to the same substrate. In various embodiments, the multi-layer graphene perforated by the techniques described herein can have 2 graphene sheets, or 3 graphene sheets, or 4 graphene sheets, or 5 graphene sheets, or 6 graphene sheets, or 7 graphene sheets, or 8 graphene sheets, or 9 graphene sheets, or 10 graphene sheets, or 11 graphene sheets, or 12 graphene sheets, or 13 graphene sheets, or 14 graphene sheets, or 15 graphene sheets, or 16 graphene sheets, or 17 graphene sheets, or 18 graphene sheets, or 19 graphene sheets, or 20 graphene sheets. Any subrange between 2 and 20 graphene sheets is also contemplated by the present disclosure.

In some embodiments, perforated graphene produced by the techniques described herein can be used in filtration processes. In addition, the perforated graphene produced by the techniques described herein can be utilized in fields such as, for example, advanced sensors, batteries and other electrical storage devices, and semiconductor devices.

In some embodiments, the perforated graphene can be placed upon a porous polymer substrate after being perforated. The combination of the porous polymer substrate and the graphene can constitute a filter in various embodiments, such as a reverse osmosis filter or a nanofiltration filter. Suitable porous polymer substrates are not believed to be particularly limited.

Although the disclosure has been described with reference to the disclosed embodiments, one having ordinary skill in the art will readily appreciate that these are only illustrative of the disclosure. It should be understood that various modifications can be made without departing from the spirit of the disclosure. The disclosure can be modified to incorporate any number of variations, alterations, substitutions or equivalent arrangements not heretofore described, but which are commensurate with the spirit and scope of the disclosure. Additionally, while various embodiments of the disclosure have been described, it is to be understood that aspects of the disclosure may include only some of the described embodiments. Accordingly, the disclosure is not to be seen as limited by the foregoing description.

Every formulation or combination of components described or exemplified can be used to practice the invention, unless otherwise stated. Specific names of compounds are intended to be exemplary, as it is known that one of ordinary skill in the art can name the same compounds differently. When a compound is described herein such that a particular isomer or enantiomer of the compound is not specified, for example, in a formula or in a chemical name, that description is intended to include each isomers and enantiomer of the compound described individual or in any combination. One of ordinary skill in the art will appreciate that methods, device elements, starting materials and synthetic methods other than those specifically exemplified can be employed in the practice of the invention without resort to undue experimentation. All art-known functional equivalents, of any such methods, device elements, starting materials and synthetic methods are intended to be included in this invention. Whenever a range is given in the specification, for example, a temperature range, a time range, or a composition range, all intermediate ranges and subranges, as well as all individual values included in the ranges given are intended to be included in the disclosure. When a Markush group or other grouping is used herein, all individual members of the group and all combinations and subcombinations possible of the group are intended to be individually included in the disclosure.

As used herein, "comprising" is synonymous with "including," "containing," or "characterized by," and is inclusive or open-ended and does not exclude additional, unrecited elements or method steps. As used herein, "consisting of" excludes any element, step, or ingredient not specified in the claim element. As used herein, "consisting essentially of" does not exclude materials or steps that do not materially affect the basic and novel characteristics of the claim. Any recitation herein of the term "comprising", particularly in a description of components of a composition or in a description of elements of a device, is understood to encompass those compositions and methods consisting essentially of and consisting of the recited components or elements. The invention illustratively described herein suitably may be practiced in the absence of any element or elements, limitation or limitations which is not specifically disclosed herein.

The terms and expressions which have been employed are used as terms of description and not of limitation, and there is no intention in the use of such terms and expressions of excluding any equivalents of the features shown and described or portions thereof, but it is recognized that various modifications are possible within the scope of the invention claimed. Thus, it should be understood that although the present invention has been specifically disclosed by preferred embodiments and optional features, modification and variation of the concepts herein disclosed may be resorted to by those skilled in the art, and that such modifications and variations are considered to be within the scope of this invention as defined by the appended claims.

In general the terms and phrases used herein have their art-recognized meaning, which can be found by reference to standard texts, journal references and contexts known to those skilled in the art. The preceding definitions are provided to clarify their specific use in the context of the invention.

All references throughout this application, for example patent documents including issued or granted patents or equivalents; patent application publications; and non-patent literature documents or other source material; are hereby incorporated by reference herein in their entireties, as though individually incorporated by reference, to the extent each reference is at least partially not inconsistent with the disclosure in this application (for example, a reference that is partially inconsistent is incorporated by reference except for the partially inconsistent portion of the reference).

All patents and publications mentioned in the specification are indicative of the levels of skill of those skilled in the art to which the invention pertains. References cited herein are incorporated by reference herein in their entirety to indicate the state of the art, in some cases as of their filing date, and it is intended that this information can be employed herein, if needed, to exclude (for example, to disclaim) specific embodiments that are in the prior art. For example, when a compound is claimed, it should be understood that compounds known in the prior art, including certain compounds disclosed in the references disclosed herein (particularly in referenced patent documents), are not intended to be included in the claims.

Example 1: Comparative Nanoparticle Perforation of Bilayer Graphene and Two Stacked Layers of Graphene FIG. 1 is a transmission electron microscopy image demonstrating perforation through two independently stacked layers of graphene by nanoparticles. Two layers of CVD graphene material were prepared. Each layer received ion beam treatment on Cu growth substrate, transfer to lacey carbon TEM grid, UV-oxygen treatment and 300° C. bake-out for 8 hours before the layers were stacked. The stacked layers were exposed to 6.5 kV Ag nanoparticles (NP). The NP distribution was centered on 6 nm and the fluence was approximately $5 \times 10^{10}$ NPs/cm$^2$.

Figure 2:
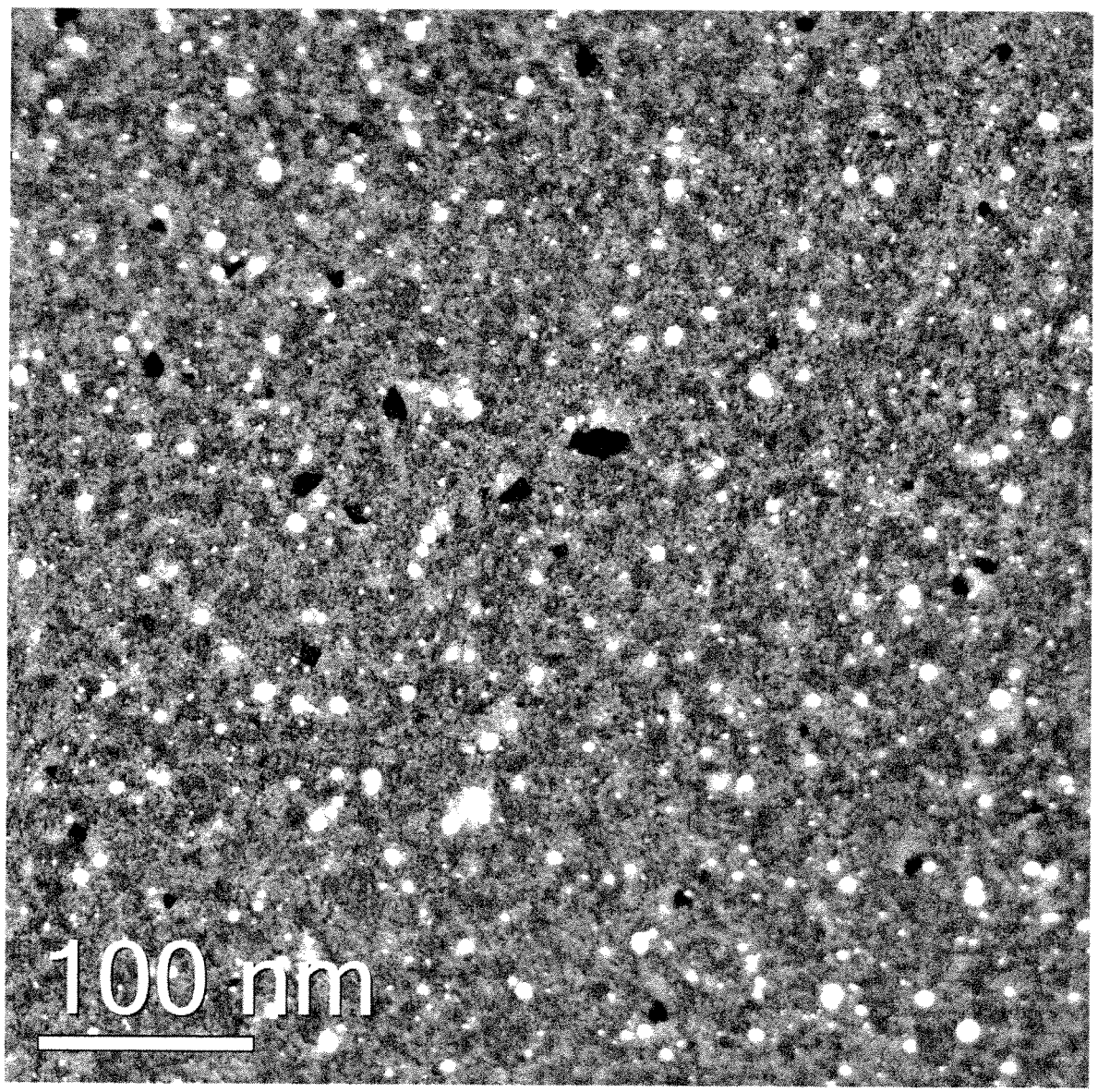
FIG. 2 is a scanning transmission electron microscopy image demonstrating perforation through bilayer graphene by nanoparticles.

FIG. 2 is a transmission electron microscopy image demonstrating perforation through bilayer graphene by nanoparticles. The CVD graphene was prepared then received ion beam treatment on Cu substrate, was transferred to lacey carbon TEM grid, received UV-oxygen treatment and 300° C. bakeout for 8 hours. The graphene was exposed to 7.5 kV AgNP with NP distribution centered on 6 nm at a fluence of approximately $5 \times 10^{11}$ NPs/cm², followed by a 24 hour bake at 300° C. in Ar with slow cool down.

Figure 3:
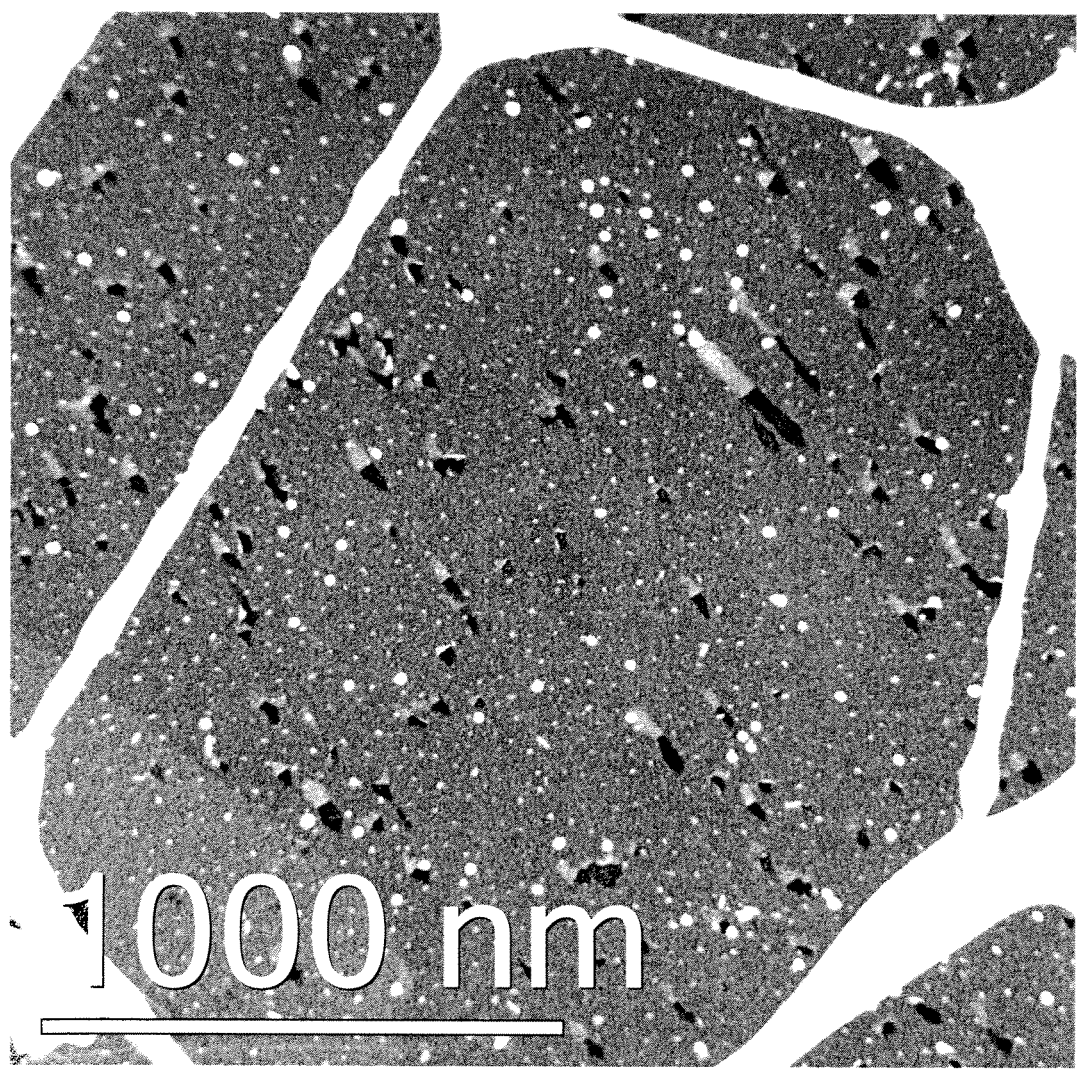
FIG. 3 is a scanning transmission electron microscopy image demonstrating perforation by a collimated nanoparticle beam at a non-zero angle with respect to the normal of the graphene-containing sheet.

Example 2: Nanoparticle Perforation at an Angle Other than Ninety Degrees with Respect to a Sheet of with Two Stacked Graphene Layers FIG. 3 is a transmission electron microscopy image of perforations through two stacked layers of graphene made by exposure to a particle beam comprising nanoparticles. The nanoparticles were provided at an incidence angle of approximately greater than 45 degrees to the normal of the basal plane of the sheet of graphene material. The NPs were of 9-11 nm diameter at an energy of 30 keV. The pores were typically 10-12 nm at their base, and varied in length from about 20 nm to 70 mm. The pore size was larger than that obtained for nanoparticle perforation approximately normal to the basal sheet of graphene material under similar nanoparticle size, energy and fluence conditions. In addition, some evidence of ripping was observed on the top graphene surface.

Example 3: Nanoparticle Perforation Followed by Ion Irradiation

Figure 4A:
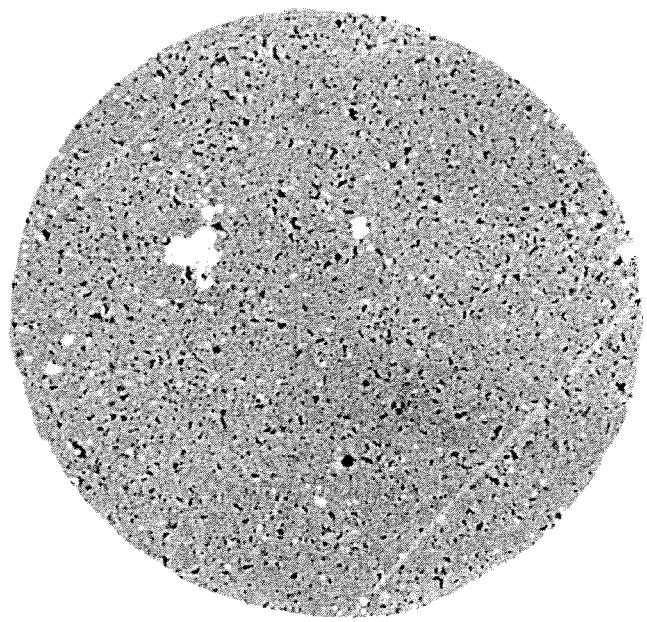
FIGS. 4A and 4B show the porosity present in a graphene-containing sheet after nanoparticle perforation (FIG. 4A) and after nanoparticle perforation followed by ion beam irradiation (FIG. 4B).
Figure 4B:
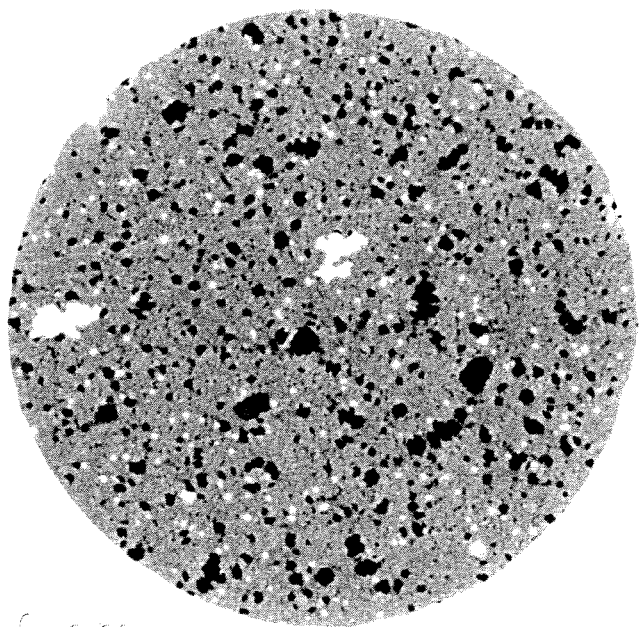

FIGS. 4A and 4B illustrate a sheet of graphene based material after nanoparticle perforation (FIG. 4A) and after subsequent ion beam irradiation (FIG. 4B). The material was two layers of independently stacked graphene. The perforation conditions were 7-10 nm NPs at 12 keV. The ion beam irradiation conditions were Xe+ at 300V with $2E^{14}$ Xe+/cm² fluence and $3E^{14}$ Xe+/cm²/s flux. The porousity went from 5% to 14%.

Example 4: Nanoparticle Perforation of Graphene on TEPI (460/25)

Figure 5:
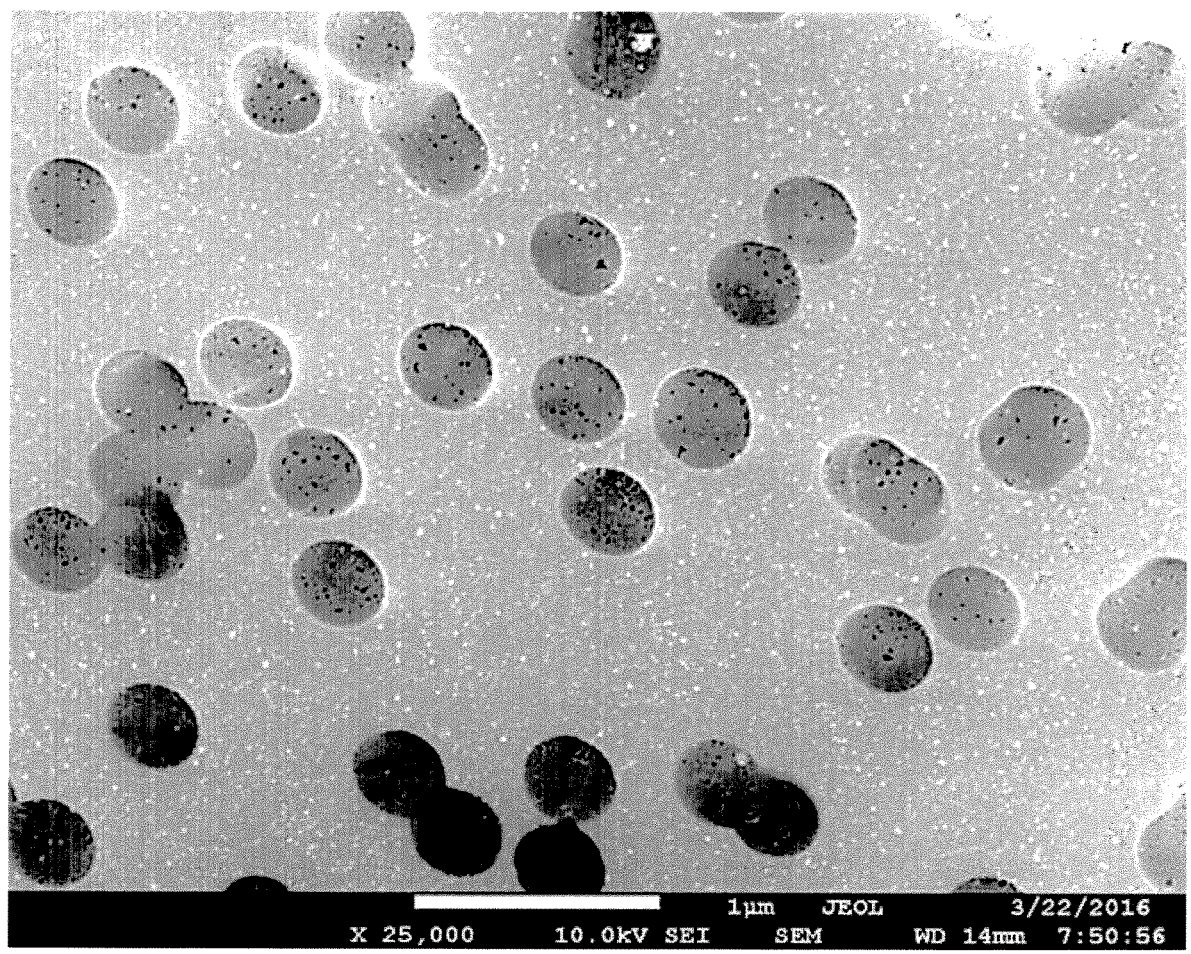
FIG. 5 is a scanning electrion microscopy image of two independently stacked layers of single layer graphene on a track etched polyimide substrate with approximately 460 nm diameter pores perforated by AgNP particles.

FIG. 5 is a scanning electrion microscopy image of two independently stacked layers of single layer graphene on a track etched polyimide substrate with approximately 460 nm diameter pores perforated by AgNP particles. TEPI (460/25) is track etched polyimide that has an average pore diameter (of individual, non overlapping pores) on the side that graphene is applied to it of 460 nm and is approximately 25 um thick. The perforation conditions were 10-15 nm AgNP particles at 30 keV.

What is claimed is the following:

1. A method for perforating a sheet of graphene-based material, the method comprising the steps of:
    a) disposing a sheet of graphene-based material, comprising at least 20 atomic percentage graphene, on a porous substrate, the graphene-based material comprising multi-layer graphene having from 2 to 10 graphene layers, wherein at least two of the graphene layers are independently stacked;
    b) exposing the sheet of graphene-based material comprising multi-layer graphene to a particle beam comprising core shell nanoparticles or silica coated metal nanoparticles, the nanoparticles having energy from 2 keV to 500 keV per nanoparticle, thereby perforating the sheet of graphene-based material;
    c) irradiating the graphene-based material with an ion beam prior to step b) and after step a) wherein ions of the ion beam have an ion energy from 50 eV to 10 keV and a fluence from $3 \times 10^{10}$ ions/cm² to $8 \times 10^{11}$ ions/cm², wherein each nanoparticle comprises a plurality of atoms and an energy from 0.05 to 50 eV per atom, and wherein a fluence is from $1 \times 10^8$—$1 \times 10^{12}$ NPs/cm².

2. The method of claim 1, wherein the multi-layer graphene has from 2 to 5 layers.

3. The method of claim 1, wherein the nanoparticle has a size of from 2 nm to 50 nm.

4. The method of claim 1, wherein the nanoparticles comprise a metal selected from the group consisting of Al, Ag, Au, Ti, Cu and combinations thereof.

5. The method of claim 1, wherein the perforating the sheet of graphene based material opens a plurality of pores extending therethrough, and a size of pores of the plurality of pores is from 1 to 100 nm.

6. The method of claim 1, wherein the perforating the sheet of graphene based material opens a plurality of pores extending therethrough, and a size of pores of the plurality of pores is from 1 to 50 nm.

7. The method of claim 1, wherein the method further includes a step of exposing the graphene-based material to ultraviolet light and oxygen prior to step b) and after step a).

\* \* \* \* \*